(12) United States Patent
Nilsson et al.

(10) Patent No.: US 12,195,900 B2
(45) Date of Patent: Jan. 14, 2025

(54) SEWING MACHINE AND METHODS OF USING THE SAME

(71) Applicant: Singer Sourcing Limited LLC, Nashville, TN (US)

(72) Inventors: Mattias Nilsson, Ingatorp (SE); Laura Kvarnstrand, Habo (SE)

(73) Assignee: Singer Sourcing Limited LLC, Nashville, TN (US)

( * ) Notice: Subject to any disclaimer, the term of this patent is extended or adjusted under 35 U.S.C. 154(b) by 0 days.

(21) Appl. No.: 18/054,329

(22) Filed: Nov. 10, 2022

(65) Prior Publication Data

US 2023/0144574 A1  May 11, 2023

Related U.S. Application Data

(60) Provisional application No. 63/278,286, filed on Nov. 11, 2021.

(51) Int. Cl.
*D05B 19/12* (2006.01)
*D05B 29/06* (2006.01)
(Continued)

(52) U.S. Cl.
CPC ............ *D05B 19/12* (2013.01); *D05B 29/06* (2013.01); *D05B 55/00* (2013.01); *G06T 7/60* (2013.01);
(Continued)

(58) Field of Classification Search
CPC ........ D05B 19/12; D05B 19/14; D05B 19/16; G05B 2219/2626; G05B 13/027; G06T 7/80
See application file for complete search history.

(56) References Cited

U.S. PATENT DOCUMENTS 4,481,507 A   11/1984   Takiguchi et al.
4,821,657 A    4/1989   Herdeg et al.
(Continued)

FOREIGN PATENT DOCUMENTS

CN        207845955 U    9/2018
DE     202018103728 U1  11/2019
(Continued)

OTHER PUBLICATIONS

International Search Report and Written Opinion from PCT/US2022/049533 dated Mar. 17, 2023.
(Continued)

*Primary Examiner* — Danny Worrell
(74) *Attorney, Agent, or Firm* — Calfee, Halter & Griswold LLP

(57) ABSTRACT

A method for calibrating one or more optical sensors on a sewing machine, including collecting data of one or more features of one or more predefined regions associated with the sewing machine, processing the data through one or more neural networks, wherein the one or more neural networks detect and recognize the one or more features of the one or more predetermined regions from the data, calculating one or more accuracy indicators of the one or more features from the data as compared to one or more trained features from the one or more neural networks, comparing the value of the one or more accuracy indicators to one or more indicator thresholds and adjusting one or more parameters of one or more optical sensors based on the comparison between the one or more accuracy indicators and the one or more indicator thresholds.

21 Claims, 77 Drawing Sheets

(51) Int. Cl.
    *D05B 55/00*     (2006.01)
    *G06T 7/60*     (2017.01)
    *G06T 7/90*     (2017.01)
    *D05B 47/00*     (2006.01)

(52) U.S. Cl.
    CPC ............... *G06T 7/90* (2017.01); *D05B 47/00* (2013.01); *G06T 2207/20084* (2013.01)

(56) References Cited

U.S. PATENT DOCUMENTS

| | | | |
|---|---|---|---|
| 5,042,410 A | 8/1991 | Nakashima | |
| 5,205,232 A | 4/1993 | Sadeh et al. | |
| 5,537,945 A | 7/1996 | Sugihara et al. | |
| 6,100,989 A | 8/2000 | Leuenberger | |
| 6,128,545 A * | 10/2000 | Miller | D05B 69/36 |
| | | | 700/130 |
| 6,715,435 B1 | 4/2004 | Wieczorek et al. | |
| 8,463,420 B2 | 6/2013 | Tokura | |
| 8,606,390 B2 | 12/2013 | Hjalmarsson et al. | |
| 8,607,721 B2 | 12/2013 | Koga et al. | |
| 8,869,721 B2 * | 10/2014 | Suzuki | D05B 19/16 |
| | | | 112/102.5 |
| 10,519,581 B2 | 12/2019 | Kamihira et al. | |
| 10,889,925 B2 | 1/2021 | Blenis, Jr. | |
| 11,441,253 B2 | 9/2022 | Jaeger et al. | |
| 11,555,265 B2 | 1/2023 | Blenis, Jr. | |
| 11,891,739 B2 * | 2/2024 | Kamihira | D05B 19/12 |
| 2006/0015209 A1 | 1/2006 | Schweizer | |
| 2006/0206232 A1 | 9/2006 | Palmer et al. | |
| 2011/0146553 A1 | 6/2011 | Wilhelmsson et al. | |
| 2013/0321579 A1 | 12/2013 | Firkus | |
| 2014/0318430 A1 | 10/2014 | Kato et al. | |
| 2015/0252503 A1 | 9/2015 | Tokura | |
| 2017/0316590 A1 | 11/2017 | Kongo | |
| 2018/0258569 A1 | 9/2018 | Kamihira et al. | |
| 2018/0355530 A1 | 12/2018 | Blenis, Jr. | |
| 2019/0376216 A1 | 12/2019 | Blenis, Jr. | |
| 2019/0378266 A1 | 12/2019 | Takahashi | |
| 2020/0087827 A1 | 3/2020 | Kamihira et al. | |
| 2020/0248348 A1 * | 8/2020 | Konzak | D05B 3/04 |
| 2022/0042226 A1 * | 2/2022 | Kvarnstrand | G06N 3/048 |
| 2022/0335856 A1 * | 10/2022 | Kvarnstrand | G06F 3/0304 |

FOREIGN PATENT DOCUMENTS

| | | | |
|---|---|---|---|
| EP | 1589869 A1 | 11/2005 | |
| EP | 2924158 A1 | 9/2015 | |
| JP | 2019201741 A | 11/2019 | |
| WO | 2004069050 A1 | 8/2004 | |
| WO | 2017090295 A1 | 6/2017 | |
| WO | WO-2023086462 A1 * | 5/2023 | D05B 19/12 |

OTHER PUBLICATIONS

International Search Report and Written Opinion from PCT Application No. PCT/US2021/038151 dated Oct. 12, 2021, 7 pages.
International Search Report and Written Opinion from PCT Application No. PCT/US2022/024768 dated Jul. 28, 2022, 19 pages.
Källström, et al., Prototype of an augmented reality user manual app for an advanced tool, Student Thesis, May 22, 2014, pp. 1-71.
Rambach et al., [POSTER] Augmented Things: Enhancing AR Applications leveraging the Internet of Things and Universal 3D Object Tracking, IEEE International Symposium on Mixed and Augmented Reality Adjunct Proceedings, 2017, pp. 103-108.
International Preliminary Report on Patentability from PCT/US2022/024768 dated Oct. 26, 2023 (11 pages).
International Search Report and Written Opinion from PCT Application No. PCT/US2021/038151 dated Oct. 12, 2021, 34 pages.

* cited by examiner

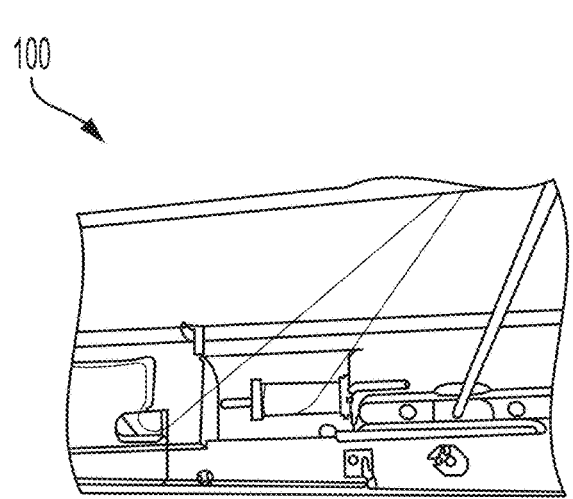
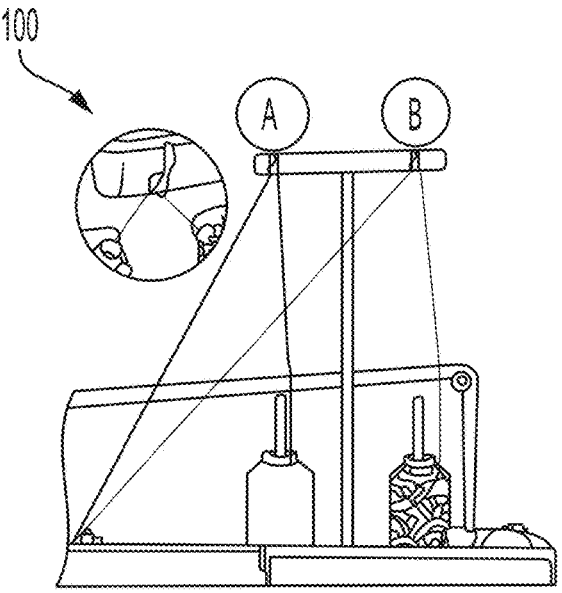
FIG. 10          FIG. 11
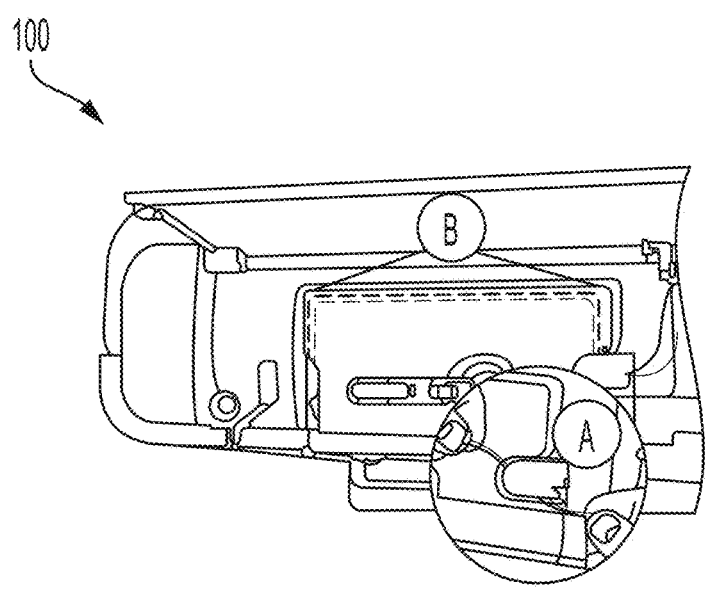
FIG. 12

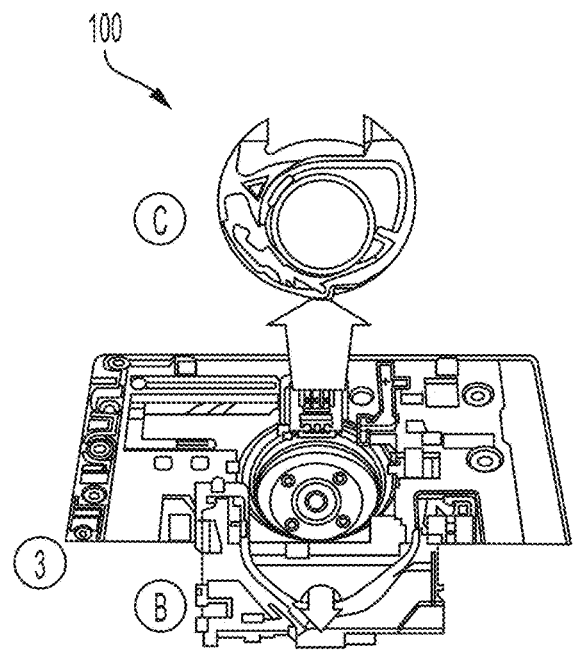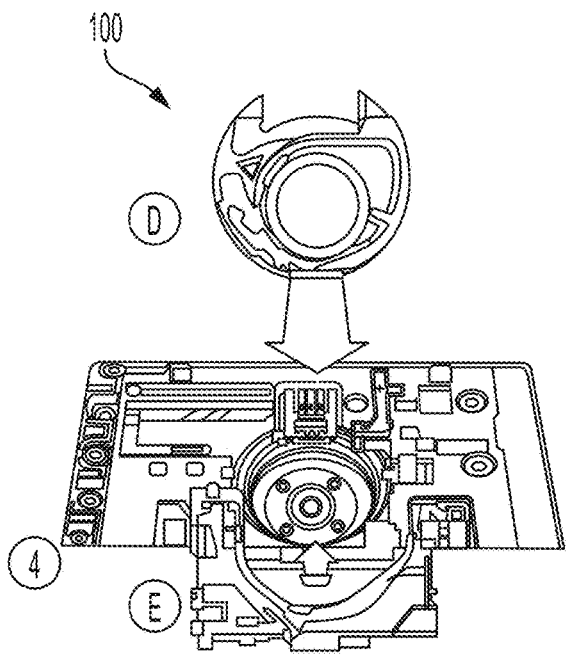
FIG. 13  FIG. 14
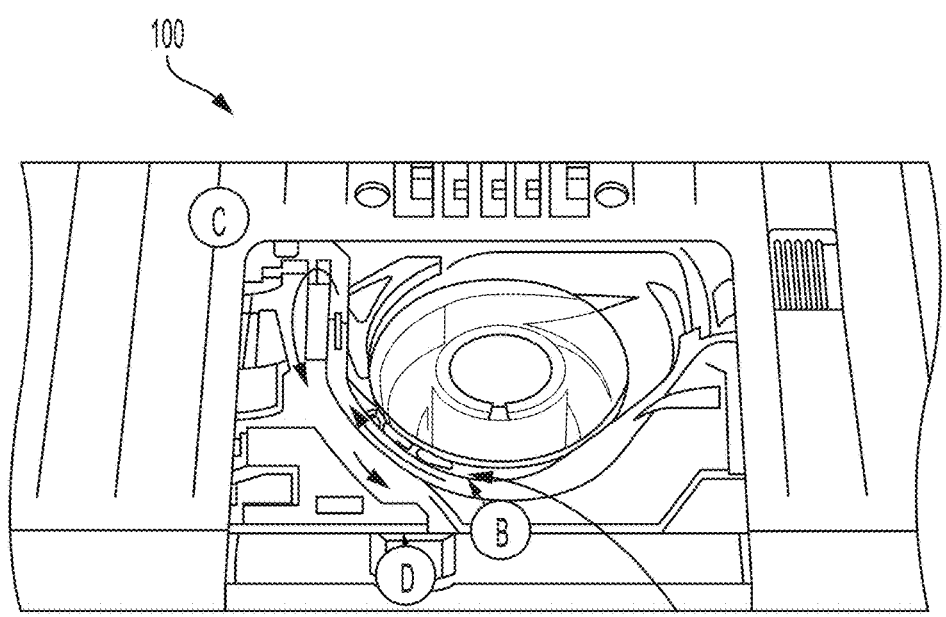
FIG. 15

THERMAL VISION

ULTRASONIC VISION

Projected onto fabric

Selections made in GUI

| USER SELECTIONS: FABRIC & THREAD WEIGHT* ||||
|---|---|---|---|
| FABRIC | THREAD | COMPATIBILITY FEEDBACK | OVERRIDE? |
| HEAVY | HEAVY | OK | YES/NO |
| LIGHT | LIGHT | OK | YES/NO |
| HEAVY | LIGHT | NOK | YES/NO |
| LIGHT | HEAVY | NOK | YES/NO |
| *WEIGHT REFERS TO ALL PHYSICAL PROPERTIES PERTAINING TO GEOMETRY, DENSITY, STRENGTH, FRICTIONAL QUALITIES OR OTHER RELEVANT CRITERIA. ||||

FIG. 64

SEWING MACHINE AND METHODS OF USING THE SAME

CROSS-REFERENCE TO RELATED CASES

This application claims the benefit of U.S. Provisional Application No. 63/278,286, filed on Nov. 11, 2021, titled "Sewing Machine and Methods of Using the Same", which is incorporated by reference herein in its entirety.

TECHNICAL FIELD

The present invention relates generally to sewing machines, and in particular to control systems thereof.

BACKGROUND OF THE INVENTION

Sewing machines can be used to form stitches in a single piece of material and to stitch together various pieces of material. Particular sewing machines can be used to form stitches in workpieces having a certain shape, cut and stitch over the edge of a workpiece, attach decorative elements to a workpiece, and cut and hem an edge of a workpiece, attach decorative sew an embroidery pattern on a workpiece that is mounted in an embroidery frame or to cut the workpiece during the sewing operation. A sewing machine can also cut, fold, roll, or otherwise manipulate the workpiece in addition to or separate from the sewing procedure. The workpiece is moved underneath the needle so that stitches can be formed in the fabric. The user configures the sewing machine for each particular application by adjusting various parameters of the machine and by attaching a variety of different tools or accessories to the machine.

SUMMARY

Exemplary embodiments of sewing machines, control systems for the same, and methods of using the same are disclosed herein.

An exemplary sewing machine includes a sewing head attached to an arm suspended above a sewing bed by a pillar, a needle bar extending from the sewing head and toward the sewing bed, a needle held by the needle bar, a motor connected to the needle bar for moving the needle bar in a reciprocating motion to move the needle and a thread through a workpiece during a sewing operation, and a user interface for receiving instructions from the user of the sewing machine and for giving feedback information to the user. The exemplary sewing machine also includes a data gathering device, a data storage device, and a processor. The data gathering device is for gathering data related to at least one of the sewing machine, an environment surrounding the sewing machine, a sewing material, the sewing operation performed by the sewing machine, and one or more interactions of the user with the sewing machine. The data storage device is for storing data gathered by the data gathering device as gathered data and for storing data related to a neural network. The neural network is made up of a plurality of nodes. Each node of the neural network has an input connection for receiving input data, a node parameter, a calculation unit for calculating an activation function based on the input data and a node parameter, and an output connection for transmitting output data. The processor is configured to processes the gathered data through the neural network to generate processed data and to control, based on the processed data, at least one of the user interface to interact with the user, the data storage device to store the processed data, and the motor to alter the sewing operation.

An exemplary method of controlling a sewing machine includes the steps of: gathering data, storing the gathered data in data storage device, processing the gathered data through a neural network, and controlling a user interface, the data storage device, and the motor based on the processed data. The step of gathering data includes gathering data related to at least one of the sewing machine, an environment surrounding the sewing machine, a sewing material, a sewing operation performed by the sewing machine, and one or more interactions of a user with the sewing machine. The neural network in the processing step has a plurality of nodes, wherein each node includes an input connection for receiving input data, a node parameter, a calculation unit for calculating an activation function based on the input data and a node parameter, and an output connection for transmitting output data. During the controlling step, the processor controls the user interface to interact with the user, the data storage device to store the processed data, and/or the motor to alter the sewing operation.

An exemplary control system for a sewing machine includes a data gathering device, a data storage device, and a processor. The data gathering device is for gathering data related to at least one of the sewing machine, an environment surrounding the sewing machine, a sewing material, the sewing operation performed by the sewing machine, and one or more interactions of the user with the sewing machine. The data storage device is for storing data gathered by the data gathering device as gathered data and for storing data related to a neural network. The neural network is made up of a plurality of nodes. Each node of the neural network has an input connection for receiving input data, a node parameter, a calculation unit for calculating an activation function based on the input data and a node parameter, and an output connection for transmitting output data. The processor is configured to processes the gathered data through the neural network to generate processed data, store processed data in the data storage device, and control, based on the processed data, at least one of a user interface to interact with the user and a motor to alter the sewing operation.

An exemplary method for calibrating one or more optical sensors on a sewing machine, including collecting data of one or more features of one or more predefined regions associated with the sewing machine, processing the data through one or more neural networks, wherein the one or more neural networks detect and recognize the one or more features of the one or more predetermined regions from the data, calculating one or more accuracy indicators of the one or more features from the data as compared to one or more trained features from the one or more neural networks, comparing the value of the one or more accuracy indicators to one or more indicator thresholds and adjusting one or more parameters of one or more optical sensors based on the comparison between the one or more accuracy indicators and the one or more indicator thresholds An exemplary sewing machine having a sewing head attached to an arm suspended above a sewing bed by a pillar, a needle bar extending from the sewing head and toward the sewing bed, wherein the needle bar holds a needle, a presser bar with a presser foot extending away from the sewing head and toward the sewing bed, one or more optical sensors arranged to collect data from one or more features of one or more predefined regions associated with the sewing machine, and one or more processors for processing the data collected by the one or more optical sensors through one or more neural networks. The one or more processors are configured to receive the data from the one or more optical sensors, process the data through the one or more neural networks, wherein the one or more neural networks detects and recognizes the one or more features of the one or more predetermined regions from the data, calculate one or more accuracy indicators of the one or more features from the data as compared to a trained feature from the one or more neural networks, compare the value of the one or more accuracy indicators to one or more indicator thresholds, and adjust one or more parameters of the one or more optical sensors based on the comparison between the one or more accuracy indicators and the one or more indicator thresholds.

An exemplary sewing machine, having a sewing head attached to an arm suspended above a sewing bed by a pillar, a needle bar extending from the sewing head and toward the sewing bed, wherein the needle bar holds a needle, a presser bar with a presser foot extending away from the sewing head and toward the sewing bed, one or more data gathering devices associated with the sewing machine and arranged to collect data from one or more features of one or more predefined regions associated with the sewing machine, and one or more processors for processing the data collected by the one or more data gathering devices through one or more neural networks. The one or more processors are configured to receive the data from the one or more data gathering devices, process the data through the one or more neural networks, wherein the one or more neural networks detects and recognizes the one or more features of the one or more predetermined regions from the data, calculate one or more accuracy indicators of the one or more features from the data as compared to a trained feature from the one or more neural networks, compare the value of the one or more accuracy indicators to one or more indicator thresholds, and adjust one or more parameters of the one or more data gathering devices based on the comparison between the one or more accuracy indicators and the one or more indicator thresholds A further understanding of the nature and advantages of the present invention are set forth in the following description and claims, particularly when considered in conjunction with the accompanying drawings in which like parts bear like reference numerals.

BRIEF DESCRIPTION OF THE DRAWINGS

To further clarify various aspects of embodiments of the present disclosure, a more particular description of the certain embodiments will be made by reference to various aspects of the appended drawings. It is appreciated that these drawings depict only typical embodiments of the present disclosure and are therefore not to be considered limiting of the scope of the disclosure. Moreover, while the figures can be drawn to scale for some embodiments, the figures are not necessarily drawn to scale for all embodiments. Embodiments and other features and advantages of the present disclosure will be described and explained with additional specificity and detail through the use of the accompanying drawings in which:

FIGS. 1-18 show various views and diagrams relating to an exemplary sewing machine and the systems thereof;

FIGS. 43-65 show various views relating to an exemplary fabric and thread compatibility monitoring feature of an exemplary sewing machine;

DETAILED DESCRIPTION

The following description refers to the accompanying drawings, which illustrate specific embodiments of the present disclosure. Other embodiments having a different structure and operation do not depart from the scope of the present disclosure. Exemplary embodiments of the present disclosure are directed to sewing machines and accessories for use with the same.

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members, or elements. Also as described herein, the terms "substantially" and "about" are defined as at least close to (and includes) a given value or state (preferably within 10% of, more preferably within 1% of, and most preferably within 0.1% of).

Figure 1:
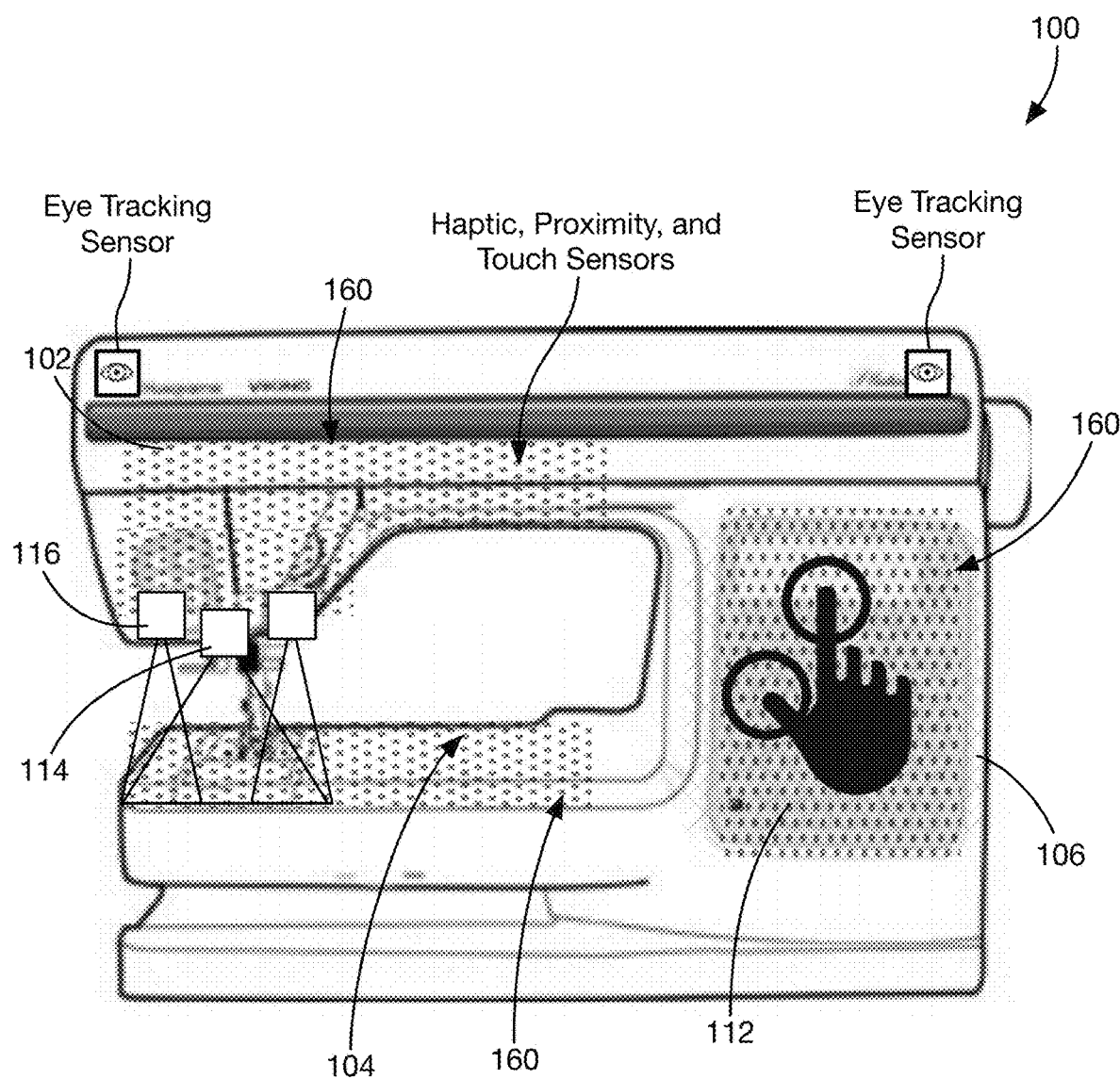
Figure 2:
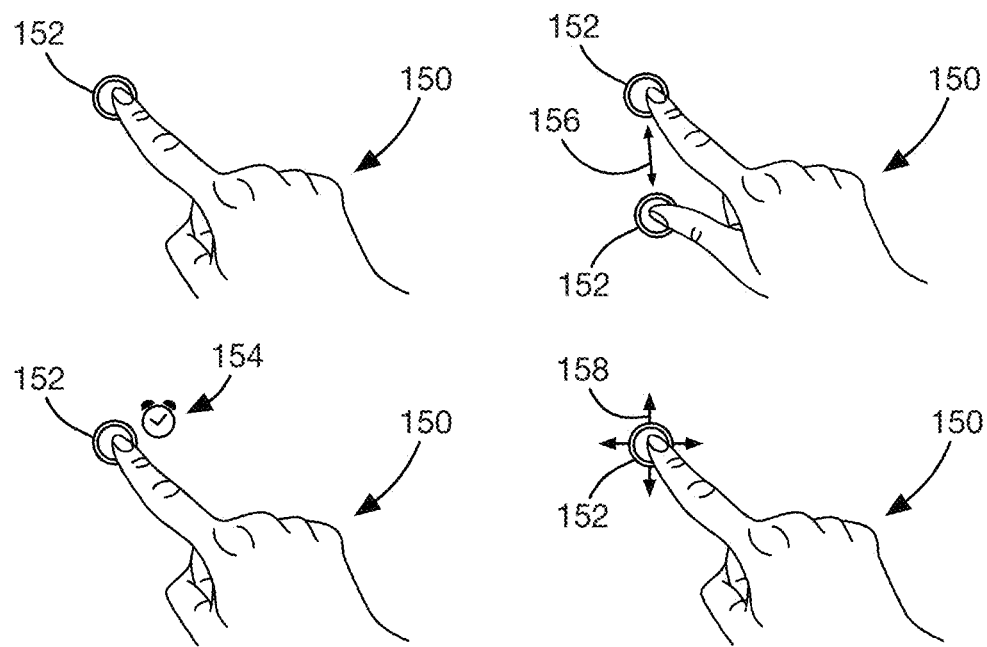
Figure 3:
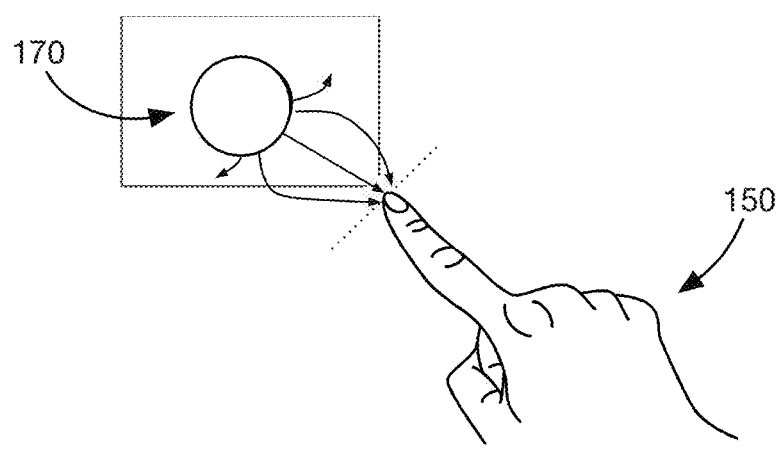
Figure 4:
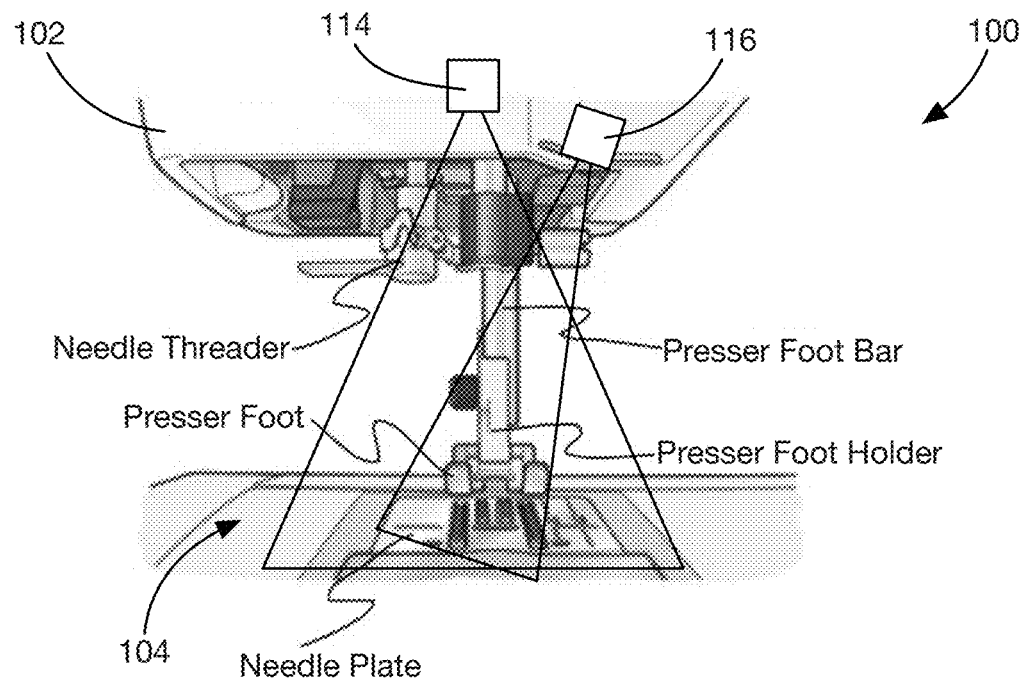
Figure 5:
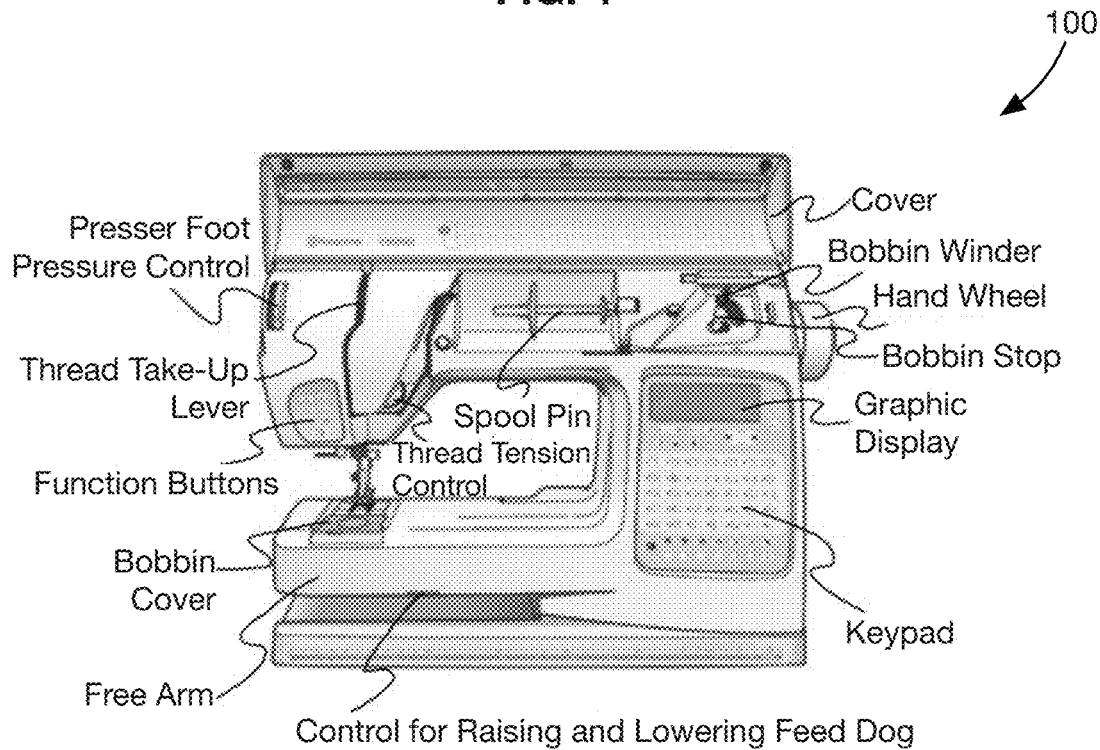
Figure 6:
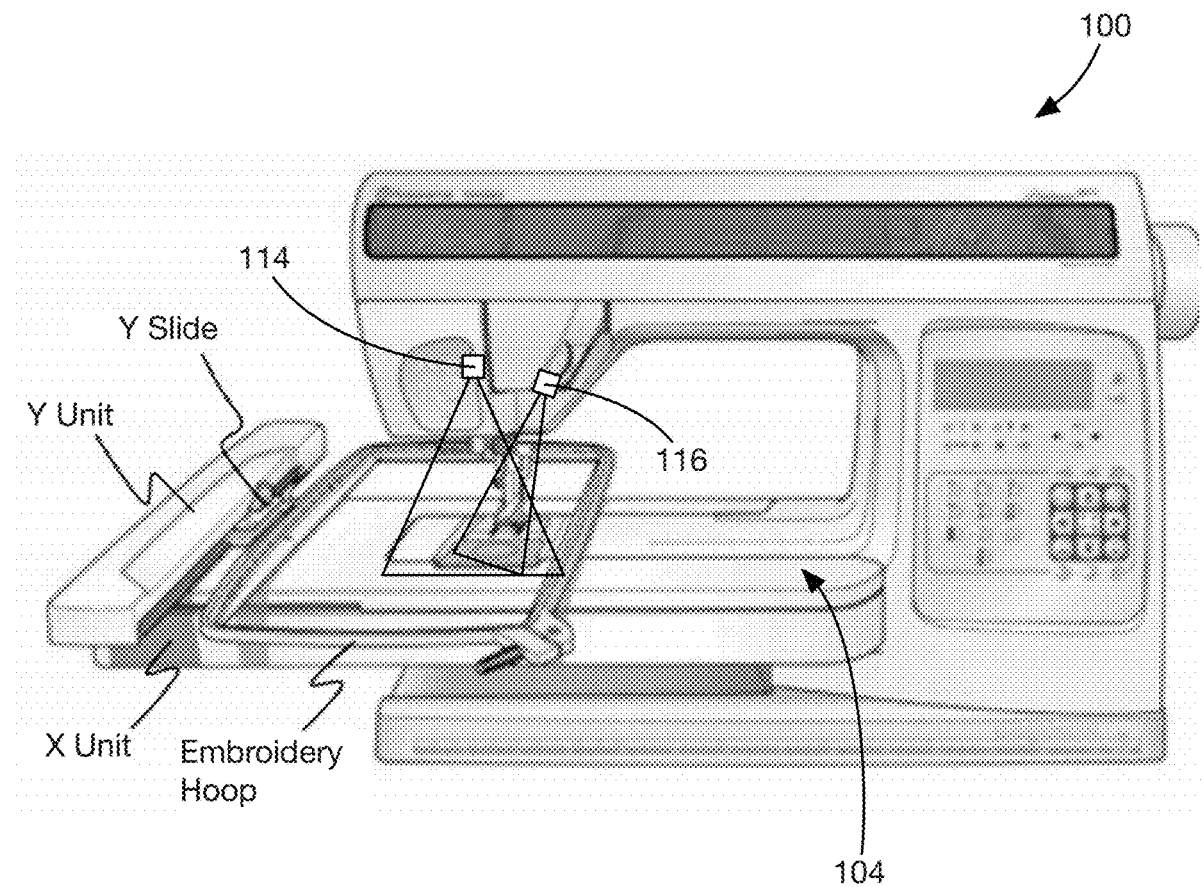

Referring now to FIGS. 1-18 and 90-95, various views and diagrams of exemplary sewing machines and portions thereof are shown. An exemplary sewing machine, such as the sewing machine 100 shown in FIG. 1, includes a sewing bed or base 104 having a pillar 106 extending upward from one end to support an arm that extends horizontally above the sewing bed. A sewing head 102 is attached to the end of the arm and can include one or more needle bars 108 for moving one or more needles 110 up and down for sewing a workpiece on the sewing bed 104 below the sewing head 102. The sewing bed includes a needle or stitch plate arranged below the sewing head that has openings for the needle or needles 110 to pass through when making or forming stitches in the workpiece. In some sewing machines, a bobbin arranged beneath the needle plate assists in stitch formation and dispenses a lower thread that is stitched together with an upper thread delivered through the workpiece from above by the needle. In other sewing machines, such as, for example, an overlock or serger machine, lower threads are dispensed by loopers. The user can interact with the sewing machine 100 via a wide variety of buttons, knobs, switches, and other user interface elements. A touch-screen display 112 can also be used to both present a software-based user interface to the user and to receive input from the user. A projector 114 arranged in the sewing head 102 can be used to project one or more user interface elements onto the sewing bed 104 or a workpiece placed thereon. One or more cameras 116 arranged in the sewing head 102 or elsewhere around the sewing machine 100 gather information from the workpiece and environment surrounding the sewing machine 100 that can be used to enhance the performance and user experience of the sewing machine 100.

As used herein, "sewing machine" means a device that forms one or more stitches in a workpiece with a reciprocating needle and a length of thread. "Sewing machine" as used herein includes, but is not limited to, sewing machines for forming particular stitches (e.g., a sewing machine configured to form a lock-stitch, a chain stitch, a buttonhole stitch), embroidery machines, quilting machines, overlock or serger machines, or the like. It should be noted that various embodiments of sewing machines and accessories are disclosed herein, and any combination of these options can be made unless specifically excluded. In other words, individual components or portions of the disclosed devices can be combined unless mutually exclusive or otherwise physically impossible.

A "stitch" means a loop formed with one or more threads, wherein at least one of thread passes through a hole formed in a workpiece. The mechanical components of the sewing machine—e.g., needles, hooks, loopers, thread tensioning devices, feed mechanisms, and the like—cooperate to form stitches in one or more pieces of a workpiece. One repetition of this complex mechanical dance can form one stitch or a pattern of stitches in the workpiece. A "stitch length" of the repetition or pattern refers to a distance that the workpiece is moved as the repetition is performed. The stitch length measurement is different for different types of repetitions and patterns and can encompass one or more stitches in the workpiece.

A presser bar with a presser foot also extends downward from the sewing head to press the workpiece against the sewing bed and against feed dogs that move from back-to-front and optionally side-to-side to move the workpiece. The feed dogs move the workpiece in coordination with the presser foot and with a speed that can be fixed or can be variably controlled by the user, such as with a foot pedal. A wide variety of presser feet and other types of accessories can be attached to the presser bar to assist in the formation of certain kinds of stitches or features in the workpiece, such as, for example, a buttonhole presser foot. An accessory mount can also extend below the sewing head for holding a special tool or accessory on or above the sewing bed.

The speed or frequency with which the needle bar is moved up and down is controlled by the user as noted above. While the needle bar typically moves up and down in a cyclical motion to form a stitch in the workpiece, the needle bar can also be moved simultaneously from side-to-side to form a different stitch, such as a zig-zag stitch or a tapered stitch, or to alter the width of a stitch. The type and pitch of the stitch performed by the machine can be selected by the user via a manual interface including buttons, knobs, levers, or the like, via a user interface presented on a touch screen by a computer, or via a voice control interface.

Different types of sewing machines can include additional components for forming stitches in or otherwise manipulating the workpiece during the sewing process. For example, in a serger, a type of sewing machine that can be used for forming edges of a workpiece, among other functions, needles called loopers operate below the sewing bed to deliver lower threads for forming various stitches. A serger can also include two, three, or more needles above the needle plate and a knife for cutting the edge of the workpiece. A sewing machine can also be used to create embroidery patterns in a workpiece by including a holder for an embroidery hoop on the sewing bed (e.g., FIG. 6). The embroidery hoop holder can be actuated in at least two axes so that a controller of the sewing machine can cause the embroidery frame to be moved so that the needle traces out an embroidery pattern on the workpiece.

Figure 7:
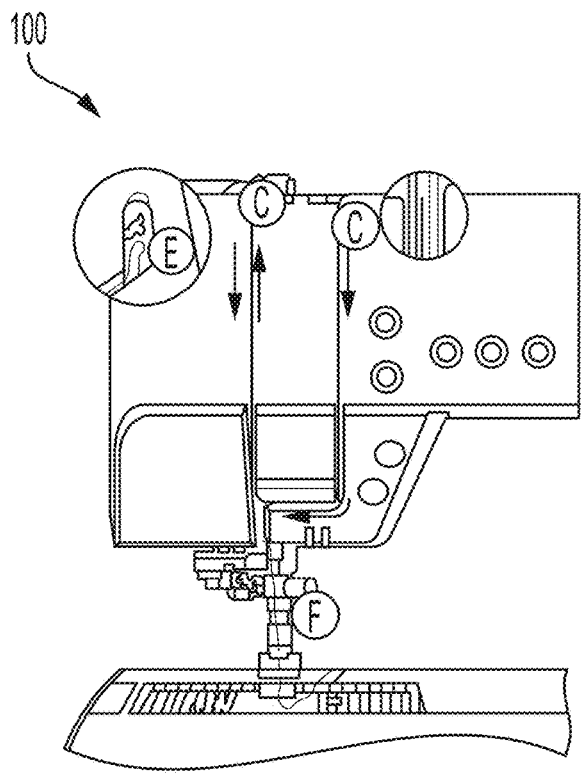
Figure 8:
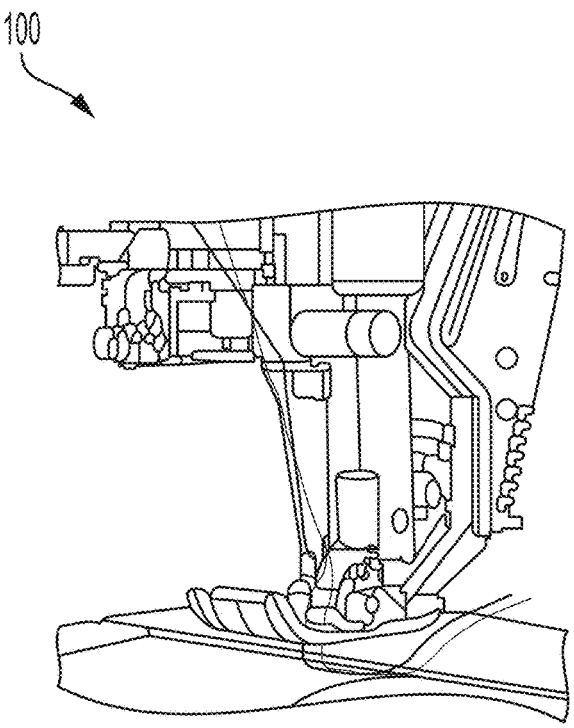
Figure 9:
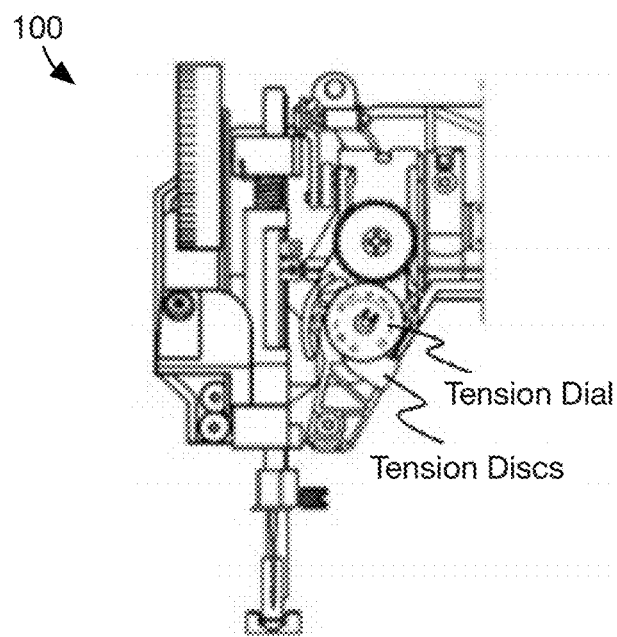

Thread used during sewing is held in various locations on the sewing machine, such as, for example, inside the bobbin (FIGS. 13-15) or on a spool held by a spool holder that is part of or extends above the arm of the sewing machine (FIGS. 10-12). Thread is led from the thread source (e.g., a bobbin or spool) and to the needle or needles of the sewing machine through various other elements of the sewing machine arranged to change the direction of the thread so that the thread is smoothly withdrawn and delivered to the workpiece with as little damage to the thread as possible (FIGS. 7-9). The tension of the thread can also be altered by various tensioning devices arranged along the thread path or within the thread source. Thread tensioning devices and portioning devices ensure that only a desired amount of thread is dispensed and that the thread forming stitches in the workpiece is appropriately tightened. Loose threads can allow stitches to come undone and tight threads can cause stitches to be formed incorrectly. The thread tension on the upper and lower threads can also be adjusted to ensure that tension forces are balanced from above and below so that stitches are properly formed along the desired sewing path in the workpiece.

Figure 16:
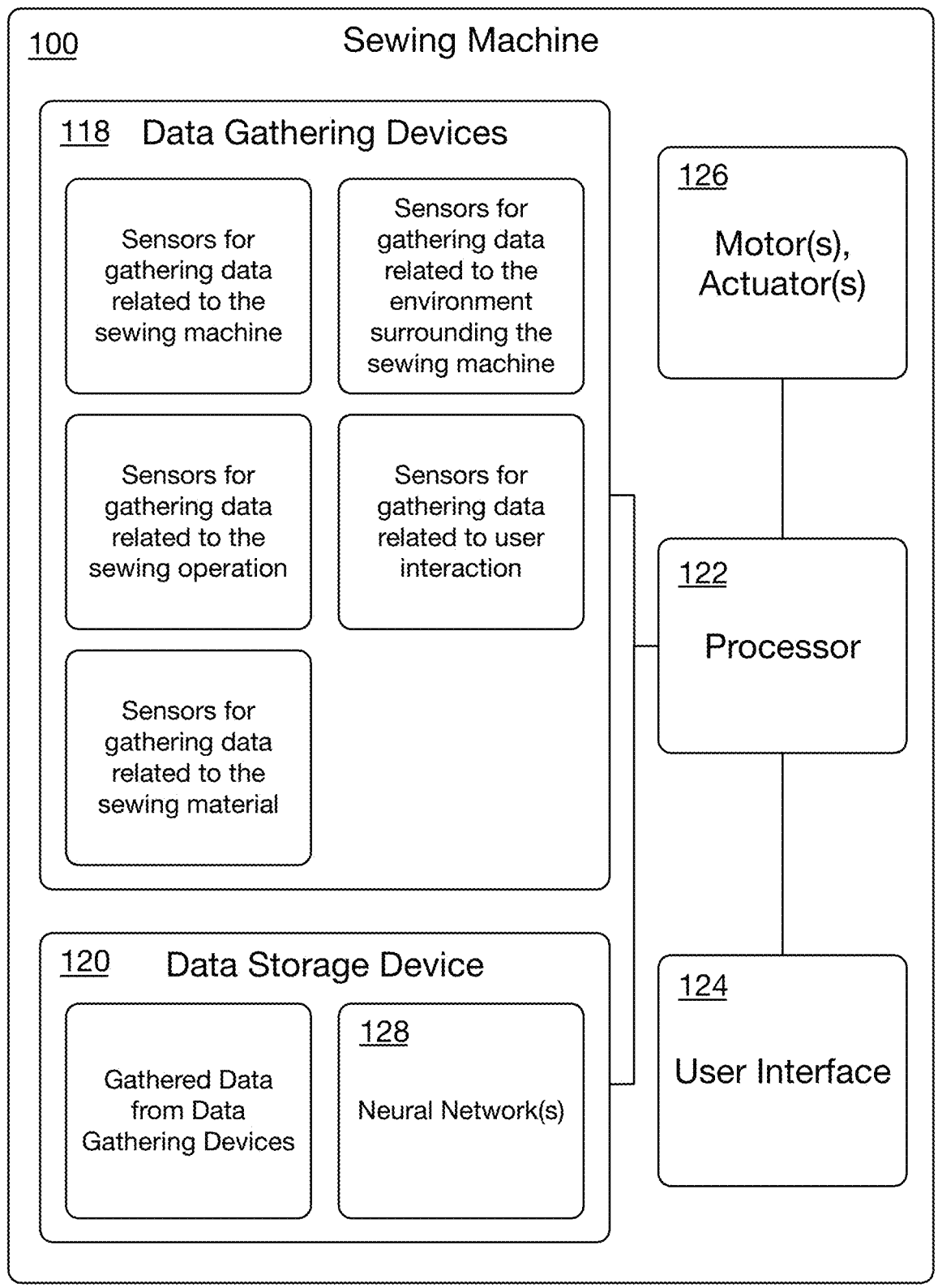

Referring now to FIG. 16, a block diagram of the computer-based control system for the sewing machine 100 is shown. The sewing machine includes: one or more data gathering devices 118, one or more data storage devices 120, a processor 122, a user interface 124, and motors and actuators 126. The sewing machine 100 can also include a network interface that interfaces with the processor 122 and is used to connect the sewing machine 100 to a cloud system and/or other sewing machines or devices via a wireless network. The data gathering devices 118 include a wide variety of digital sensors, analog sensors, active sensors, passive sensors, and software components, as are described in greater detail below. These sensors gather data related to the sewing machine itself, the workspace or environment surrounding the sewing machine, the sewing operation being performed by the sewing machine, the interaction of the user with the sewing machine, and the sewing material operated on by the sewing machine (e.g., fabric and thread). The data storage devices 120 include one or more computer memory chips for storing data gathered by the data gathering devices 118 and the operating software of the sewing machine 100. The structure, various functions, and parameters of one or more neural networks 128 is also be stored by the data storage devices 120. The processor 122 accesses the data stored on the data storage devices 120 and executes the operating software to give function to the sewing machine 100. The user interface 124 is presented to the user via the touch screen display 112 and via physical controls such as buttons, levers, dials, lights, speakers, actuators, and the like. The motors and actuators 126 include electro-mechanical actuators, motors, general mechanical components that are controlled by the control system to cause the movement of the various moving parts of the sewing machine—i.e., the needle bars, feed dogs, bobbin, loopers, and the like. For example, the speed of the motors can be controlled directly by input from a foot pedal that is actuated by the user or can be controlled via the computer that receives and interprets the foot pedal input before sending a signal to one or more motor controllers that control the motors of the sewing machine.

"Computer" or "processor" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), reduced instruction set computing (RISC) processors, digital signal processors (DSPs), field programmable gate arrays (FPGAs), etc. One or more cores of a single microprocessor and/or multiple microprocessor each having one or more cores can be used to perform the operations described as being executed by a processor herein. The processor can also be a processor dedicated to the training of neural networks and other artificial intelligence (AI) systems. The processor or processors can be locally installed on the sewing machine and can be provided in a remote location that can be accessed via a network interface.

"Network interface" or "data interface" as used herein includes, but is not limited to, any interface or protocol for transmitting and receiving data between electronic devices. The network or data interface can refer to a connection to a computer via a local network or through the internet and can also refer to a connection to a portable device—e.g., a mobile device or a USB thumb drive—via a wired or wireless connection. A network interface can be used to form networks of computers to facilitate distributed and/or remote computing (i.e., cloud-based computing). "Cloud-based computing" means computing that is implemented on a network of computing devices that are remotely connected to the sewing machine via a network interface.

"Logic," synonymous with "circuit" as used herein includes, but is not limited to, hardware, firmware, software and/or combinations of each to perform one or more functions or actions. For example, based on a desired application or needs, logic may include a software-controlled processor, discrete logic such as an application specific integrated circuit (ASIC), programmed logic device, or other processor. Logic may also be fully embodied as software. "Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules, or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created.

As used herein, "data storage device" means a device or devices for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., ROM, PROM, EPROM, EEPROM, flash PROM, external flash memory drives, etc.

The user interface of the sewing machine can include a wide variety of input devices and means of communicating with the user, such as, for example, buttons, knobs, switches, lights, displays, speakers, touch interfaces, and the light. The user interface for the sewing machine can be presented graphically to the user via one or more displays, including the touch-screen display 112 that includes a touch sensitive overlay to detect the location of the fingers of the user that are touching the display. Thus, the user can interact with the user interface by directly touching the screen in particular locations with their hand 150 and by performing touch gestures, such as the touch 152, touch 152 and hold 154, touch 152 and pinch or spread 156, and touch 152 and move 158 gestures shown in FIG. 2. The presence, position, and movement of the hands, fingers, or eyes of the user can also be detected via analysis of data from an optical sensor (e.g., a camera) or a proximity sensor (e.g., FIG. 3) via disturbances of sound, light, infrared radiation, or electromagnetic fields. A graphical user interface can also be projected by one or more projectors of the sewing machine onto the sewing bed 104, a workpiece, an adjacent surface such as a wall or a table, or any other suitable surface. Alternatively, the sewing machine 100 can be operated without a graphical user interface via voice commands and audible feedback in the form of certain sounds and/or a computerized voice. Tactile feedback can also be provided via actuators that cause various portions, such as feedback portions 160, of the machine to vibrate when acted upon or in response to a wide variety of conditions of the workpiece, machine, or the like. Audible and tactile interaction with the sewing machine is particularly useful to users whose vision is impaired.

Figure 17:
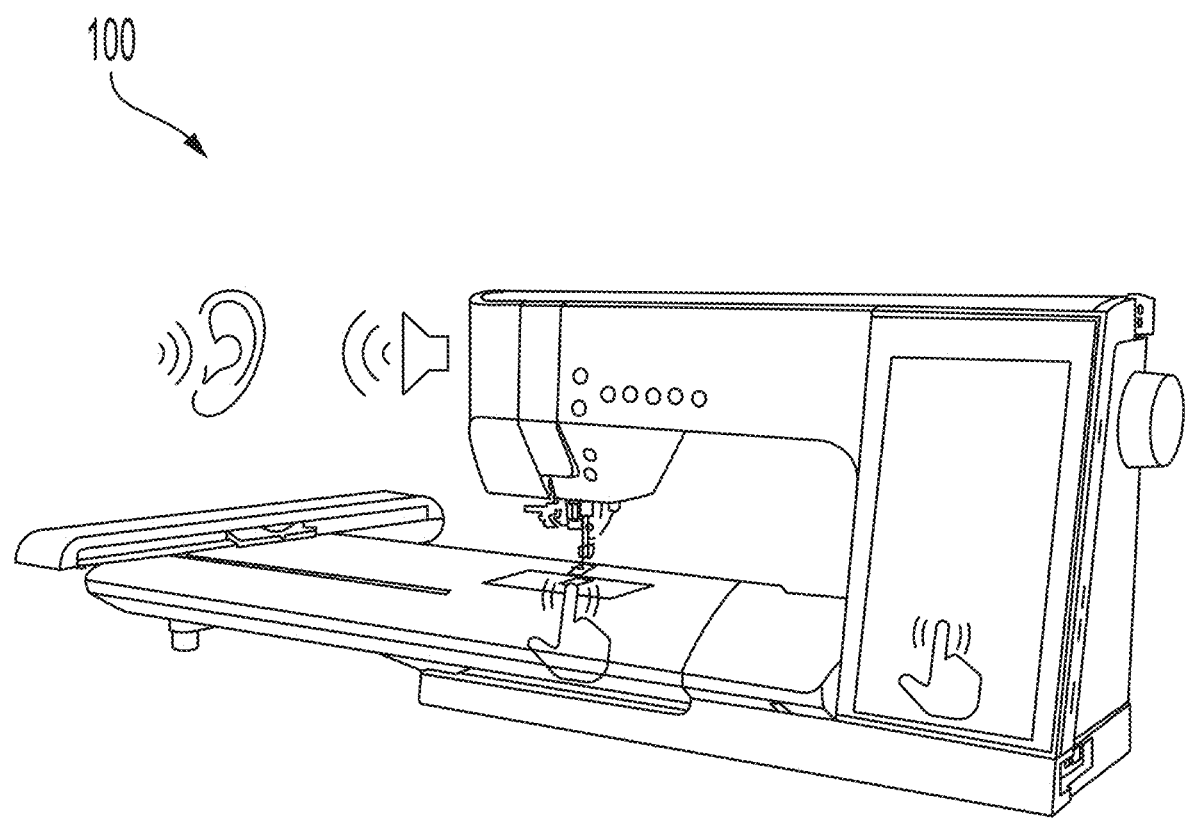
Figure 18:
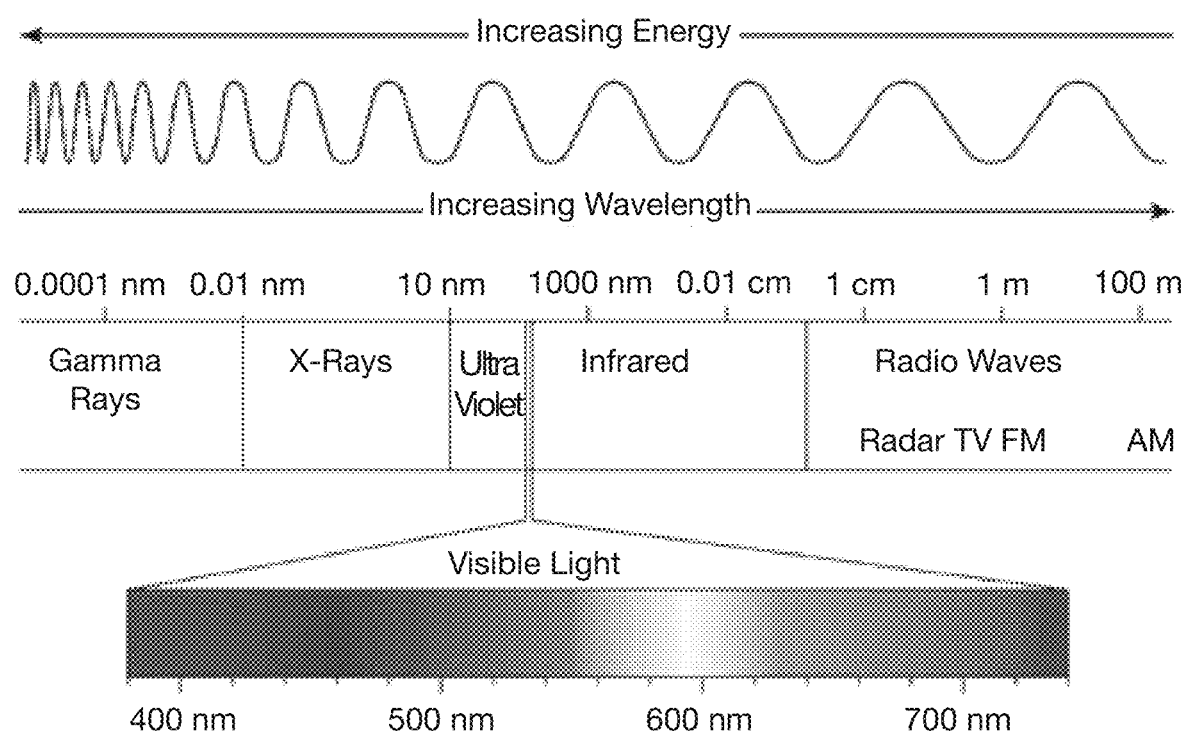

As can be seen in FIG. 17, the sewing machine 100 can provide notifications and feedback to the user through visual, audible, and tactile means. For example, an indication that an incorrect accessory has been installed on the machine can be presented to the user via the user interface on the display of the sewing machine while a notification sound—e.g., a beep or a computerized voice—is transmitted to the user via speakers in the sewing machine. The notification can also be transmitted to the user via haptic or tactile feedback through vibration of feedback portions 160 of the sewing machine 100 being touched by the user. That is, the sewing bed 104 can be vibrated by the sewing machine to provide a warning to the user that the machine is not properly configured for the particular sewing operation selected by the user. The user would feel the vibrations below their fingers that are in contact with the workpiece and sewing bed, thereby prompting the user to look at the display for further information. The illuminating lights of the sewing machine can also be controlled to alert the user, such as by changing the color of flashing when an incorrect accessory is installed so that the user is prompted to look at the display for additional information.

A projector 114 can also be provided in the sewing head 102 and directed downward toward the sewing bed 104 and workpiece, as is shown in FIGS. 1, 4, 92, and 94. The projector 114 is arranged to project useful information onto the workpiece to aid the user in the use of the sewing machine. For example, the projector 114 can project the needle drop point down onto the fabric so that the user can see the location of the needle before a stitch is made. Lines or other guides can also be projected onto the workpiece to assist the user in sewing in a straight line or along a desired path. Similar to a guide, the projector 114 can project a selected stitch pattern onto the workpiece to represent stitches that are planned. The projector 114 is also capable of projecting images onto the workpiece to display a chosen embroidery pattern onto the workpiece so that the user can position the embroidery pattern onto the workpiece in a desired location. The information projected by the projector 114 can also include feedback to the user as to the status of the machine or a particular sewing operation. For example, the projector 114 could project a warning notification onto the workpiece that the incorrect needle has been installed for the type of material being used as the workpiece. The projector 114 can also provide visual instructions to aid the user, such as, for example, still or animated images instructing the user in how to change a needle, thread the machine, or rotate a workpiece. In other words, the projector 114 can be used by the computer as another means of providing feedback and instructions to the user. It should also be noted that the images projected by the projector 114 can also be detected by an optical sensor so that the user's interaction with those images, such as, for example, by touching the projected images of a button or series of buttons so that the sewing machine can respond to the interaction of the user with the projected images.

A wide variety of data gathering devices 118—i.e., digital sensors, analog sensors, active sensors, passive sensors, and software components—can be employed by the sewing machine 100 to acquire data related to the sewing machine itself, the workspace or environment surrounding the sewing machine, the sewing material operated on by the sewing machine (e.g., the fabric workpiece and thread used to form stitches), the sewing operation performed by the sewing machine, and interactions of the user with the sewing machine. A non-exhaustive list of the types of sensors for the sewing machine 100 includes: acoustic, sound, vibration, chemical, biometric, sweat, breath, fatigue detection, gas, smoke, retina, fingerprint, fluid velocity, velocity, temperature, optical (e.g., a camera), light, infrared, ambient light level, color, RGB color (or another color space sensor, such as those using a CMYK or grey scale color space), touch, tilt, motion, metal detector, magnetic field, humidity, moisture, imaging, photon, pressure, force, density, proximity, ultrasonic, load cell, digital accelerometer, motion, translation, friction, compressibility, voice, microphone, voltage, current, impedance, barometer, gyroscope, hall-effect, magnetometer, GPS, electrical resistance, tension, strain, and many others. Software-based data gathering devices 118 can include various data logs that are populated as the sewing machine 100 is used. For example, user activity logs can record events involving input from the user via the user interface 124 and system event logs can record software events that occur during the normal use of the sewing machine 100 that can be used for machine learning or diagnostic purposes.

The sensors can be arranged in a wide variety of locations on the machine and can be employed by the sewing machine in a wide variety of ways. For example, the sewing machine can include touch and proximity sensors 170 (e.g., the proximity sensor 170 shown in FIG. 3) for providing touch control of the user interface presented on a display of the sewing machine. Similar touch or proximity sensors can also be provided in other locations of the sewing machine, such as on the arm or the sewing bed. Touch sensors in these other locations can be used in conjunction with a user interface presented to the user or can be used to monitor the location of the user's hands (or other foreign objects, such as the user's hair or loose sewing pins) on the machine during the sewing process for safety purposes. The sewing machine can also include eye tracking sensors that incorporate optical sensors such as cameras or other detection means for tracking the eye position and/or line of sight of the user. One or more optical sensors on the machine can be used not only to collect data related to the user of the machine, but also to collect data related to the workpiece, other sewing materials such as the thread, and the sewing machine itself. Additional examples of the use of sensors and sensor data by the sewing are provided throughout the present disclosure.

Many of the sensors used in the sewing machine require calibration after installation to ensure that the data gathered by the sensor and provided to the neural network is accurate. The calibration of the sensors can also be updated in the field on a periodic basis or when designated by the user. The sensors can be calibrated in any suitable way. Calibration of the camera, for example, can be performed using techniques described in U.S. Pat. No. 8,606,390, the entirety of which is incorporated herein by reference. The camera and other sensors can also be calibrated with techniques that employ the neural network; e.g., to identify features of the sewing machine when calibrating the camera.

One or more optical sensors of the sewing machine can be arranged at a wide variety of locations around the sewing machine. An "optical sensor" as used herein means a sensor capable of gathering data from electromagnetic radiation (see FIG. 18) and can include, but is not limited to, a sensor for detecting ultraviolet radiation, visible light, infrared radiation, and the like. Certain optical sensors can be tuned to a particular wavelength of electromagnetic radiation, such as, for example, a certain wavelength of laser light. One particular optical sensor that can be used in an exemplary sewing machine is a camera. A camera can include a lens for focusing or otherwise redirecting light onto a sensor that receives the optical data and transmits the optical data to another device for processing.

The one or more optical sensors can be arranged in the sewing machine to observe the workpiece during the sewing process, such as the camera 116 shown in FIGS. 1, 4, 6, 93, and 95. The optical sensor or optical sensors watching the workpiece can be used to determine the color of the workpiece, the material of the workpiece, the location of the workpiece, the orientation of the workpiece, the magnitude and direction of movement of the workpiece, and the like. The same optical sensors can also be used to detect objects in the sewing area, such as the user's hands, hazardous objects (e.g., hair, clothing of the user, sewing pins, etc.), the type of needle or needles installed in the sewing machine, the type of presser foot, or the like. The optical sensors can also monitor whether the needle, presser foot, stitch plate, or accessory are properly installed and remain properly installed during use. Additional optical sensors or similar sensing devices can be arranged on the machine facing the user to provide the computer of the sewing machine with information about the user, such as, for example, the position and line of sight of the eyes of the user so that the sewing machine can determine where on the machine the user is looking. Tracking the user's eyes and current line of sight can, for example, allow the sewing machine to determine where best to illuminate the sewing bed or present useful information to the user so that an important notification or warning is not missed.

Various security features can be included in the sewing machine to restrict access to and to prevent the theft of the sewing machine. When the machine is powered on or awoken from a sleep mode, for example, the user can be presented with a prompt requiring the user to prove their identity. The user can then enter a predetermined code to prove that they are a user with permission to access and use the sewing machine. In addition to or in place of the predetermined code, the user can provide biometric information as proof of identity, for example, via a fingerprint sensor or facial recognition. The fingerprint sensor can be included on the sewing bed or in another location where the user typically places their hands to use the machine. One or more user-facing cameras enable the sewing machine to use facial recognition techniques to identify the user for the purposes of providing access to the machine.

The user can also associate another device with their account on the sewing machine and use that device to unlock the sewing machine. For example, an app on a smart phone or tablet can be associated with a user account so that the sewing machine can be unlocked via the app or by holding the smart phone or tablet within a predetermined range of the sewing machine. Any of these means of authenticating the user can be used individually and can also be used together to provide two-factor authentication. A phone number that can receive text messages can also be associated with the account of the user so that a code can be sent for use in two-factor authentication. These other devices or phones can also receive alerts from the sewing machine that are generated when other attempts to access the machine fail, for example, after a predetermined number of attempts to access the sewing machine. If the sewing machine is believed to be stolen, these other devices can be used to determine the location of the sewing machine via the GPS sensor in the sewing machine or via other means, such as local networks detected by the sewing machine. Additionally, alerts resulting from the machine being moved from its normal location(s) or failed attempts to access the machine can include the location of the sewing machine as determined by the onboard GPS sensor to facilitate the recovery of the sewing machine if relevant.

Figure 19:
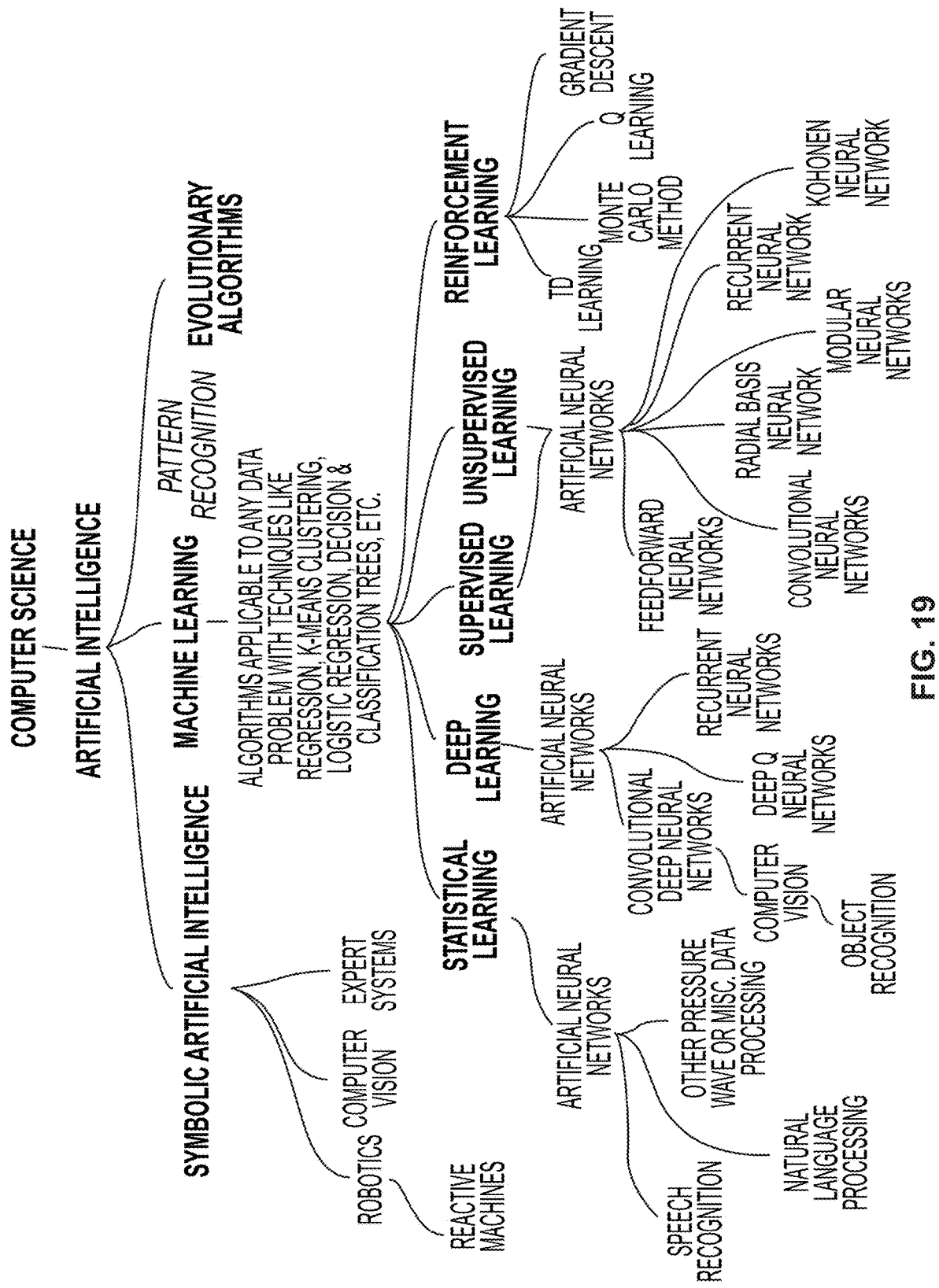
FIGS. 19-23B show diagrams and flowcharts related to artificial intelligence and neural networks.

To process and act on the wide variety of data provided to the computer or computers located internal to and/or external of the sewing machine via the sensors described above, various artificial intelligence ("AI") tools and techniques are employed (see, e.g., FIG. 19), enabling analysis of extremely large structured or unstructured and changing data sets, deductive or inductive reasoning, complex problem solving, and computer learning based on historical patterns, expert input, and feedback loops. "Artificial intelligence," as used herein, means a wide field of tools and techniques in the field of computer science that enable a computer to learn and improve over time. FIG. 19 shows a non-exhaustive outline of these tools, such as, for example, symbolic artificial intelligence, machine learning, and evolutionary algorithms. As can be seen from FIG. 19, artificial neural networks can be used in a variety of machine learning applications and can employ various learning methods including, but not limited to, statistical learning, deep learning, supervised learning, unsupervised learning, and reinforcement learning. Artificial intelligence enables the sewing machine to adapt to situations not anticipated or exactly predicted by the programmers of the software and facilitates sophisticated yet intuitive ways of interacting with the sewing machine to achieve a desired outcome. That is, the AI tools and techniques described herein are used by the computer or computers that are integrated in or external to the sewing machine to make decisions in support of or to benefit the user based on the data provided to the computer via the sensors described herein. While a particular artificial intelligence tool may be described below (e.g., a neural network), other artificial intelligence tools can be used for the same task so that the description of one tool or technique should not be viewed as limiting the application to only that tool or technique unless otherwise stated herein.

Figure 20:
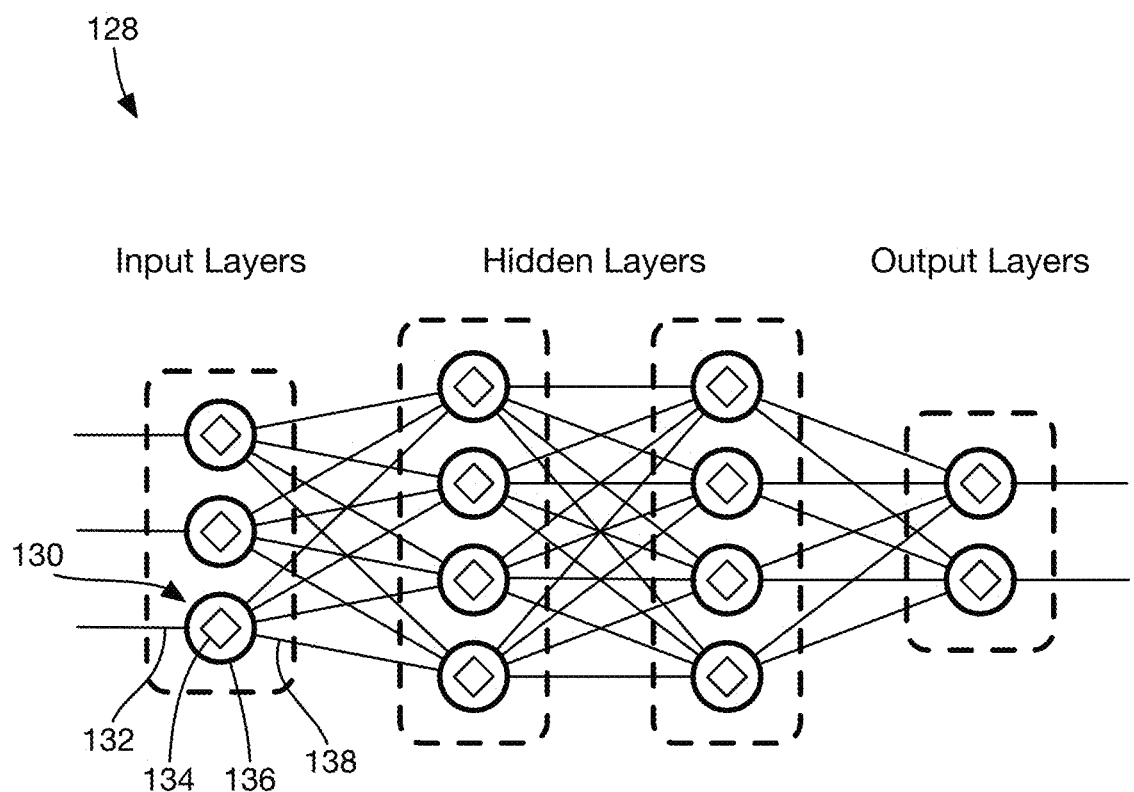

Neural network diagrams and processes related to the same are shown in FIGS. 20-23. A "neural network" as used herein, includes, but is not limited to, a plurality of interconnected software nodes or neurons that are arranged into a plurality of layers, such as, for example, input layers, hidden layers, and output layers as can be seen in FIG. 20. FIG. 20 shows a diagram of a neural network 128 that includes nodes 130 arranged in various layers. Like neurons in the human brain, each node 130 can have one or more input connections 132 and output connections 138 to create a many-to-many relationship with the other nodes 130 in the network. That is, the output of a single node can be connected to the input of many different nodes and a single node can receive as input the output of many different nodes.

Figure 21:
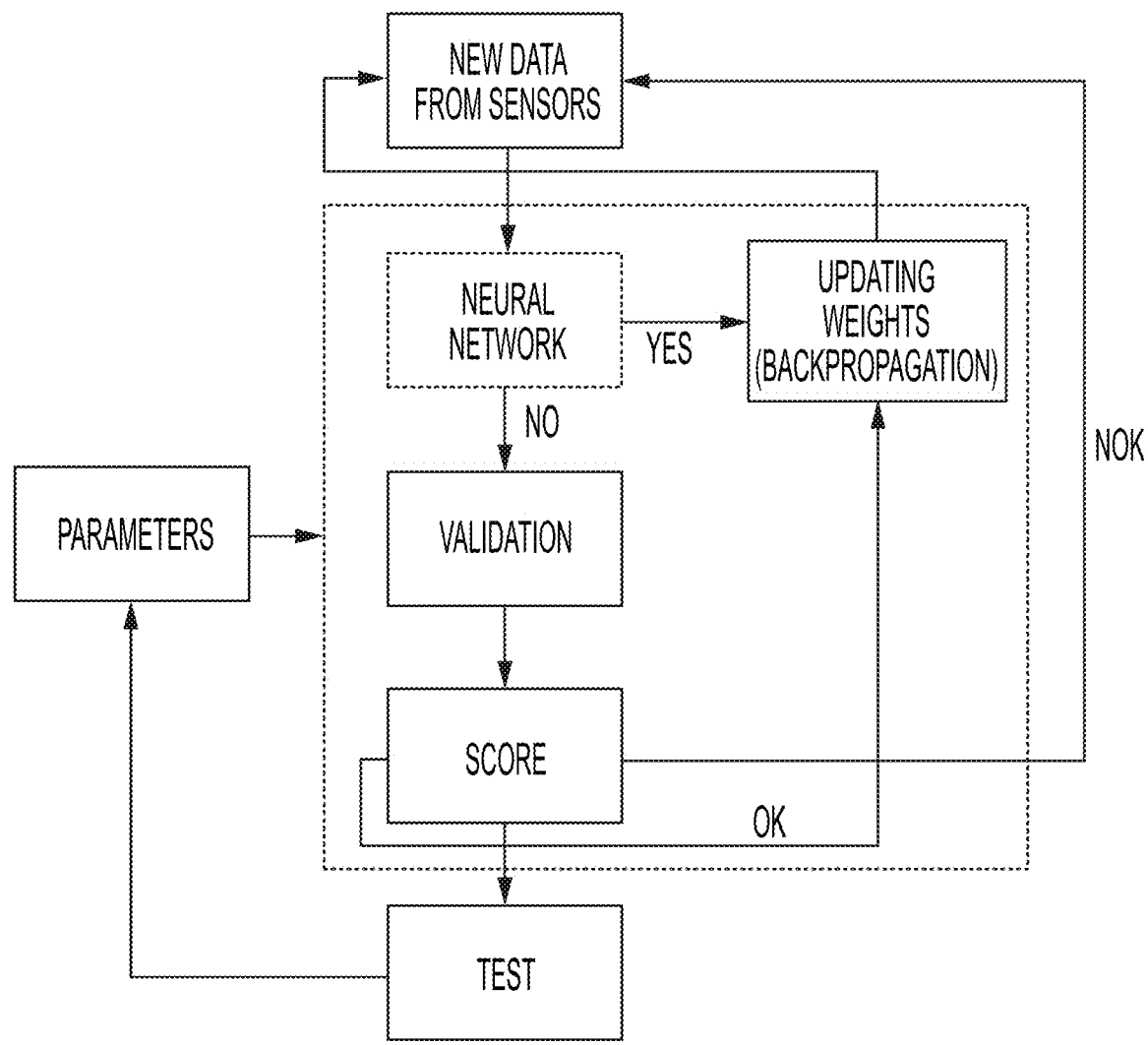

Each node 130 of the network is configured to perform calculations on the data from other nodes and to calculate output data in conjunction with node parameters that are adjusted during the training process for the neural network (FIG. 21). That is, each node of the network is a computational unit that has one or more input connections for receiving input data from nodes in a previous layer of the network and one or more output connections for transmitting output data to nodes in a subsequent or next layer in the network. Each node 130 includes a calculation unit 136 for calculating the result of an activation function that can incorporate the input data received via the input connections, input parameters associated with each input connection, and an optional function parameter 134 to compute output data that can be further modified by an output parameter. For example, the input data from each input connection can be modified by the associated input parameter—e.g., a weight parameter—for that input connection to provide a relative weight for the input connection. The result of the activation function—which can be modified by the optional function parameter—is transmitted as output data via the output connection to nodes in subsequent layers of the neural network. The optional function parameter can be, for example, a threshold value so that the calculated result of the activation function is only transmitted to other nodes as output data when the combined weighted input data exceeds the threshold set by the threshold value.

Figure 22:
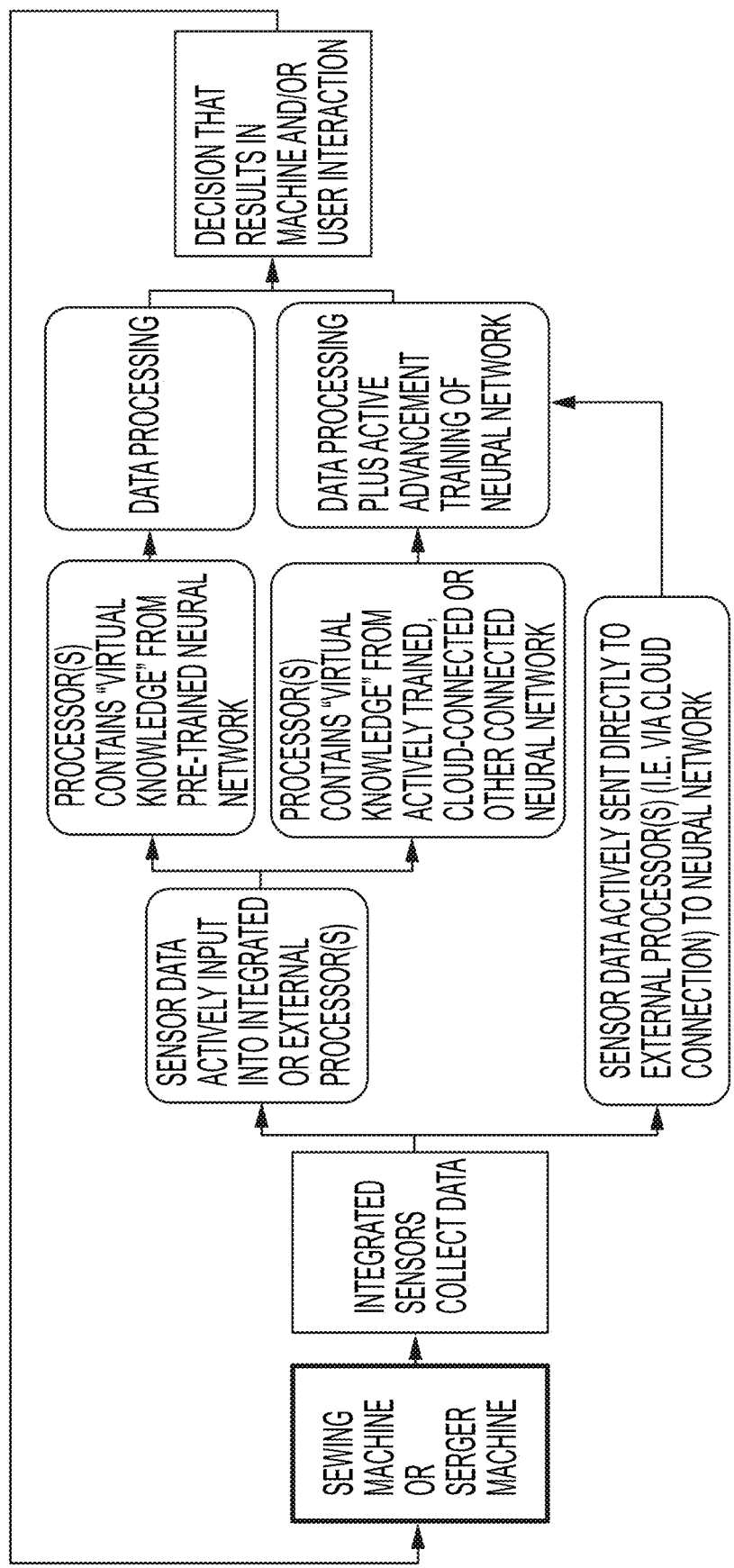

All forms of data available to the sewing machine, that is, from the sensors, software, data storage devices, user input via software, and the like can be processed through a neural network. The information to be processed first encounters the input layers which perform an initial processing of the input data and output the results to one or more hidden layers to process the output values from the input layers. Information that has been processed through the hidden layers is presented at the output layer as a probability of confidence in a given result, such as, for example, the location of a detected object in an image and the classification of that object. The software in the computer of the sewing machine receives the information from one of the layers of the neural network and can take action accordingly to adjust the parameters of the sewing machine and/or to inform the user based on the results of the neural network processing (FIG. 22).

During training of the neural network 128, the node parameters (i.e., at least one of the input parameters, function parameters, and output parameters) for each node in the neural network are adjusted via a backpropagation algorithm until the output of the neural network corresponds to a desired output for a set of input data. Referring now to FIG. 21, a process for training a neural network is shown. The neural network begins the training process with node parameters that can be randomized or can be transferred from an existing neural network. The neural network is then presented with data from the sensors to process. For example, an object can be presented to the optical sensor to provide the neural network with visual data. The data is processed by the neural network and the output is tested so that the node parameters of the various nodes of the neural network can be updated to increase the probability of confidence in the detection and classification performed by the neural network. For example, when a presser foot is shown to the optical sensor for identification by the neural network, the neural network will present a probability of confidence that the object being shown to the optical sensor is located in a range of coordinates of the image and can be classified as a particular presser foot. As the training process is carried out, the node parameters of the nodes of the neural network are adjusted so that the neural network becomes more confident that a particular answer is correct. Thus, the neural network comes to "understand" that when presented with certain visual data, a particular answer is the most correct answer, even if the data is not exactly the same as what has been "seen" before.

Figure 23:
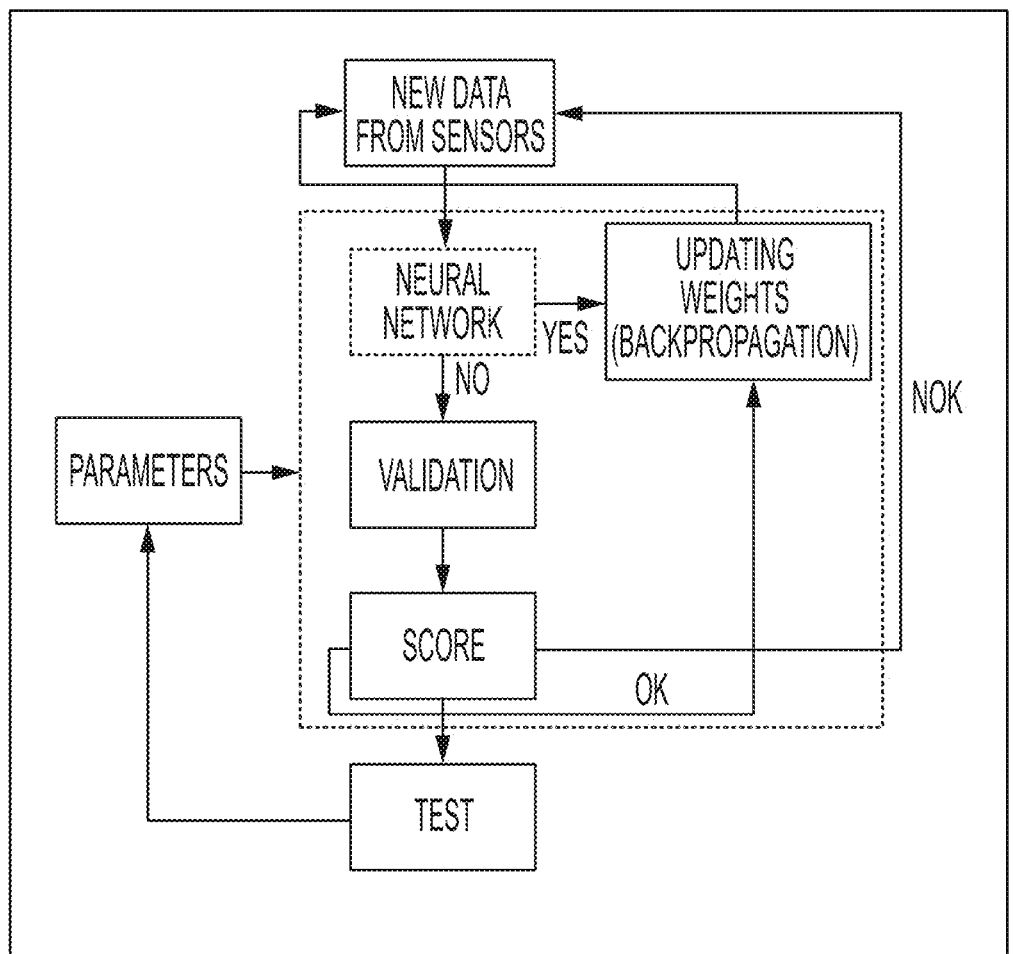
Figure 23:
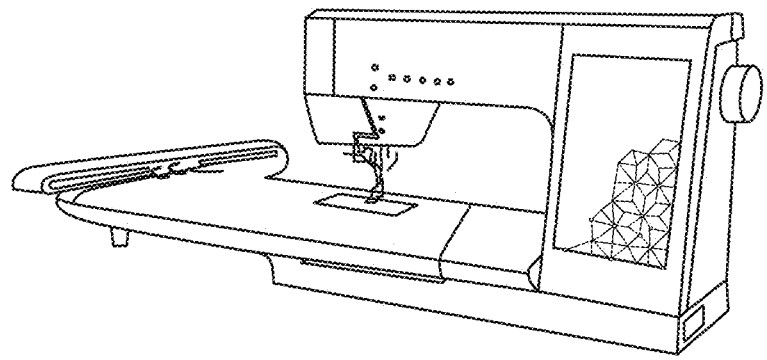

A neural network is considered "trained" when the decisions made by the network reach a desired level of accuracy. The trained neural network can be characterized by the collection of node parameters that have been adjusted during the training process. The collection of node parameters can be transmitted to other neural networks having the same node structure so that those other neural networks process data in the same manner as the initially trained network. Thus, a neural network stored in a data storage device of a particular sewing machine can be updated by downloading new node parameters, as is shown in FIG. 23. It should be noted that the node parameters of a neural network—such as input weight parameters and threshold values—tend to take up significantly less storage space than image libraries used for comparisons with image or visual data gathered by optical sensors. Consequently, neural networks files and other critical files can be updated via the network quickly and efficiently. For example, the structure of the neural network—i.e., the map of connections between nodes and the activation function calculated in each node—can also be updated in this way.

A neural network can also be trained continuously such that the node parameters are updated periodically based on feedback provided from various data sources. For example, node parameters of a neural network stored locally or externally can be updated periodically based on data gathered from sensors that agree or disagree with the output of the neural network. These adjusted node parameters can also be uploaded to a cloud-based system and shared with other sewing machines so that the neural networks of all of the sewing machines improve over time. Input data for a neural network can also be shared with a server or cloud-based system to provide further training information for a neural network. The large amount of data from the sewing machines in the field can, through training, improve the accuracy of the predictions made by the neural network.

Figure 96:
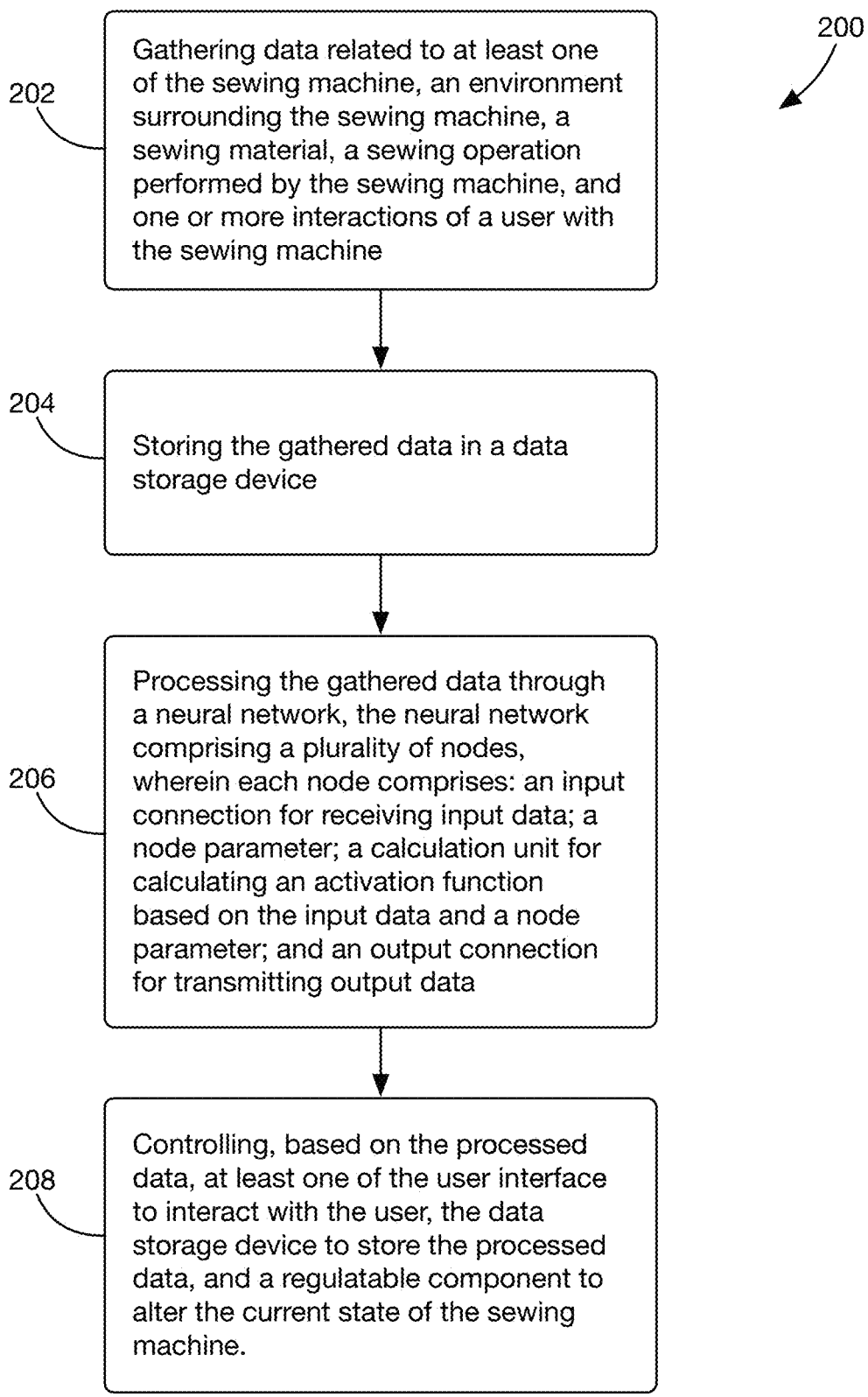
FIG. 96 shows an exemplary process for controlling a sewing machine.

Referring now to FIG. 96, an exemplary process 200 for controlling the sewing machine 100 is shown. The process 200 includes steps of gathering data 202, storing the gathered data in a data storage device 204, processing the gathered data through a neural network 206, and controlling the sewing machine based on the processed data 208. The gathered data is related to at least one of the sewing machine, the workspace or environment surrounding the sewing machine, the sewing material (e.g., thread and workpiece), the sewing operation performed by the sewing machine, and interactions with the user of the sewing machine (e.g., as recorded by the user interface or by other sensors). The neural network includes a plurality of nodes that each include input and output connections, a node parameter, and a calculation unit. Based on the processed data, the user interface can be controlled to interact with the user (e.g., by presenting an alert and/or prompt), the data storage device can be controlled to store the processed data (e.g., as a separate record or by updating the neural network parameters), and a regulatable component can be regulated to alter the current state of the sewing machine (e.g., to change the motor speed, activate a light, move the needle, or any other action that alters the sewing machine or sewing operation performed by the sewing machine). As can be seen in FIG. 22, data gathered by the sensors of a sewing machine can be processed locally on the sewing machine or via external processors in a cloud-based neural network. The locally stored neural network can be pre-trained or can be a continuously updating neural network. The data processed by the neural network—locally or remotely—is then used by the software of the sewing machine to make a decision that results in machine and/or user interaction.

Figure 23B:
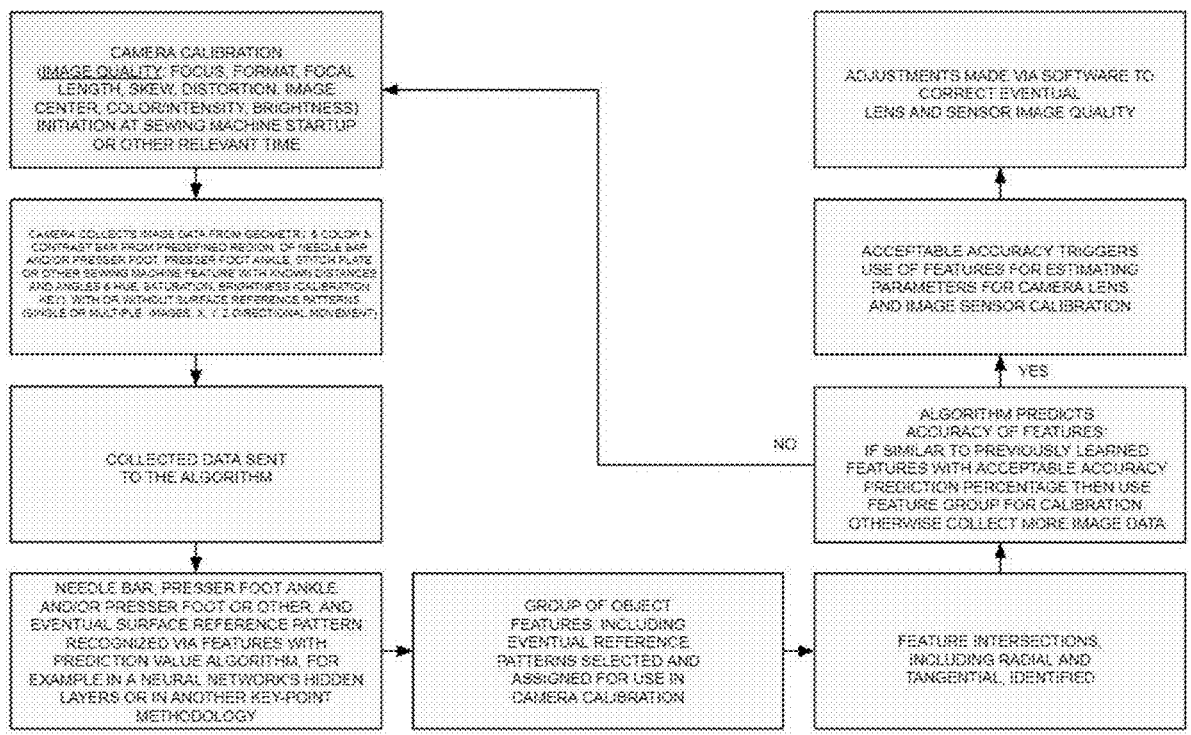

The camera and other data gathering devices (e.g., sensors) can also be calibrated with techniques that employ one or more neural networks or other artificial intelligence tools. An exemplary camera calibration method is illustrated in FIG. 23B. The camera calibration can be run at any relevant time, such as for example, during sewing machine start-up, during use of the sewing machine, and during any user-determined point in time. The camera calibration can run automatically without any input required from the user. The camera calibration may also be initiated manually by a user. The user may also fine tune the position of the calibration points.

To perform the camera calibration, the camera collects data from a predefined region, or regions, on an object, or objects, associated with the sewing machine. The data can be any relevant data that can be used for camera calibration, such as, for example, visual or image data related to a geometry, a color, a contrast, or a reflection of one or more predefined regions or a portion thereof. The one or more predefined regions on the one or more object used for calibration have known features, such as known geometric features (e.g., distances and angles) and/or known color and contrast features (e.g., hue, saturation, and brightness). Color and contrast references are used to calibrate the image settings for the camera (i.e., saturation, white-balance, temperature, . . . ). Geometry references are used to calibrate the camera for focus, for example.

The camera may collect data associated with any suitable object or objects, such as, for example, one or more of a needle bar, a presser foot, a presser foot ankle, a stitch plate, a needle, a paper or plastic sheet, or other sewing machine features and/or accessories (e.g., fabric, projected images, and any moveable object associated with the sewing machine). The calibration may use a single image to collect the data or multiple images, including images that illustrate two-dimensional or three-dimensional directional movement of the object.

Surface reference patterns, may include but are not be limited to, any camera-detectible surface change which has a defined geometry and position and may include, for example, holes, edges, lines, and shapes that are engraved, stamped, embossed, debossed, etched, cut, or painted on the sewing machine or sewing accessories. Surface reference patterns may or may not be used with the region(s) being used for calibration. For example, in some cases, the one or more objects being used for calibration (e.g., a presser foot) may already have a unique topology which provides sufficient information such that a surface reference pattern is not required. If such an accessory is used, color and contrast references may be simultaneously taken from another location, if needed, for example on a needle or on a stitch plate. In this case, multiple references can be used for the sake of robustness.

The data collected by the one or more cameras from the one or more predefined regions is sent to one or more computers on the sewing machine, or another processing unit or units associated with the sewing machine. The one or more computers process the data through one or more prediction value algorithms, for example in hidden layers of one or more trained neural networks or in another key-point methodology. The one or more neural networks are trained to detect and recognize the one or more objects by the known feature or features of the one or more predetermined regions used (e.g., geometry, color, contract, topology, etc.).

The prediction value algorithm groups object features, including eventual reference patterns selected and assigned for use in camera calibration, and identifies the intersections of features, including radial and tangential intersections; either already intersected or else extrapolated to intersect. Potential line regions of interest may be pretrained in the neural network. For example, if lines on a stitch plate are to be used as calibration features, finding these lines and extrapolating them, if necessary, is accomplished relatively fast as the entire image does not need to be calculated; only the predefined regions of interest are processed.

The one or more prediction value algorithms provide probabilities of confidence as to the accuracy of the known features. In other words, the one or more prediction value algorithms compare the known features from the data provided by the one more cameras with the previously learned known features of the one or more neural networks and calculates one or more accuracy prediction percentages that quantify the degree of similarity between the one or more data features provided by the one or more cameras and the learned feature(s).

The threshold level for acceptability can be set to any level desired. If the accuracy prediction percentage (i.e., probability) is calculated to be lower than a threshold level for acceptability, then fine adjustments to one or more camera settings are made and the process is repeated where the one or more cameras collects more data and the algorithm is run again on the new data. This process can be repeated numerous times until an acceptable probability is achieved. If an acceptable probability is not achieved, an alert signal or message can be sent to the user requesting the user ensure that the one or more objects to be recognized are in full view of the one or more cameras and that lighting is acceptable and no obstructions are in the way and that there is no unacceptable defacing of relevant camera calibration surfaces. If acceptable probability is still not achieved after the aforementioned steps have been done, a service alert message may be sent to the user, workshop, and manufacturer (e.g., lens cleaning needed or other issue that can only be taken care of by a service technician).

If the one or more features from the data are determined by the algorithm to be within an acceptable threshold of accuracy prediction percentage, then that one or more features are used for estimating parameters for camera lens and image sensor calibration and adjustments can be made via software to correct eventual lens and sensor image quality. For example, adjustments can be made to various parameters associated with the one or more cameras, such as for example, but not limited to, the focus, the image format, the focal length, the skew, the distortion, the image center, the color/intensity, the exposure, the temperature, and the brightness.

As an example of the calibration procedure, at start up, the camera may acquire an image of the currently mounted presser foot on the sewing machine. The image is sent to the neural network which recognizes the currently mounted presser foot based on its geometry and color coding. The color (e.g., orange) detected on the presser foot by the neural network differs from the color (e.g., red) recognized on the same presser foot during multiple earlier sewing sessions, where image settings and predicted presser foot ID were considered acceptable. The camera settings can then be modified such that the color from the image data appears red.

Referring now to FIGS. 24-33 and 104-105, various views and diagrams are shown that are related to the use of artificial intelligence in the sewing machine to control the location of the stitch made in the fabric during sewing. The position of stitches has typically been left to the user during normal sewing operations. That is, the user can be provided with various visual aids—guides on the needle plate, projected guides, markings on the workpiece, or the like—and it is up to the user to maintain the sewing path in the correct location. Visual aids do not control the location of the workpiece, however, so the ultimate location of any stitch is up to the skill of the user to hold and steer the fabric in the proper direction. The sewing machine described herein, however, can use one or more optical sensors and a depth perception system (that is described in greater detail below and can include optical sensors, a projector, ultrasonic, and thermal vision systems) to find a desired path on the workpiece and can manipulate the lateral position of the needle bar and workpiece by the feed dog so that stitches are placed along the desired path even if the user happens to move the workpiece out of line. The feed dogs used to influence the feed direction of the workpiece can include linear translating feed dogs, linear translating feed dogs in combination with circular rotating feed dogs, and multi-part feed dogs having two or more independently moving parts, such as left and right portions that translate different distances and/or speeds (similar to tank treads) to cause the workpiece to turn during feeding. The two or more parts of a feed dog can also be arranged at different heights to accommodate sewing together fabrics having different thicknesses.

Figure 24:
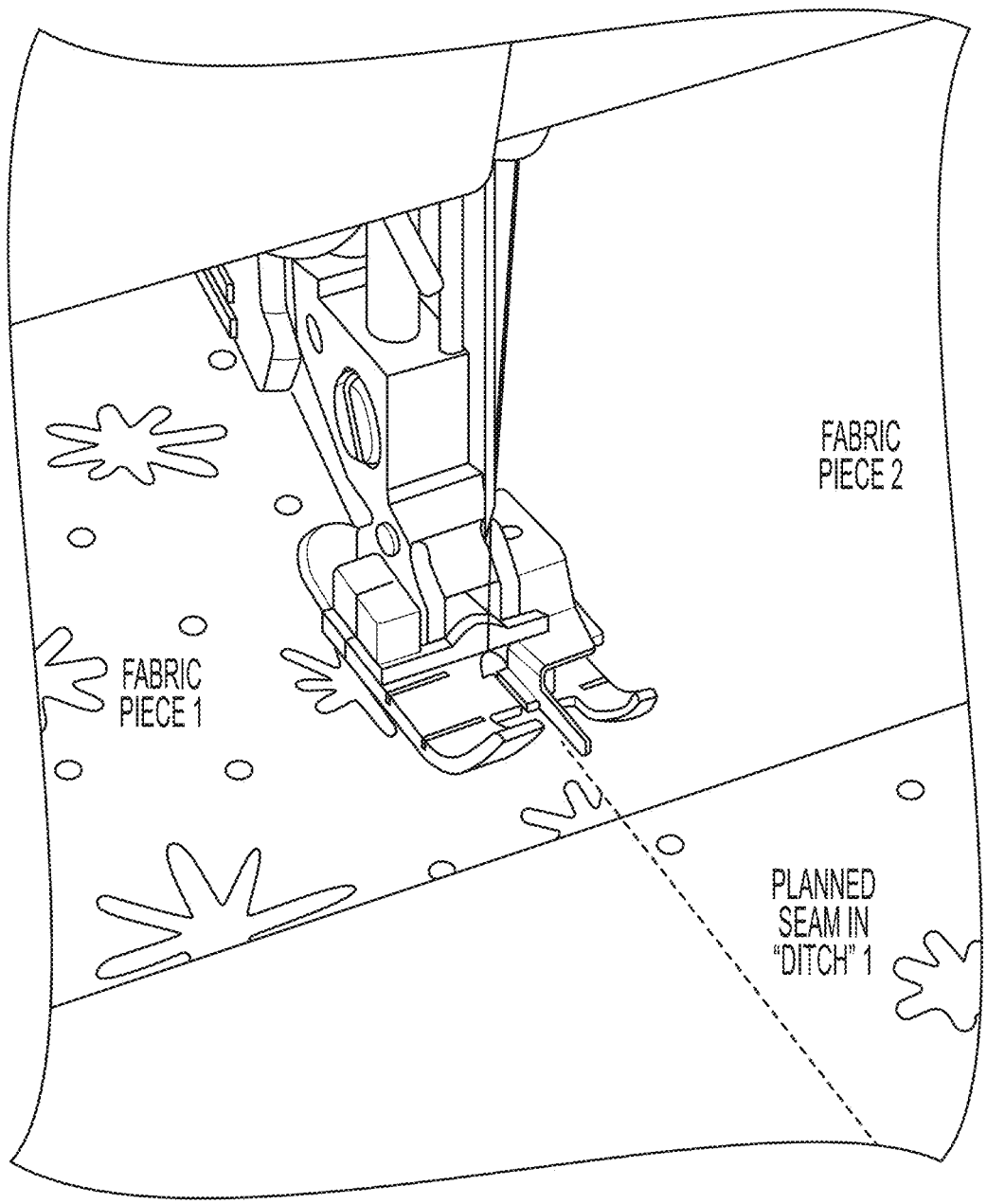
FIGS. 24-33 show various views relating to stitch regulation of an exemplary sewing machine.

When quilting, it is common to have a need to form a line of stitches along an already formed seam between two or more pieces of fabric, as can be seen in FIG. 24. Sewing along the ditch is known colloquially as forming a "stitch in the ditch" as the two fabrics tend to rise up away from the seam so that the seam appears to have a long low groove having a relatively deep wedge-shaped cross-section between the two pieces. Forming stitches along the ditch helps to conceal the stitches in the finished quilt. Maintaining a constant placement of stitches along the ditch is quite challenging as the ditch is a moving and very narrow target. Thread with a color that somewhat matches the surrounding quilt pieces or even transparent threads may be used to attempt to conceal the thread in the case of missed stitches.

Figure 25:
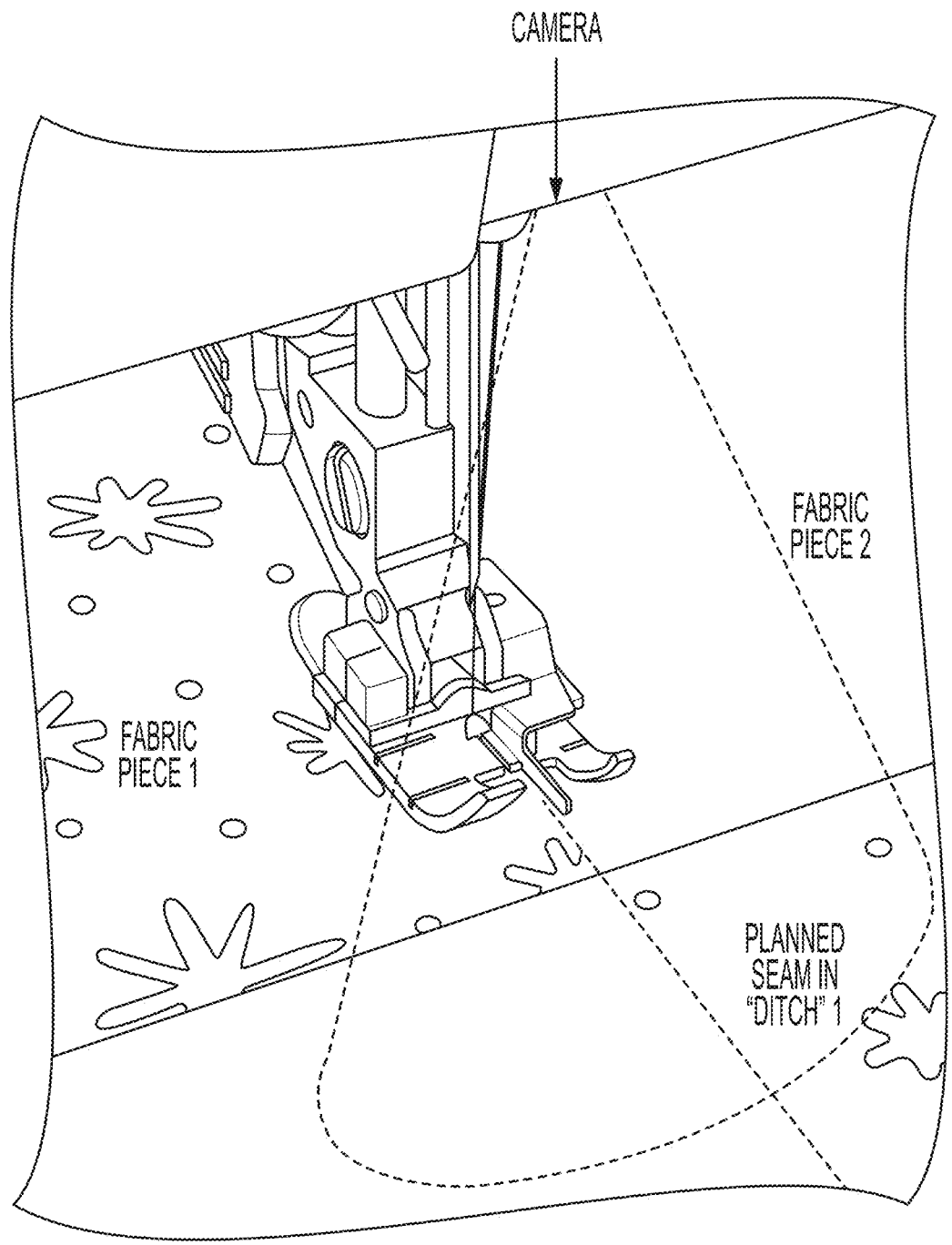
Figure 27:
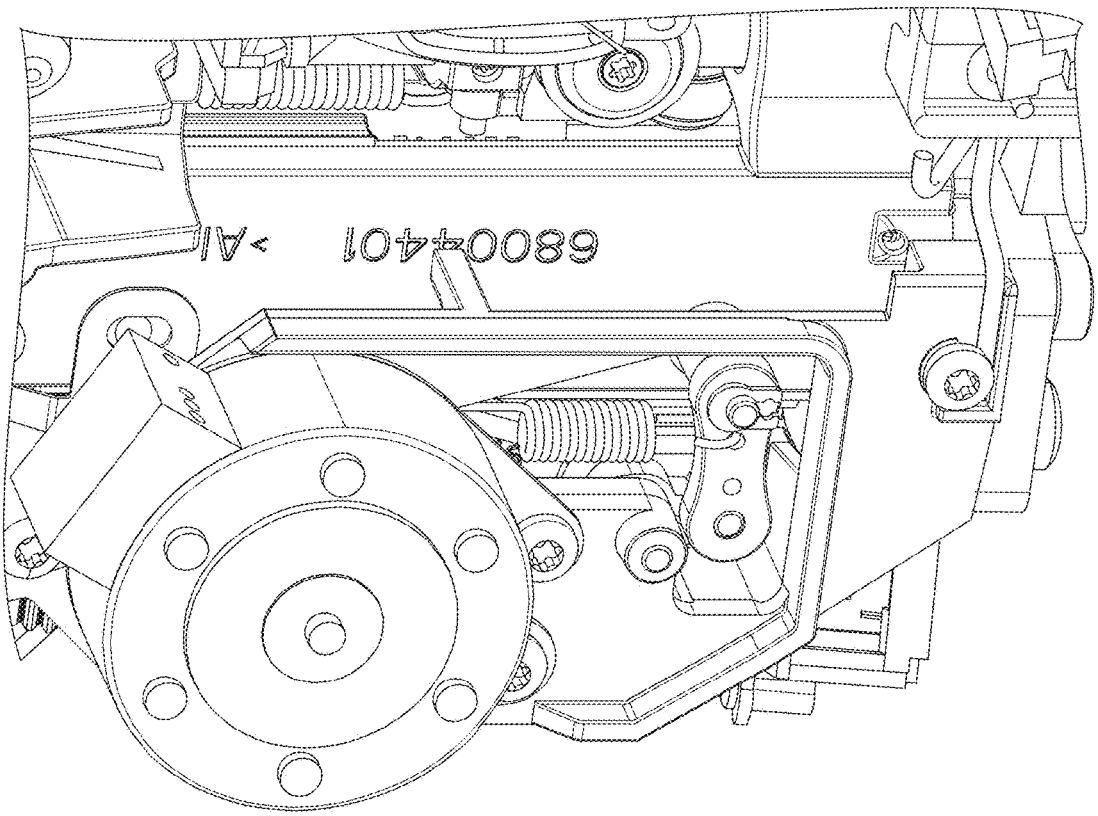
Figure 26:
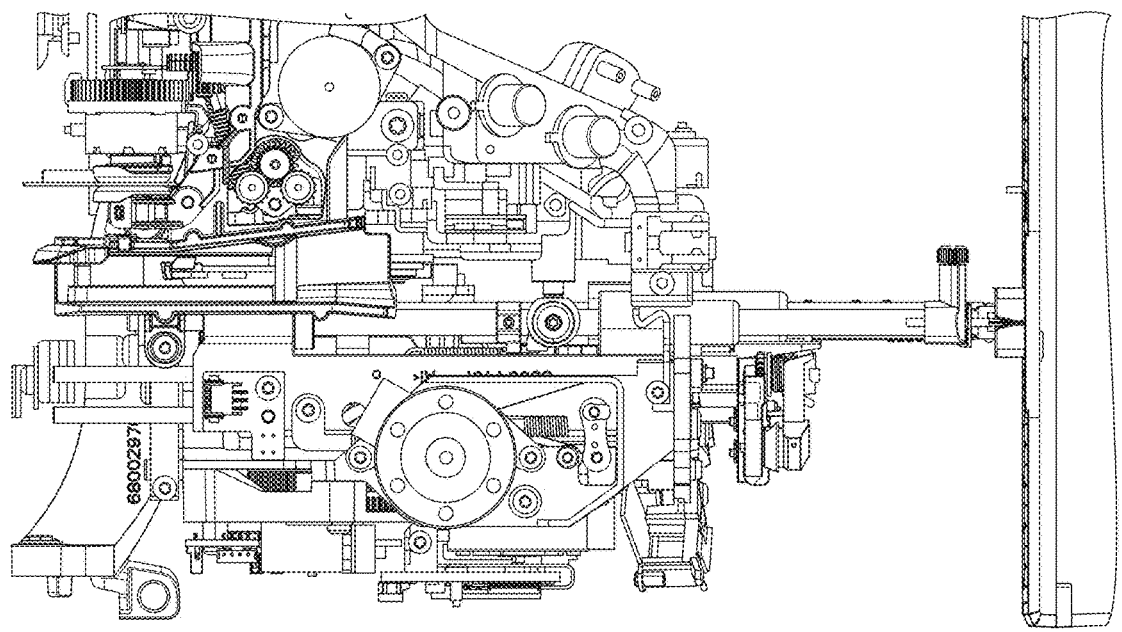
Figure 29:
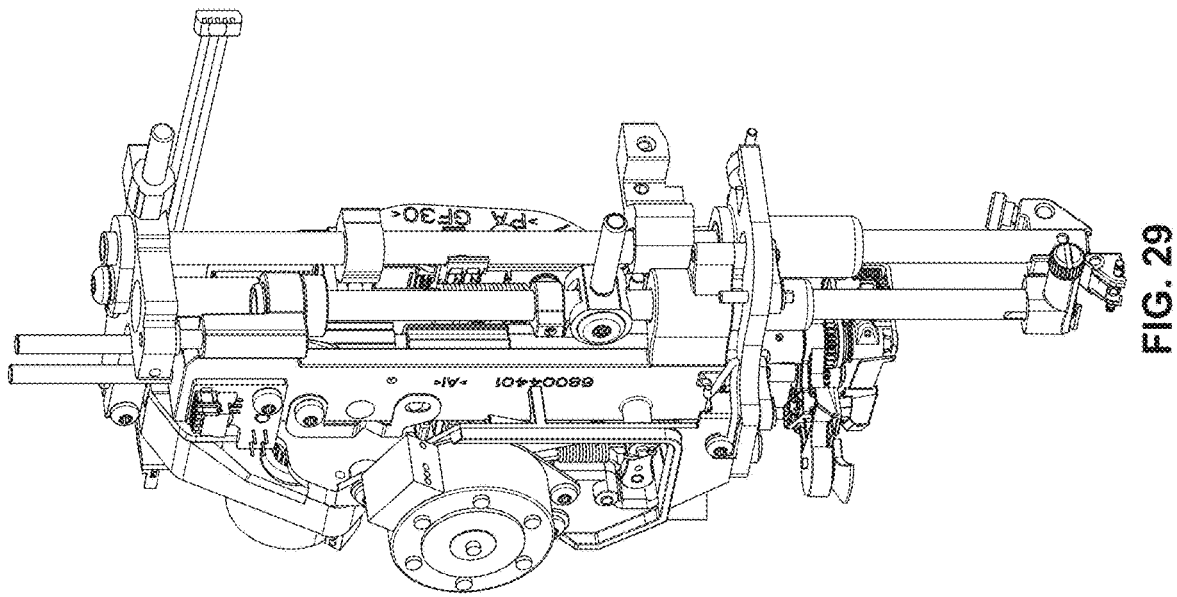
Figure 28:
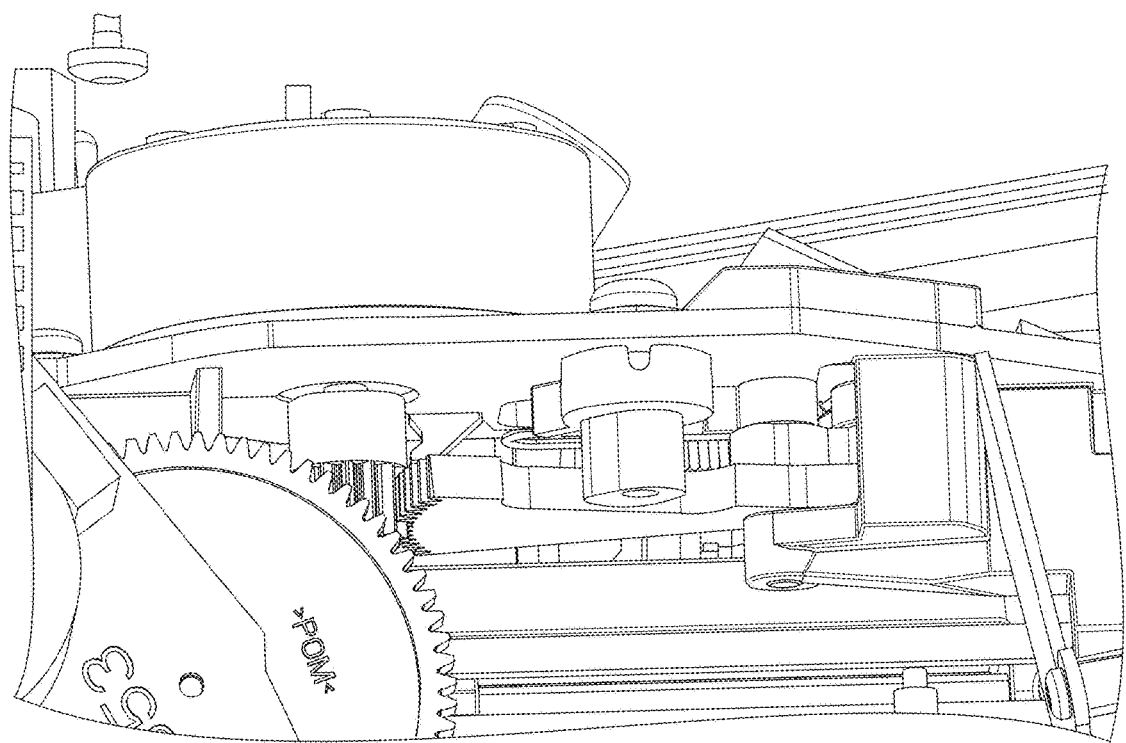
Figure 30:
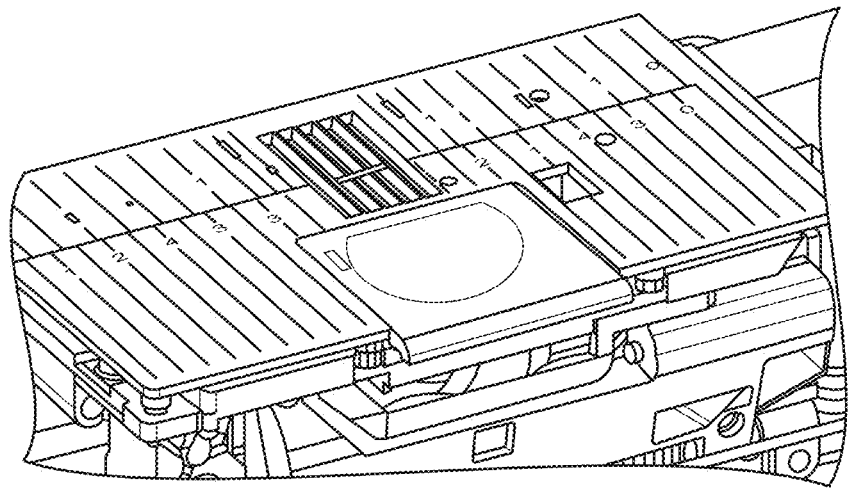
Figure 31:
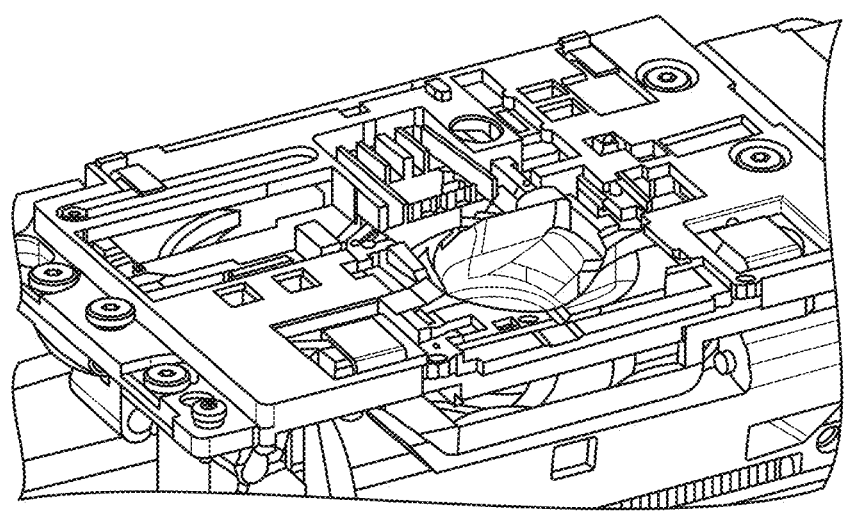
Figure 32:
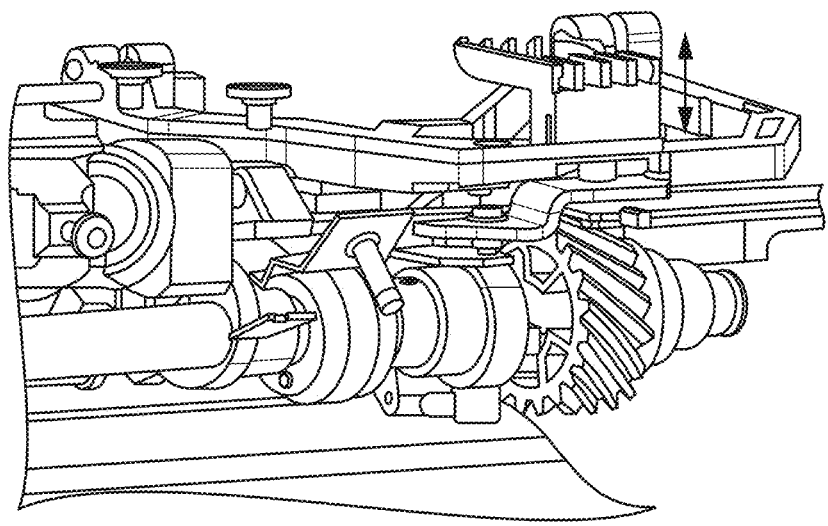
Figure 33:
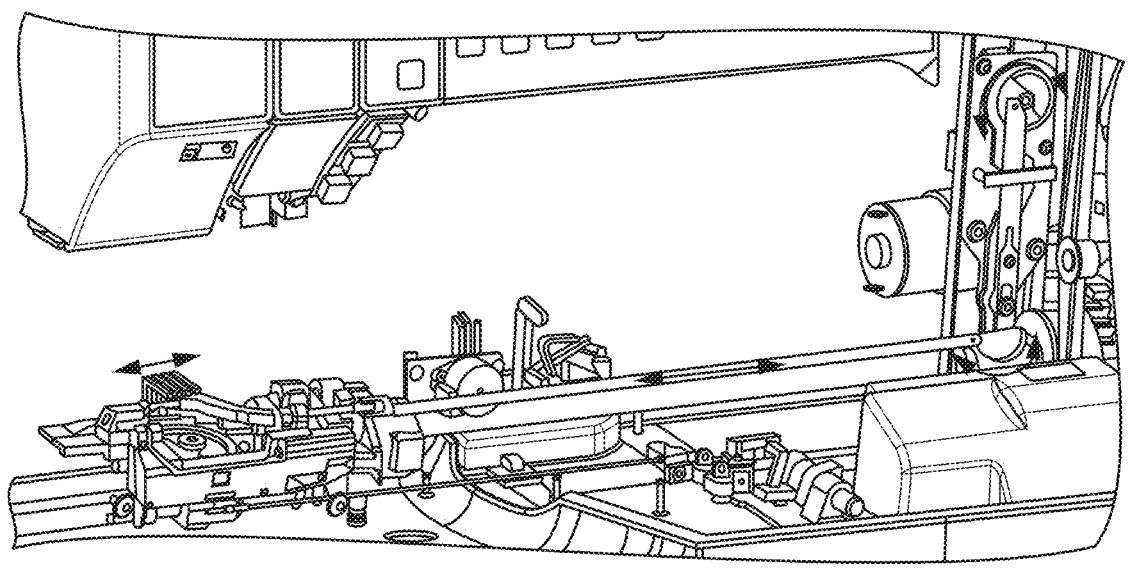
Figure 104:
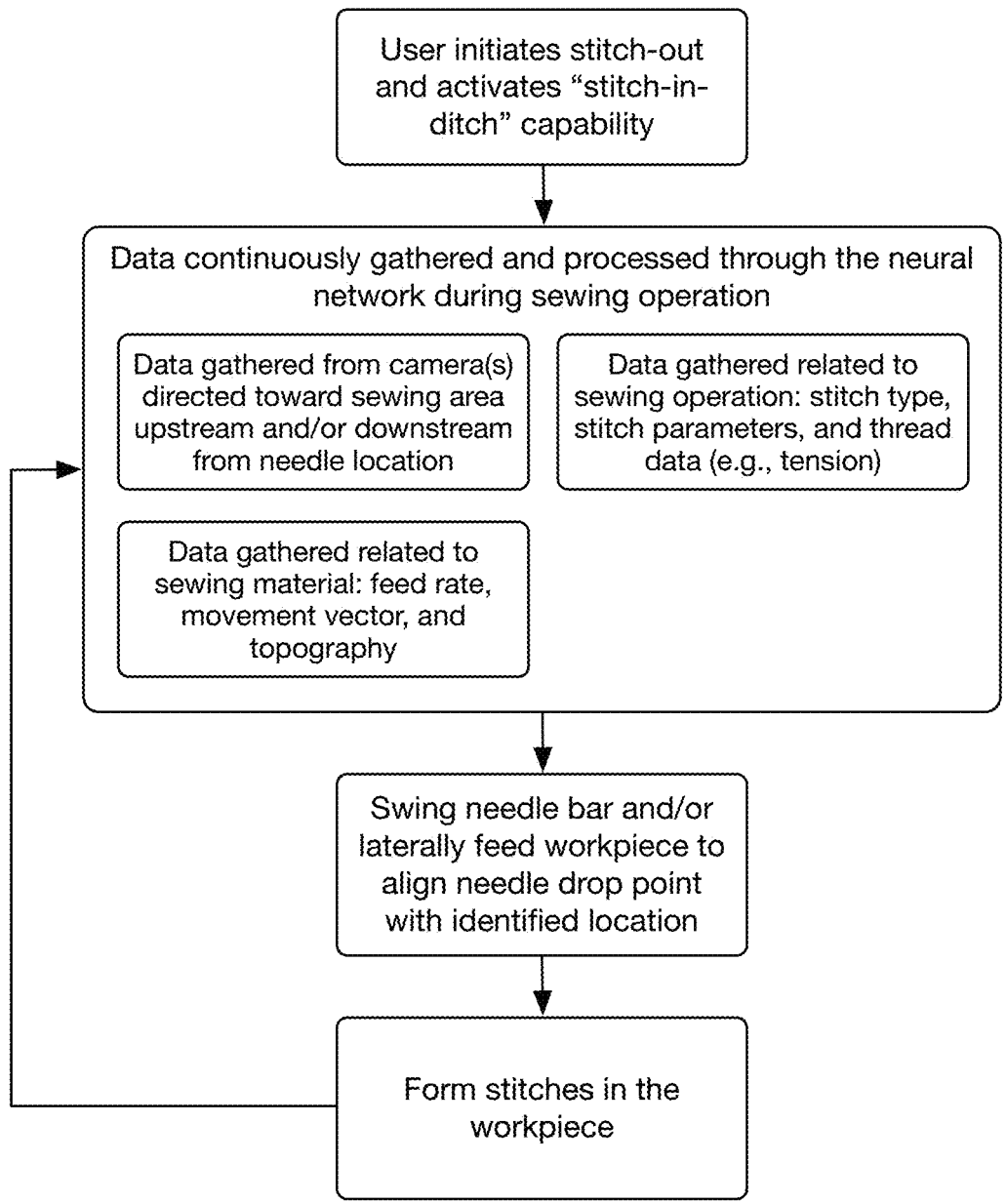

Referring now to FIG. 25, the field of view of an optical sensor or optical sensor and depth perception system of the sewing machine is shown overlaid on the image of FIG. 24. As can be seen in FIG. 104, a user initiates stitch-out and activates the "stitch-in-ditch" feature. When the workpiece is arranged on the sewing bed, data is gathered continuously from sensors and processed through the neural network. The gathered data includes data gathered from camera(s) directed toward the sewing area upstream and/or downstream from the needle drop location, data related to the sewing operation (e.g., the stitch type and parameters), thread data (e.g., thread tension), and data gathered that is related to the sewing material (e.g., the feed rate, movement vector, and topology of the workpiece). The data is processed through a neural network that has been trained to detect and recognize the ditch formed between two or more pieces of fabric. That is, the neural network provides a probability of confidence as to the location of the ditch and specifics about its appearance. As the user begins sewing— such as by pressing down on the foot pedal, pressing a button, giving a voice command, etc. —and moves the workpiece into position under the needle, the sewing machine detects and recognizes the ditch and controls the position of formed stitches on the workpiece via swinging of the needle bar and/or lateral feed of the workpiece so that the ditch is followed and stitches are formed in the ditch. An actuator, shown in FIGS. 26-33, can be used to alter the lateral position of the needle bar so that the needle places a stitch through the ditch. As the workpiece is moved, the feed dogs can also be controlled using an actuator shown in FIGS. 30-33 to move the workpiece somewhat laterally during the usual forward-to-back feeding of the workpiece. That is, the feed dogs are capable of moving in two axes so that the direction of the sewing path can be altered in addition to the feed rate of the workpiece that is typically controlled by the feed dogs.

Figure 105:
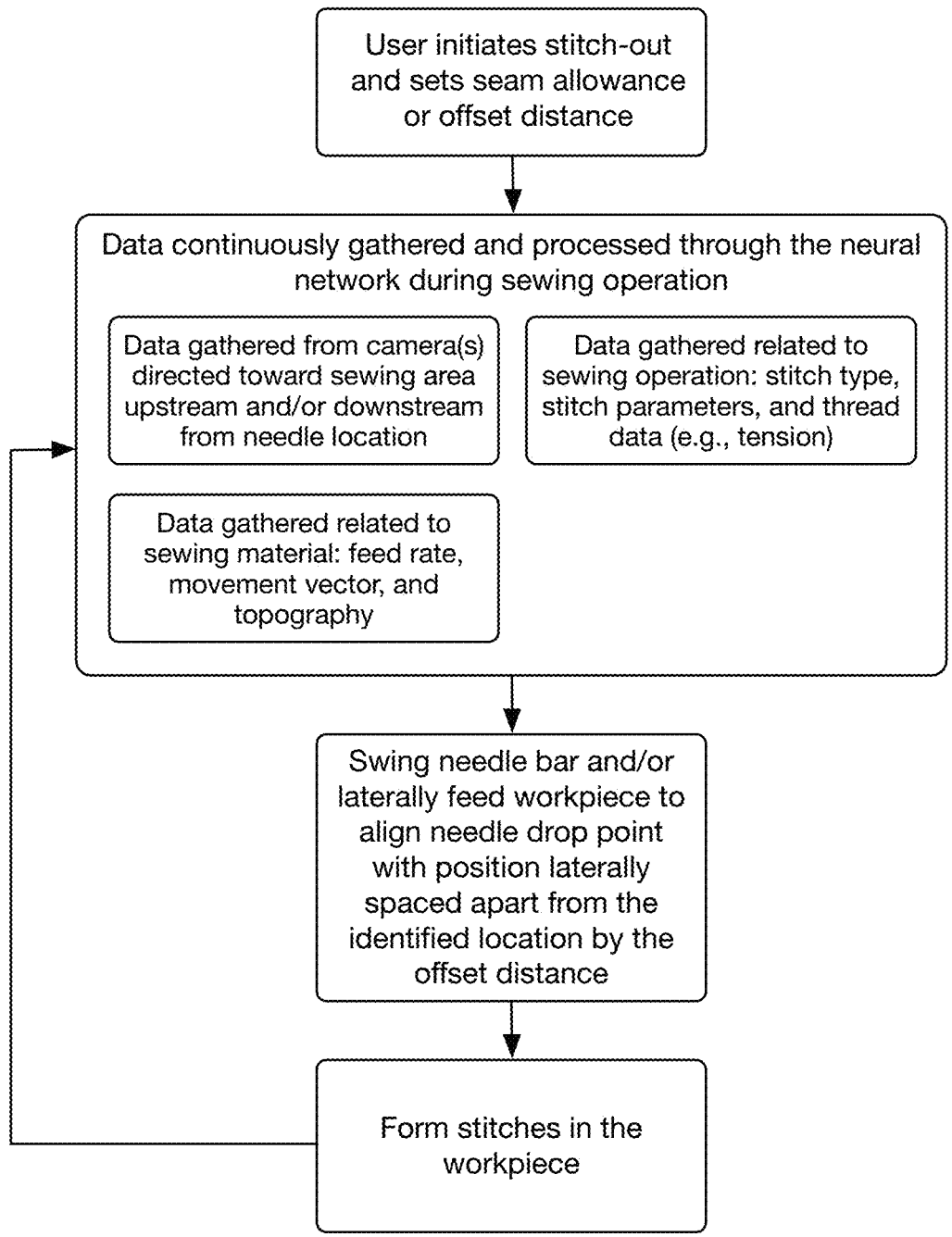

Referring now to FIG. 105, a process similar to that of the "stitch-in-ditch" feature can be used to form stitches at a predetermined offset distance or allowance from a feature of the workpiece. When the workpiece is arranged on the sewing bed, data is gathered continuously from sensors and processed through the neural network. The gathered data includes data gathered from camera(s) directed toward the sewing area upstream and/or downstream from the needle drop location, data related to the sewing operation (e.g., the stitch type and parameters), thread data (e.g., thread tension), and data gathered that is related to the sewing material (e.g., the feed rate, movement vector, and topology of the workpiece). The data is processed through a neural network that has been trained to detect and recognize a feature of the workpiece, such as, for example, an edge, a seam, a "ditch" between two pieces of fabric, a buttonhole, a pocket, or the like. That is, the neural network provides a probability of confidence as to the location of the feature and specifics about its appearance. As the user begins sewing—such as by pressing down on the foot pedal, pressing a button, giving a voice command, etc. —and moves the workpiece into position under the needle, the sewing machine detects and recognizes the feature and controls the position of formed stitches on the workpiece via swinging of the needle bar and/or lateral feed of the workpiece so that the stitches are formed at a predetermined offset distance from the identified feature. For example, the user can specify a seam allowance of one-half inch and can begin sewing with the workpiece with the edge arranged within the range of lateral movement of the needle bar. As the workpiece is moved through the sewing machine, the edge of the workpiece is detected and stitches are formed one-half inch away from the edge without the user having to precisely follow an edge guide.

Figure 34:
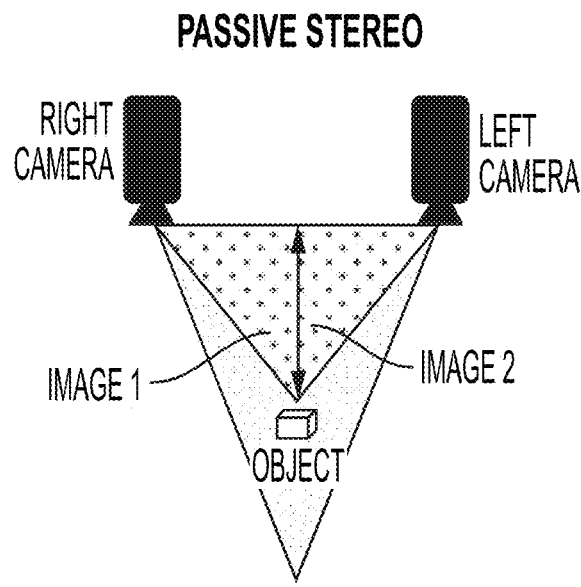
FIGS. 34-39 show diagrams of various machine vision techniques.
Figure 35:
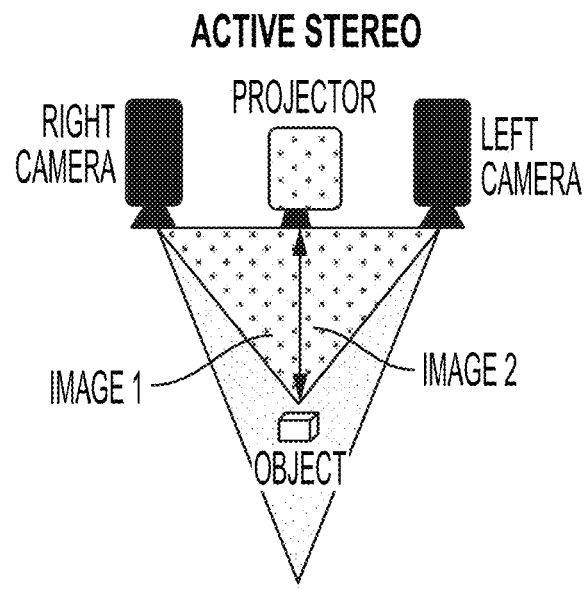
Figure 36:
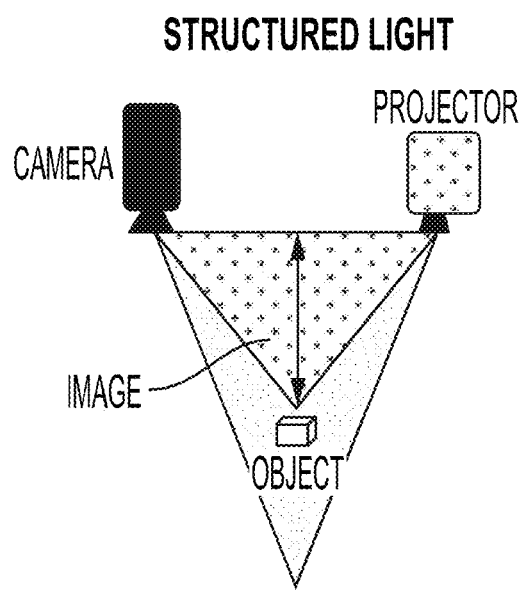
Figure 37:
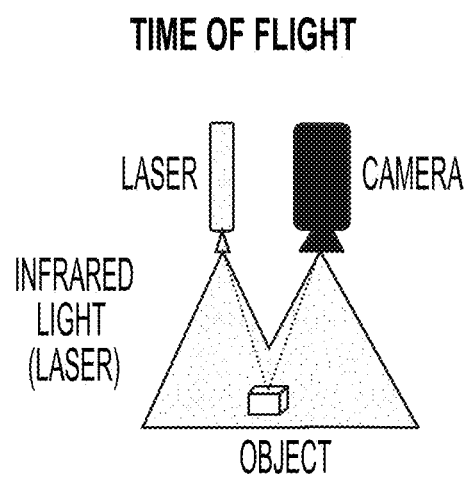
Figure 38:
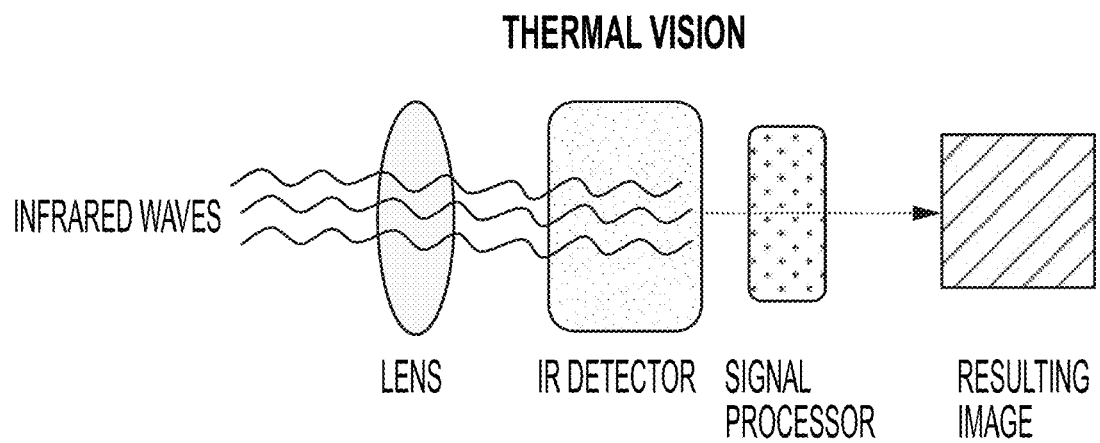
Figure 39:
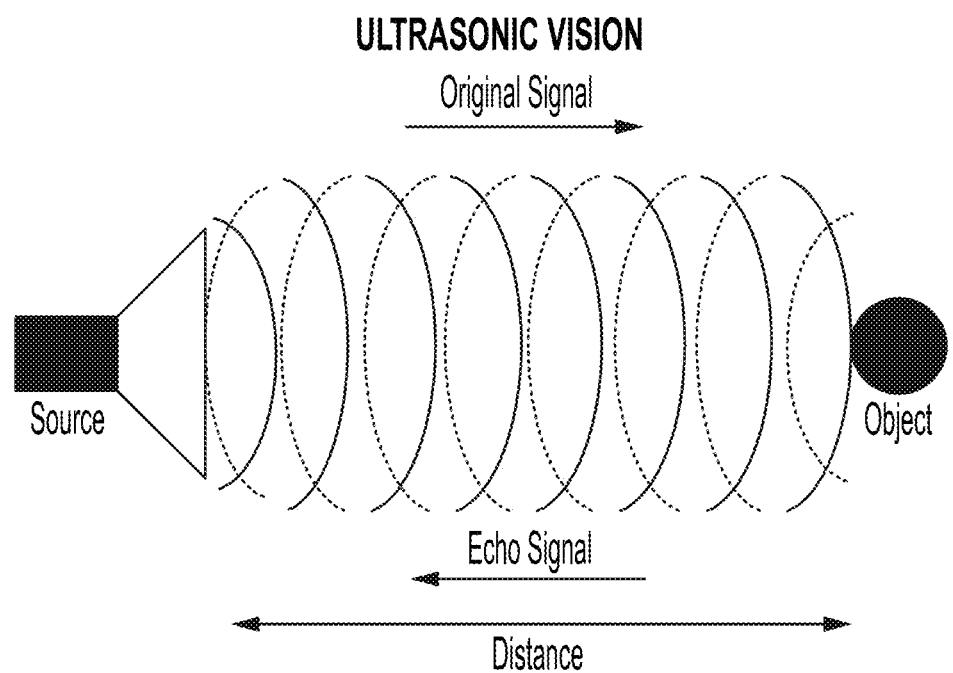

Referring now to FIGS. 34-39, diagrams for various computer vision systems are shown. In addition to the visual data provided by the optical sensor, the neural network can receive input from a depth perception system to provide a more accurate calculation of the position and three-dimensional topology of the ditch. The depth perception system can use any of the stereoscopic and other computer vision techniques, but not limited to, shown in FIGS. 34-39 that use two optical sensors, two optical sensors and a projector, a projector and a single optical sensor, an optical sensor and laser light source, a thermal vision system, or an ultrasonic vision system to calculate the distance to the workpiece. Referring now to FIG. 34, a passive stereo depth perception system is shown that uses two cameras—similar to stereo vision in humans—to determine a distance to a target object based on a comparison between the two images captured by the camera. An active stereo vision system shown in FIG. 35 is similar but includes a projector for projecting a graphic onto the target object for enhancing the measurement of distance by the two cameras. A projector is also used in the structured light vision system in FIG. 36 to project lines or some other visual pattern onto the target object that can be observed by the camera to determine distance from the camera to the target object. Another depth perception system is shown in FIG. 37 that calculates a distance to the target object with a camera that measures the time it takes for light from a laser to travel from the laser to the target object, and back to the camera. This distance information can also be provided to the neural network that is processing the visual data of the workpiece from the optical sensor to calculate the position of the ditch as the workpiece is moved underneath the sewing head for forming stitches in the workpiece. That is, the line of points on the workpiece that are located furthest from the sewing head can be identified as a ditch in the fabric.

It should also be noted that the optical sensor and depth perception systems described above can have a wide variety of uses. That is, the one or more optical sensors and depth perception arrangements can be used to recognize the textile and thread topology in three dimensions to identify types of fabric materials and thread types already in use in a workpiece. The density and type of the fabric material can also be determined using an ultrasonic or thermal vision system that can be part of the depth perception system. That is, more dense materials respond differently to an ultrasonic pulse than lighter materials. A laser, infrared radiation, or some other heat source can be used to heat up a portion of the workpiece that can be detected by a thermal vision system including, for example, an infrared sensor. Thus, the thermal conductivity of the fabric can be measured and compared to known values for different types of fabric. This feature can be particularly useful in an embroidery process when working on a workpiece with existing stitches. The information provided by these systems can also be used to identify the type of fabric and thread used in a workpiece to automatically adjust the sewing machine for sewing that type of material and to recommend to the user a particular needle or other accessory that might be installed in the machine for use with that workpiece. Automatic lighting adjustments can be made to enable the user and sensors of the sewing machine to view the workpiece material in a manner particularly suited for sewing (i.e., lower light levels improve the visibility of highly reflective fabrics). Additionally, as is described in further detail below, the sewing machine can provide recommendations and even warnings to the user based on the identified combination of thread and fabric types. The 3D topology of the workpiece can also be used to determine when to release pre-tension on the presser foot to more easily climb over multiple layers of fabric, such as, for example, when sewing a hem.

Processing the distance information through the neural network alongside the visual data further improves the accuracy of the information as the neural network can be trained to take both the appearance and the shape of the workpiece into account when determining the location of the ditch. The neural network used to process the visual and distance data can be trained elsewhere and the node parameters and other necessary information transmitted to the sewing machine via a cloud connection with the computer of the sewing machine (FIG. 23) and/or the neural network can be trained during the sewing process. For example, the same or an additional optical sensor can be used to observe the stitches formed in the workpiece to identify stitches that missed the ditch. As the computer knows the sewing pitch, the control data for the particular missed stitch can be determined and used to adjust the node parameters of the neural network to reduce the chance that stitches are missed. The computer on the sewing machine can work in conjunction with a cloud-based neural network that can provide additional computing power for processing the data provided to the neural network and for training the neural network during operation of the sewing machine so that the neural network is a continuously learning neural network.

The techniques implemented to accurately form a "stitch in the ditch" described above can have a broader application to sewing in a wide variety of contexts to form a "perfect stitch." That is, data from one or more optical sensors and a depth perception system can be processed through a neural network to provide control data to the one or more motors and actuators of the sewing machine to accurately and precisely form any kind of desired stitch in any particular location on the workpiece. In addition to using visual data from the optical sensor and depth perception data from the depth perception system, a perfect stitch control system can take into account data from thread tension sensors, needle position sensors, needle force sensors, fabric feed rate sensors, the speed and frequency of the needle bar movement, the pressure applied by the presser foot, the feed rate of the feed dogs, and the like. Data from these sensors can be processed through the neural network to predict whether an incorrect stitch is likely to be made and can direct the control system to adjust various parameters accordingly to compensate for whatever factor may be likely to cause the error. Upon processing the data provided by these sensors, decision information from the neural network can be used by the computer of the sewing machine to adjust a wide variety of sewing parameters, such as, for example: thread tension; needle position, force, speed, and timing; stitch length and type; motor speed; and fabric feeding settings to actively achieve ideal stitch precision and accuracy. All of these features can be combined to correlate the machine performance to the skill level of the user. That is, the sewing machine can learn to work with beginner, intermediate, and advanced users to adapt the speed of the machine, the presentation of corrections and alerts, the recommendation of guides or aids, and the like to the user.

As with the stitch-in-a-ditch example described above, the sewing machine can also check for errors in stitches that have already been formed. That is, each completed stitch can be actively monitored for quality purposes. If data collected by the sensors of the sewing machine indicates that an imperfect stitch has been formed (e.g., a stitch has been skipped or is misaligned), the output data generated by the neural network can be used to make decisions regarding adjustments that can be made to the parameters of the sewing machine. These adjustments can be made and the resulting stitches monitored until the stitches formed are perfect and error-free. The sensors can also be used to detect a thread break so that sewing can be stopped and the thread replaced. Thus, the quality of the stitches can improve over time as the neural network is continuously trained. For example, a zig-zag stitch might be controlled to maintain a particular width on either side of a seam of fabric such that successive stitches are formed in opposing pieces of fabric. Or, when performing a simple straight stitch, the tension of the upper and lower threads can be controlled to avoid the stitch pulling through to one side of the workpiece. The optical sensors can also identify lines of a pattern that are pre-existing as part of a pattern on the workpiece (e.g., by weaving into or by printing on the fabric), drawn, overlain, drawn, or projected onto the fabric so that stitches are formed along the line or at a constant offset distance from the line. That is, the optical sensors can be used to detect the edge of the fabric and help the user to sew along the edge of the fabric with a constant seam allowance. Two or more pieces of material might have edges that the users is attempting to align during sewing and the sewing machine can detect misaligned workpieces and recommend corrections to the user.

Figure 106:
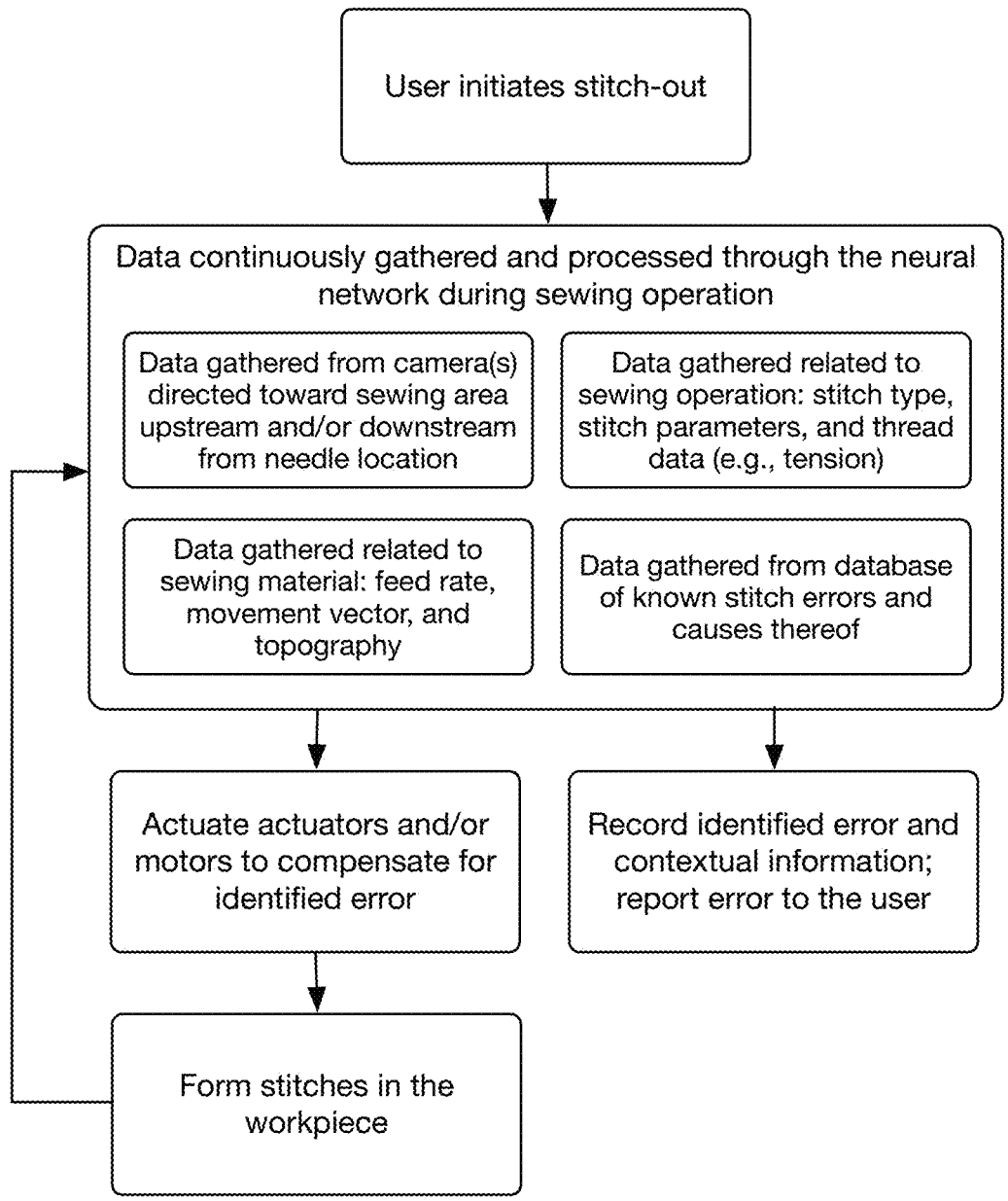

An example of a process for detecting and adjusting for sewing errors is shown in FIG. 106. As the user is sewing, data is continuously gathered from camera(s) directed toward the sewing area upstream and/or downstream from the needle drop location, the sewing operation (e.g., the stitch type and parameters), thread data (e.g., thread tension), and the sewing material (e.g., the feed rate, movement vector, and topology of the workpiece). Input data can also be provided from a database of known sewing errors and their causes—for example, a puckering seam can be caused by an imbalance in the thread tension of upper and lower threads. The data is processed through a neural network that has been trained to identify sewing errors and identified errors can be recorded along with contextual information—such as the parameters of the sewing machine at the time of the error or the movement of the workpiece when the error occurred—and reported to the user. The recorded information can be used to update local and remote neural networks to improve error detection and prediction. The sewing machine can also control actuators or motors in response to the identified sewing errors to correct the error in the next stitch or to prevent a recurrence of similar errors. A non-exhaustive list of sewing errors includes a skipped stitch, an unbalanced stitch, a misaligned stitch, a seam pucker, a stitch density variation, a bobbin thread break, a looper thread break, a needle thread break, a fused thread, a needle break, a stuck needle, a needle striking the needle plate, a thread cut by the needle, inconsistent thread tension, a wavy seam, an unthreaded needle, a loose needle holder, a loose presser foot, a mislocated presser foot, an immobile needle, an immobile workpiece, a bunching workpiece, a bunching thread, a knot in the thread, a loose stitch, a tangle in the thread, a frayed thread, a shredded thread, a workpiece feed variation, a bent needle, a damaged looper, a damaged stitch finger, a mislocated looper, a mislocated stitch finger, and a dull fabric knife.

A continuously trained neural network—i.e., a neural network that is trained and can be adjusted during the sewing process may end up adjusting numerous parameters of the sewing process in unpredictable ways that compensate for unforeseen issues that would be very difficult or impossible to anticipate and address via traditional control software or by the user by adjusting settings of the sewing machine. For example, the sewing machine can adjust the feed rate and sewing pitch in response to the user applying external forces to the sewing machine that would have otherwise moved the workpiece out of line. In doing so, adjustments to the thread tension or presser foot presser might also be determined to be useful by the neural network. That is, the sewing machine can learn to compensate for and even to resist incorrect movements by the user to further guarantee that the stitches formed are accurate and precise.

Figure 107:
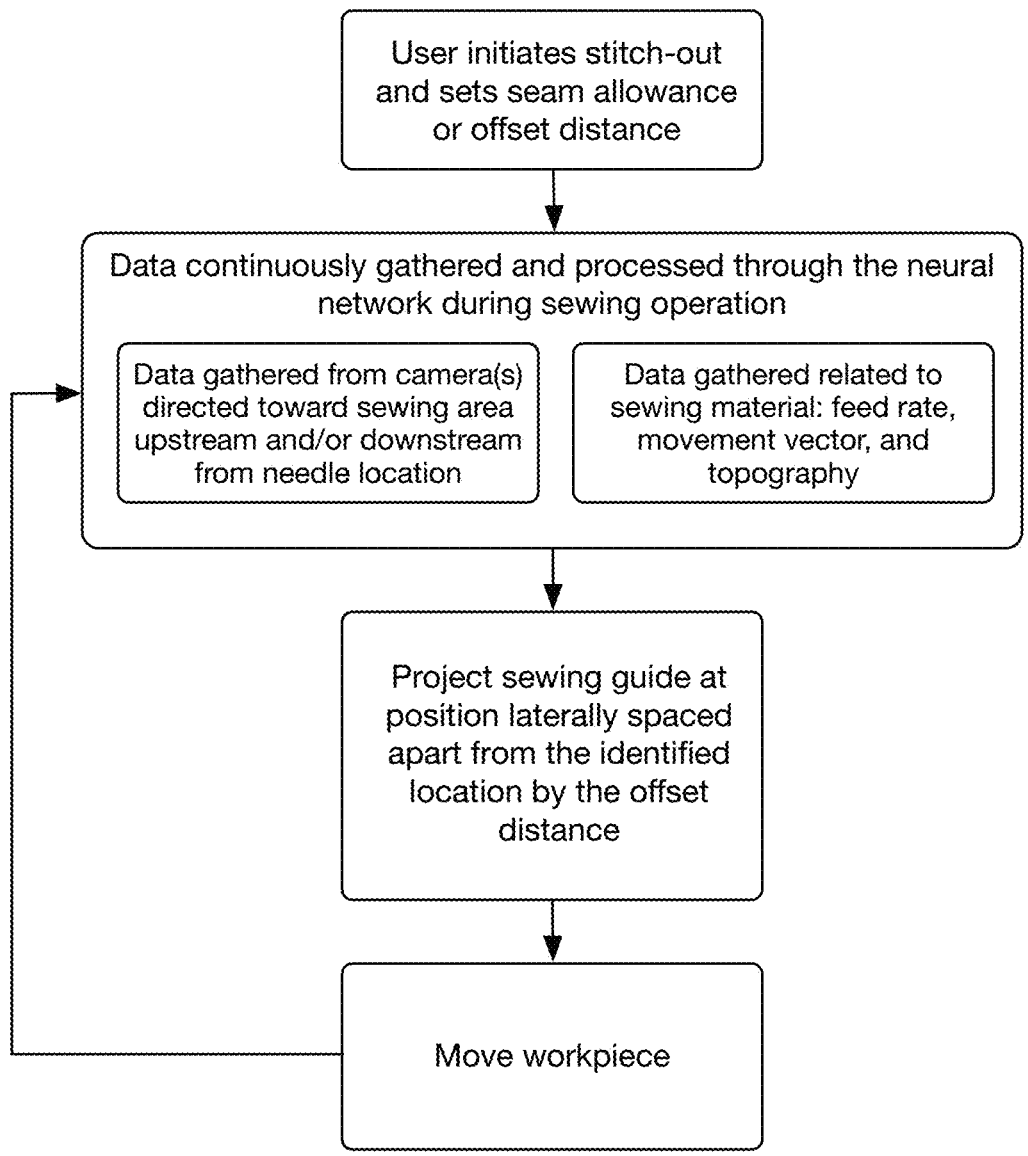

The projector of the sewing machine can be used in conjunction with the artificial intelligence techniques described herein to improve the placement of images projected onto the workpiece. For example, as is shown in FIG. 107, a neural network can be used to identify a feature of a workpiece so that a sewing guide can be projected at the location of the feature or at a predetermined distance from the feature. When the workpiece is arranged on the sewing bed, data is gathered continuously from sensors and processed through the neural network. The gathered data includes data gathered from camera(s) directed toward the sewing area upstream and/or downstream from the needle drop location, data related to the sewing operation (e.g., the stitch type and parameters), thread data (e.g., thread tension), and data gathered that is related to the sewing material (e.g., the feed rate, movement vector, and topology of the workpiece). The data is processed through a neural network that has been trained to detect and recognize a feature of the workpiece, such as, for example, an edge, a seam, a "ditch" between two pieces of fabric, a buttonhole, a pocket, or the like. That is, the neural network provides a probability of confidence as to the location of the feature and specifics about its appearance. As the user begins sewing—such as by pressing down on the foot pedal, pressing a button, giving a voice command, etc. —and moves the workpiece into position under the needle, the sewing machine detects and recognizes the feature and controls the projector to project a sewing guide, such as a straight line in the feed direction, at the location of the feature or at a predetermined offset distance from the identified feature. For example, the user can specify a seam allowance of one-half inch and can activate a sewing guide that projects a line one-half inch from the edge of the workpiece that moves with the workpiece when the workpiece is moved by the user so that the user can correct the lateral position of the workpiece to form stitches in a desired location.

Figure 41:
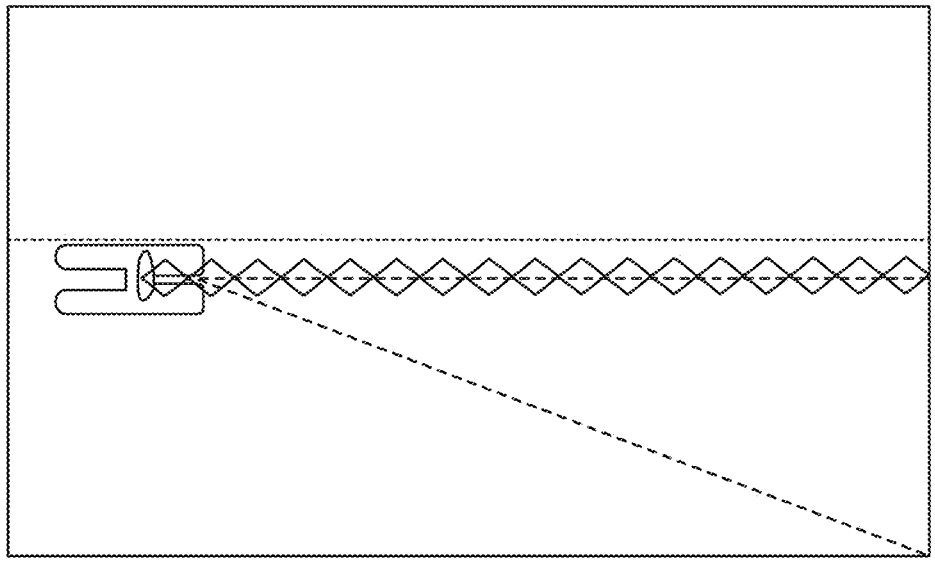
FIGS. 40-42 show various views relating to an exemplary sewing projection feature of an exemplary sewing machine.
Figure 40:
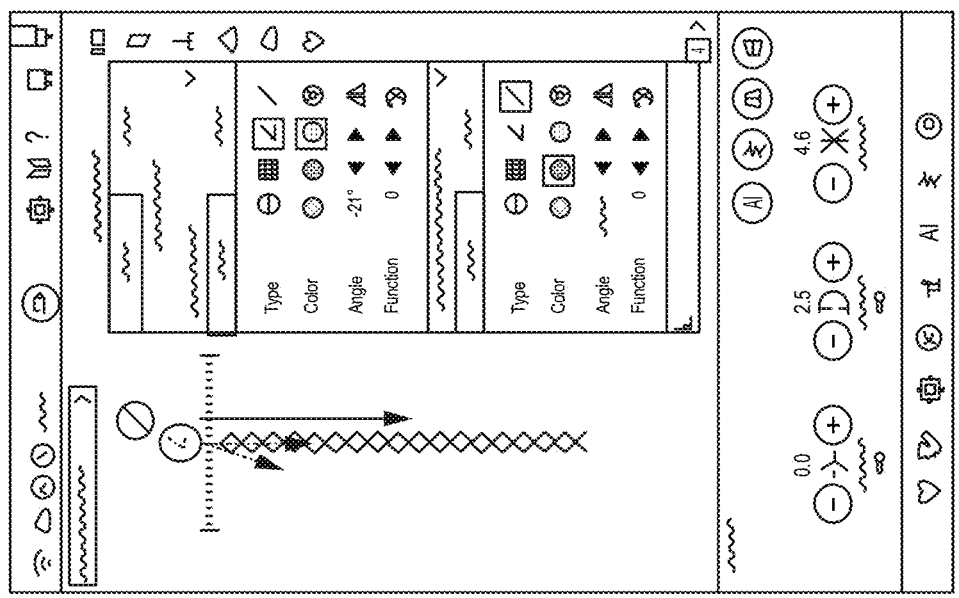
Figure 42:
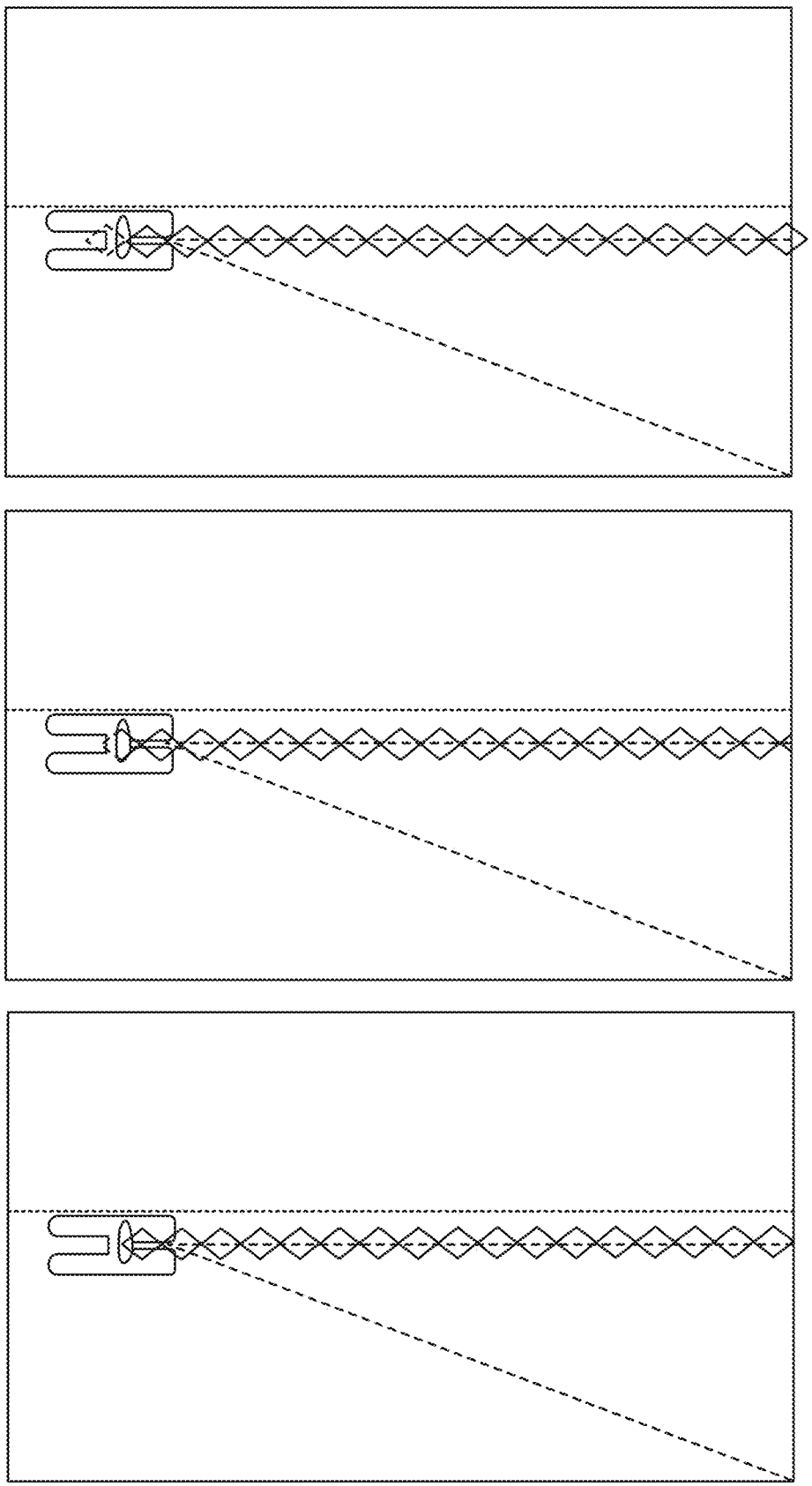
Figure 43:
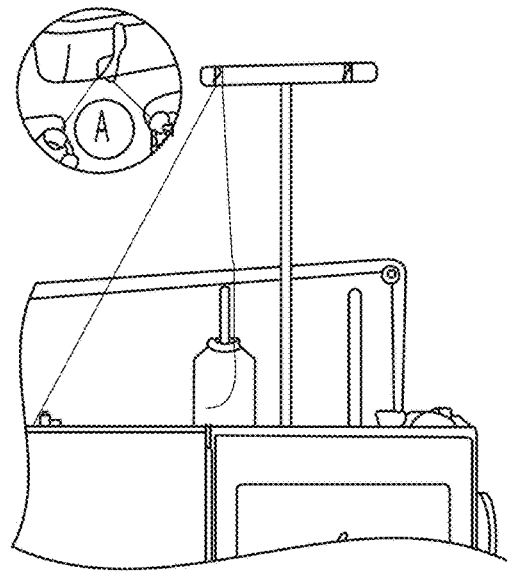
Figure 44:
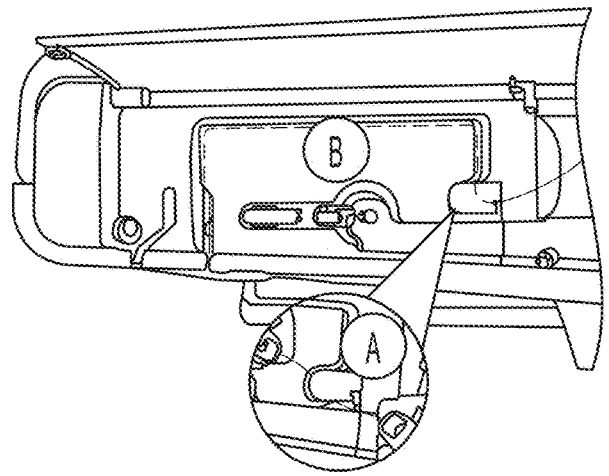
Figure 45:
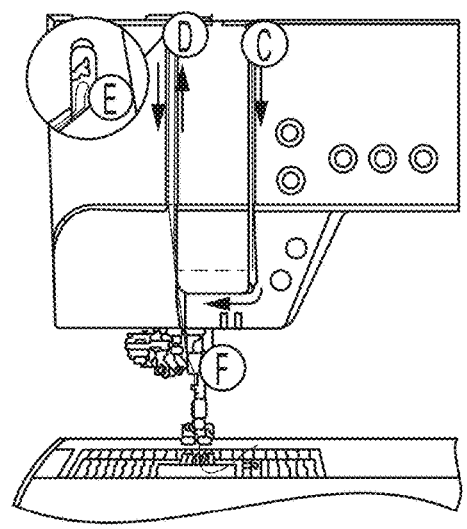
Figure 46:
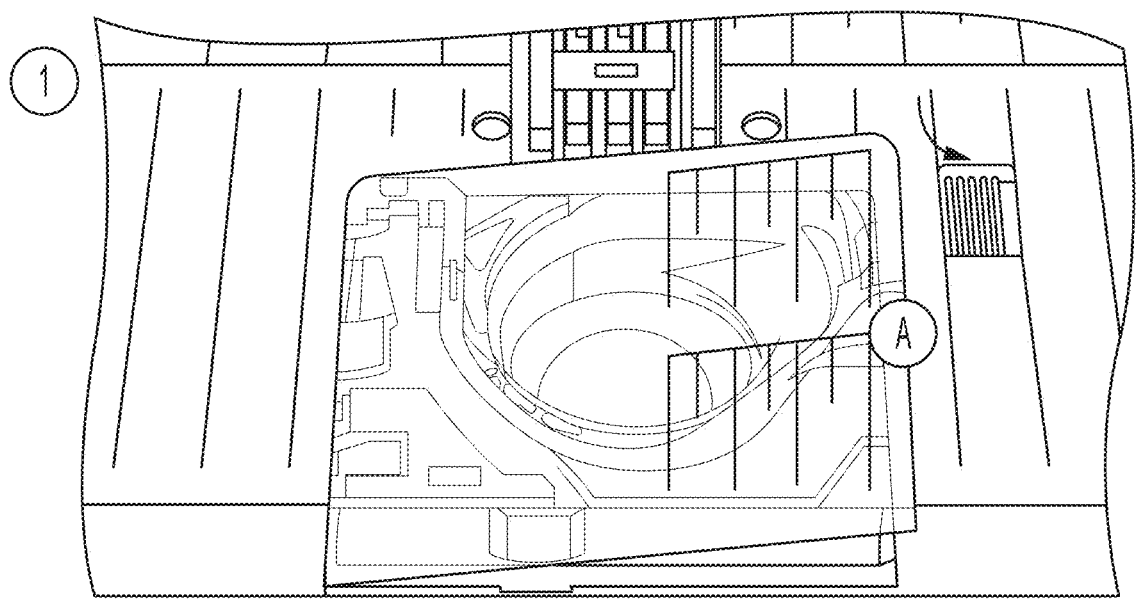
Figure 47:
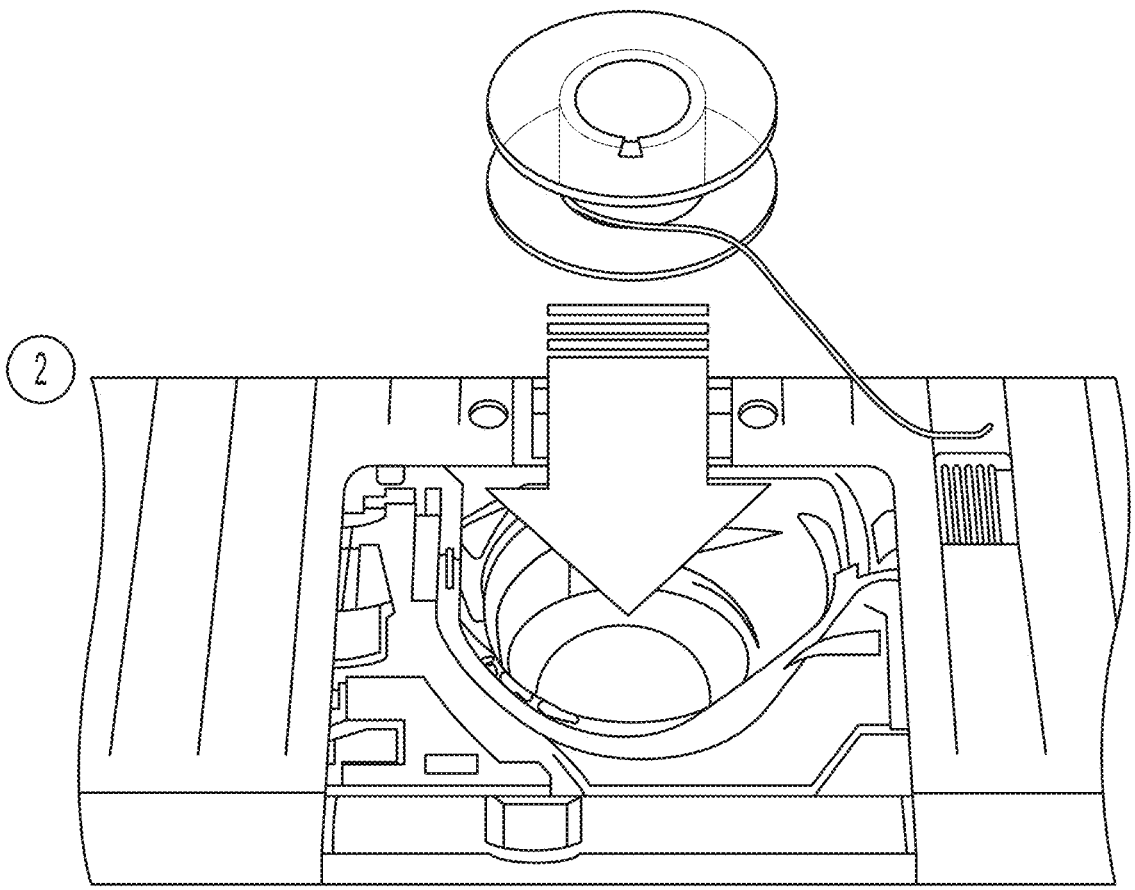
Figure 48:
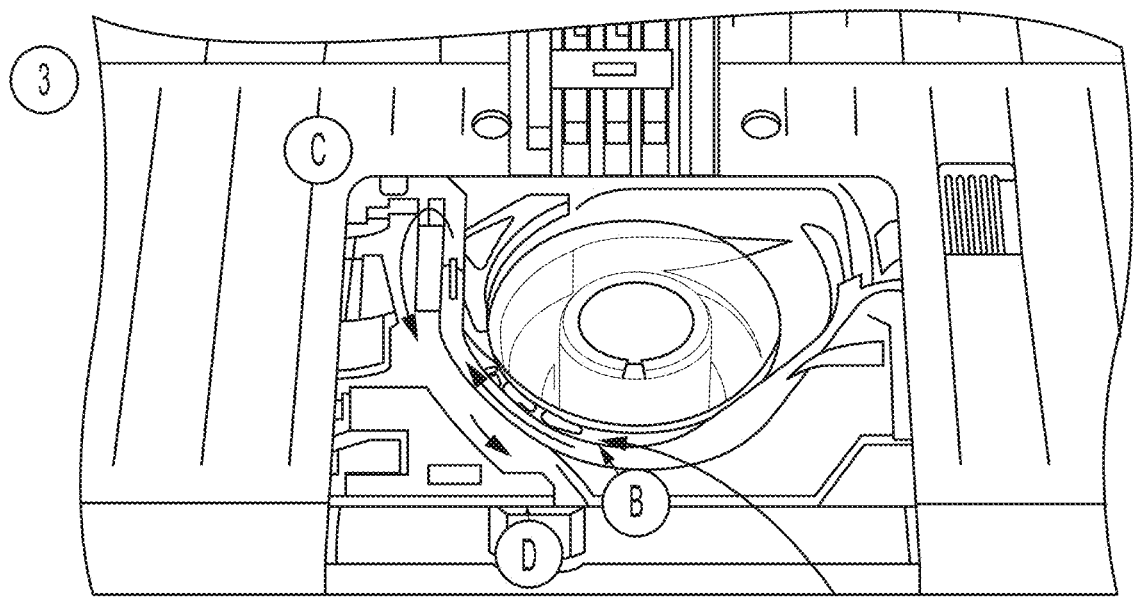
Figure 49:
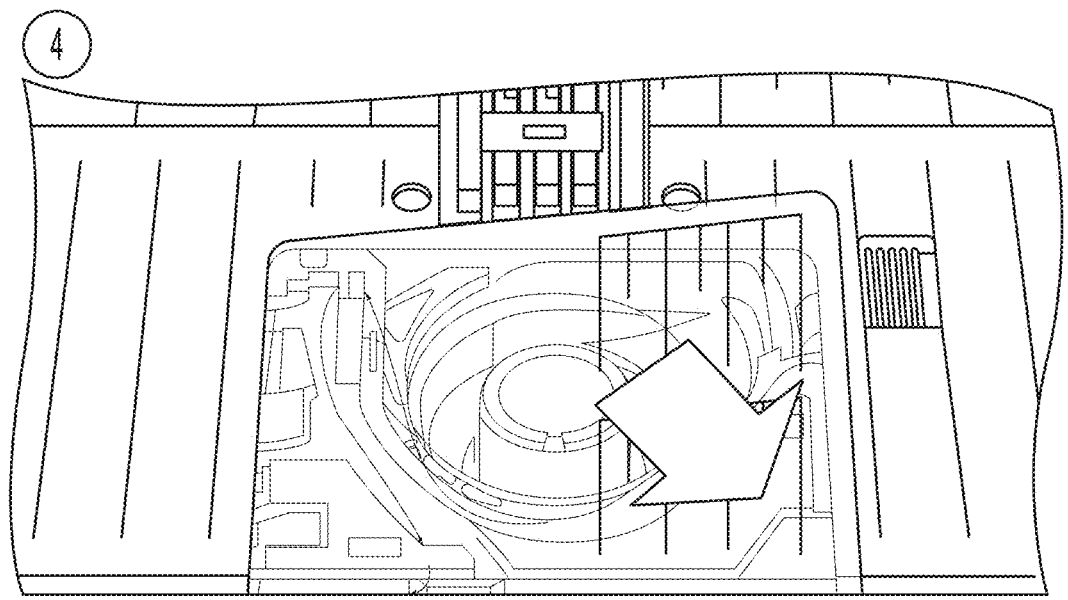

Referring now to FIGS. 40-42, various views and diagrams are shown that are related to the use of artificial intelligence in the sewing machine to predict the path of the stitches being formed so as to project an image of the predicted stitches onto the fabric ahead of the needle position to inform and guide the user. As with the stitch regulation and control features described above, the optical sensor gathers visual data from the fabric workpiece and provides that data to the computer. The computer processes the data through a neural network that has been trained to predict the sewing path based on visual data regarding the already formed stitches and the parameters of the sewing machine, such as, for example, the needle position and speed, the fabric position and speed, the feed dog rate, the force applied by the presser foot, the tension in the upper and lower threads, the speed selected by the user, and the like. The neural network processes the data and provides a predicted sewing path to the computer of the sewing machine which then projects a series of stitches along the predicted path in front of the needle. The type of stitch selected by the user via the user interface (FIG. 40) is incorporated into the projected view (FIG. 41) so that the user can see the shape of the stitches to be formed along the predicted sewing path. As the workpiece is moved by the user or the fabric translating portions of the sewing machine, the projected path of stitches moves as well so that the path appears in a constant location on the workpiece. (In an embroidery machine, a projected embroidery pattern can move with the workpiece during movement of the embroidery frame.) The predicted path can also be adjusted to suggest a path that the user can follow to return to a pattern that has been deviated from. The projected path of stitches can also start at the needle drop point and extend in a straight or curved line in the feed direction that does not move when the workpiece is rotated or translated.

Referring now to FIG. 42, a line of predicted stitches is shown projected in a black color, and the formed stitches are shown in blue. The projected stitch appears to be consumed by the real stitch being formed in the workpiece. A prediction distance can also be set by the user so that only a few predicted stitches are shown or a line of stitches is shown extending to the limits of the range of the projector. An embroidery pattern can also be projected in a similar fashion so that the projected stitches disappear as the pattern is formed in the workpiece. As the workpiece held by the embroidery frame is moved, the projected image also moves to track with the workpiece so that the needle follows the projection of the predicted sewing patch.

Projecting a predicted path of stitches along the workpiece ahead of the needle has many benefits. In some situations, a user may want to place a smooth curve of stitches that ends up near or a certain distance from an existing feature of the workpiece. Or, the user may want to avoid contacting or overlapping existing features of the workpiece. In these cases, a predicted sewing path that moves with the workpiece would facilitate the creation of the desired seam in a single pass. Additional information can also be provided other than the predicted sewing path. For example, the projected stitches might change color if the projected path is predicted to encounter or come too close to a feature of the workpiece that the user has designated as an object to avoid, or that the sewing machine identifies and predicts that the user would want to avoid, such as a pin, a button, another seam, a button hole, a decorative element, the edge of the fabric, or the like. The projected stitches might also flash on and off in these scenarios and can be combined with other notifications, such as audible or tactile feedback as is discussed in the present disclosure. Alternatively, the projected path could automatically be altered by the sewing machine to steer the user around the obstacle, with the original path and the new, altered path being projected in different colors and/or with motion cues that clearly indicate that the path has changed—such as, for example, by flashing or otherwise animating arrows near the path.

Such cautionary signals and warnings could also be sent if the users fingers are moved into the predicted sewing path or in the path of another component of the sewing machine, such as the presser foot or an attached accessory. It should be noted that the projector is not limited to projecting only the predicting sewing path and can also project many other symbols and/or words near the projected path to inform and alert the user as to changes in the path or obstacles to watch out for. For example, the neural network can identify a button on the fabric and provide the computer system with location and size data for the button so that the computer can instruct the projector to project an outline of the button around the button on the workpiece so that the attention of the user is drawn to that feature.

Figure 108:
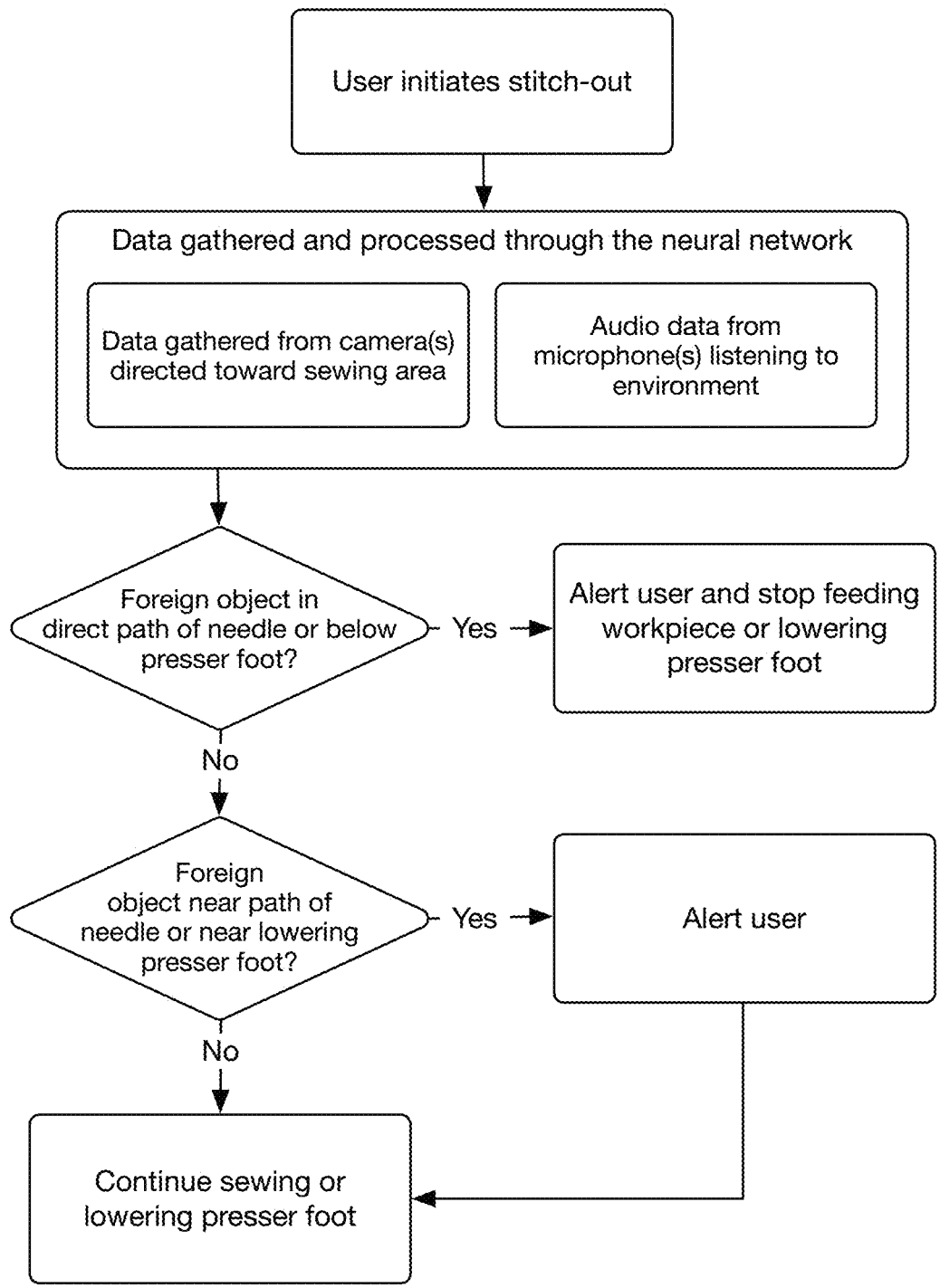

As a final measure, the sewing machine can stop altogether if an obstacle is about to be hit by the needle and the user has not responded to override the warning—for example, via the touch screen interface or via a voice-control system—to avoid the obstacle. FIG. 108 shows a flow diagram that illustrates the use of a neural network to avoid harm to the user or damage to the sewing machine during a sewing operation. When the user initiates stitch-out on the sewing machine, data is gathered from camera(s) directed toward the sewing area and can also be gathered from other sensors, such as, for example, one or more microphones listening to the environment to capture vocal cues or other expressions made by the user. The gathered data is processed through a neural network that has been trained to detect foreign objects that can be harmed by the sewing machine or could cause damage to the sewing machine. For example, the neural network can identify the fingers of the user below the presser foot or in the path of the needle. The audio data may also be helpful to determine if the user is having a conversation and may be distracted, thereby increasing the probability of an unintended finger or hand placement. Once the object is identified, the sewing machine can alert the user and stop the sewing operation or lowering of the presser foot to avoid harm to the user and sewing machine. The foreign object might not be directly in the sewing path but can be near the path, thereby leading to an alert being generated by the sewing machine. For example, the sewing machine can alert the user audibly or could project a warning on the workpiece, as described above. If no foreign objects are detected, the sewing operation proceeds in a normal fashion.

In addition to compensating for deviations from a desired sewing path, the data gathered by the sewing machine during the sewing performed by the user can be analyzed via a neural network to detect the level of expertise of the user. For example, frequent deviations from a desired sewing path may indicate that the user is a novice while a low number of deviations may indicate that the user is an expert. Instructions and training exercises can then be suggested to the user by the sewing machine for improving. Feedback may be shared via any single or combined means, including audio, text, video, image projection, and augmented reality configurations from the sewing machine or a connected device. Adjustments to the settings of the sewing machine can also be recommended to improve the sewing of the novice sewer and to improve the efficiency of an expert sewer. The sewing machine can also suggest new opportunities and challenges for advanced users to help them further enhance and expand their skill set.

Figure 109:
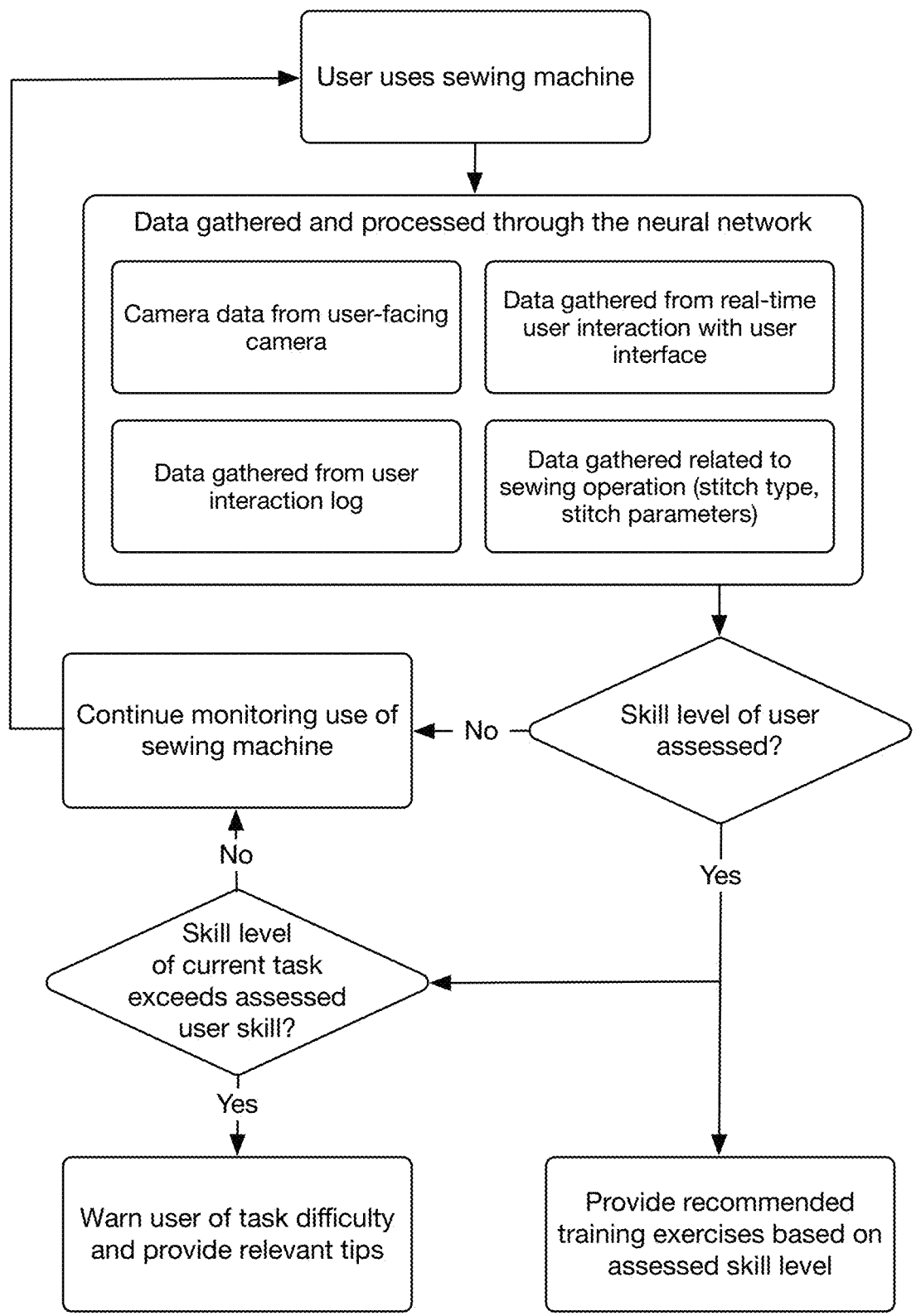

An example flow diagram for using a neural network to detect thread issues is shown in FIG. 109. When the user uses the sewing machine in any way, data is gathered from user facing sensors such as a camera, real time interaction of the user with the user interface, a log of historical interaction with the sewing machine, and also information related to the current sewing operation, if any. The gathered data is processed through a neural network that has been trained to detect the skill level of the user, as described above. If the neural network has assessed the skill level of the user, the sewing machine can proceed to warn the user that the difficulty of a task exceeds the detected skill level or can provide useful tips or prompts as appropriate. As noted above, the sewing machine can also provide recommended training exercises based on the detection of the skill level of the user.

An analysis of the level of expertise of the user can also be applied to the interaction between the user and the sewing machine. That is, the sewing machine can detect via neural network analysis that the user is struggling to properly use a feature of the sewing machine and can suggest tutorial videos or instructions and can provide prompts on the screen to help the user know which user interface control to interact with next. User interaction data can include the user-facing camera data described above and can also include timing information from the user interface that indicates the speed at which a user interacts with the settings of the sewing machine. The timing of the user's interaction with the sewing machine can be one indicator of the skill level of the user; i.e., a user who more swiftly selects menu items in a user interface is likely more familiar with the sewing machine and, combined with other data, can help the sewing machine identify an estimated skill level of the user. As an example, after a feature is activated the sewing machine may highlight a button and present a pop-over message that prompts the user to take a next step to use the activated feature. Input from a user-facing camera and facial recognition techniques provide further input as to the emotional state of the user when interacting with the sewing machine. That is, graphical and audible prompts can be provided when the user appears to be frustrated or confused. Or, the sewing machine can refrain from presenting further prompts that may be perceived as irritating and unhelpful so as to best support and coach the user through whatever problem they are trying to solve.

Based on the data gathered from monitoring the use of the sewing machine, the sewing machine can also provide helpful recommendations for additional products or accessories. The advertisement of the product can be made via any single or combined means, including audio, text, video, image projection, and augmented reality configurations from the sewing machine or a connected device. In recommending products, the sewing machine or external processors collect and monitor data through real time or retrospective data analytics, specifically, for example, the frequency and preferences of the user's selection of sewing accessories, programs, and machines. For example, the sewing machine can keep track of how much of each kind of thread is used and, understanding typical thread purchase quantities, can recommend purchasing more of that thread when supplies are estimated to be running low. Another example would be when the user uses a certain presser foot for certain purposes and a more appropriate presser foot exists, the sewing machine can recommend purchasing the more appropriate option if the user has not entered it in a list of currently owned sewing accessories. The list of sewing accessories can be stored on one or both of the sewing machine and an app on a connected device. This data can be sent back to the manufacturer to enable engineering, marketing, and customer service groups to improve the quality of the sewing machine and other product offerings.

Referring now to FIGS. 43-65, various views and diagrams are shown that are related to the use of artificial intelligence in the sewing machine to identify the thread used in the sewing machine and the textile material of the workpiece to adjust sewing parameters and to provide information to the user regarding the combination of thread and fabric identified by the sewing machine. Referring now to FIGS. 43-49, portions of the sewing machine are shown that illustrate the path that a thread can follow to the sewing needle from a spool mounted on top of the sewing machine (FIGS. 43-45) and from a bobbin mounted below the needle plate (FIGS. 46-49).

Figure 50:
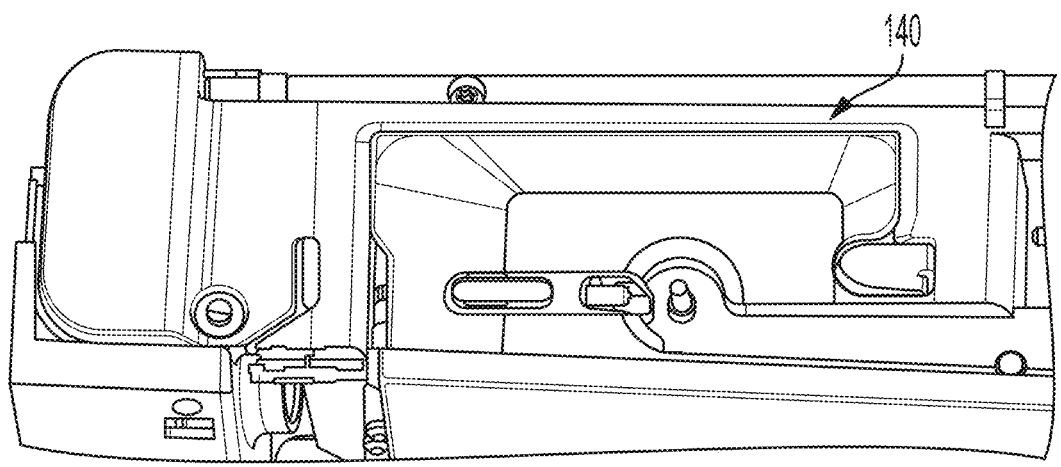
Figure 52:
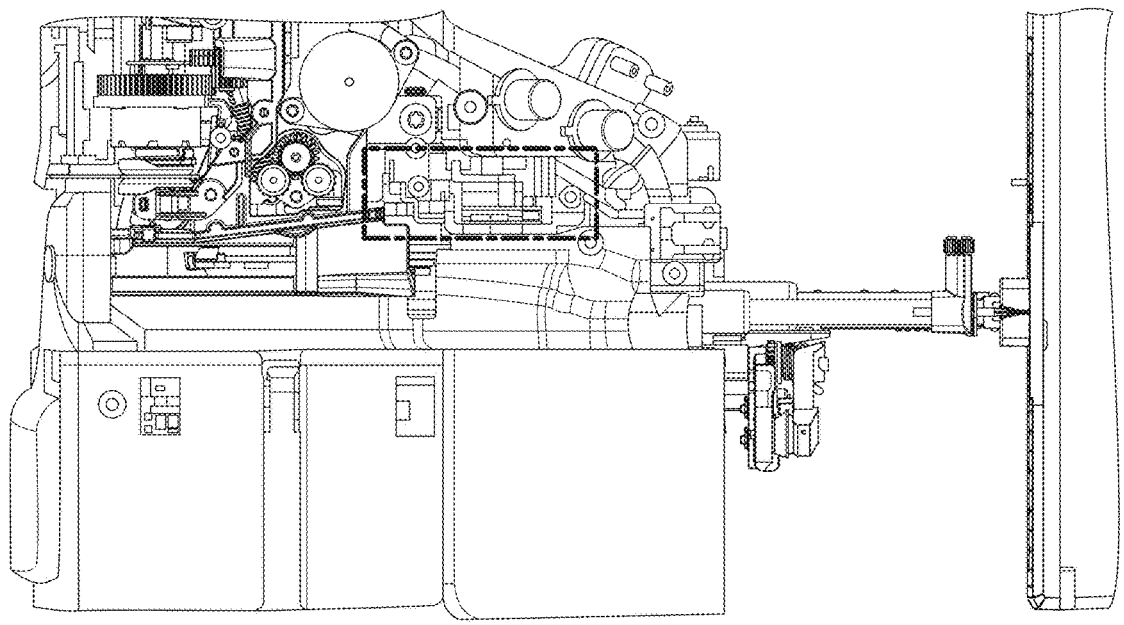
Figure 51:
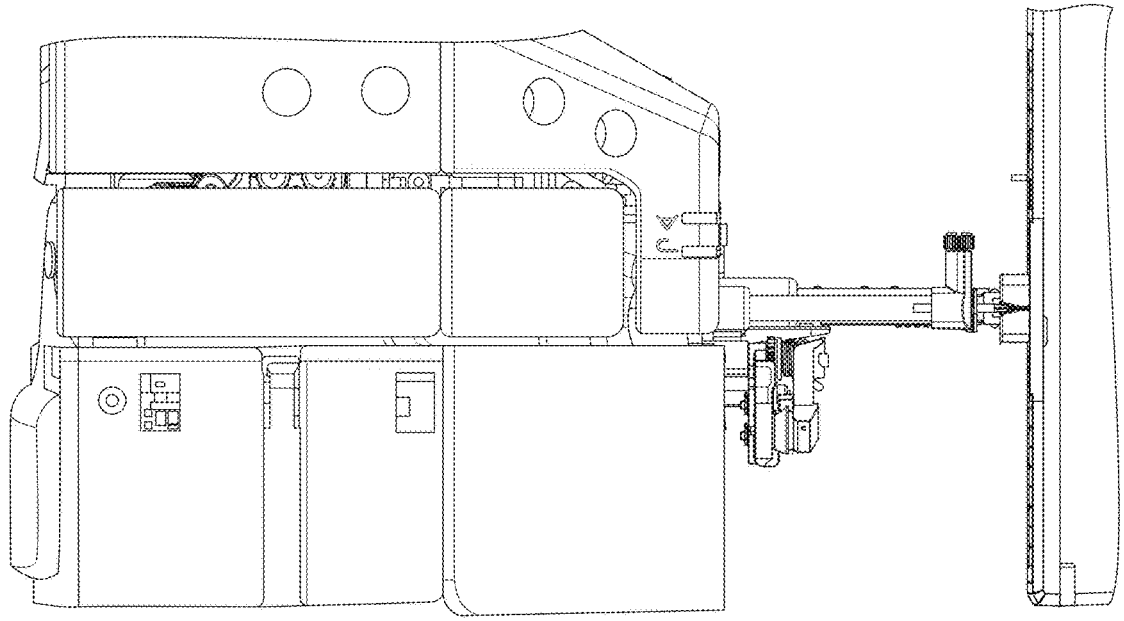
Figure 54:
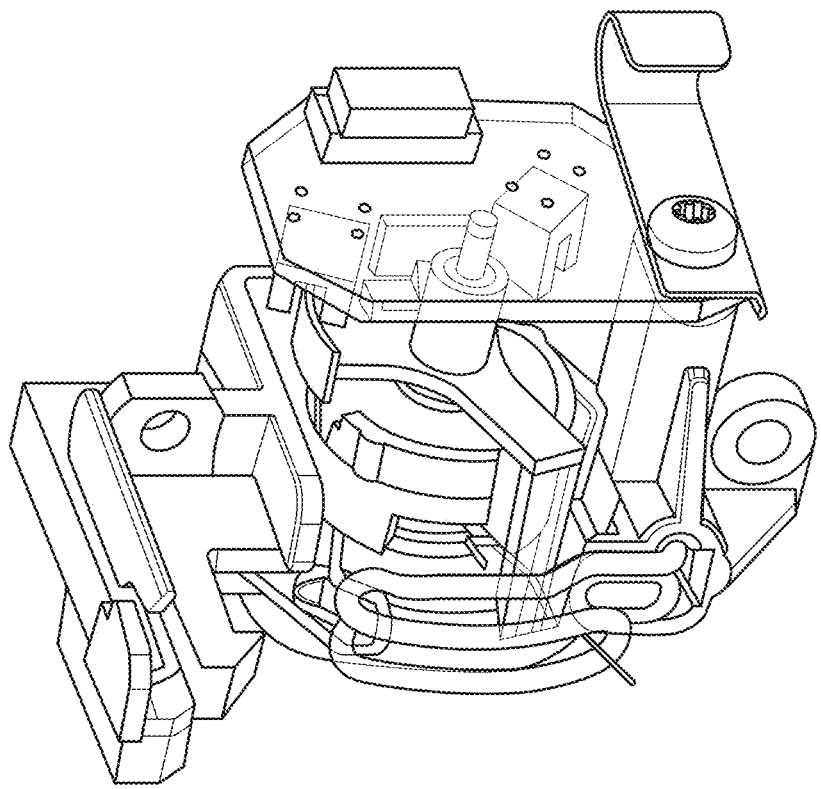
Figure 53:
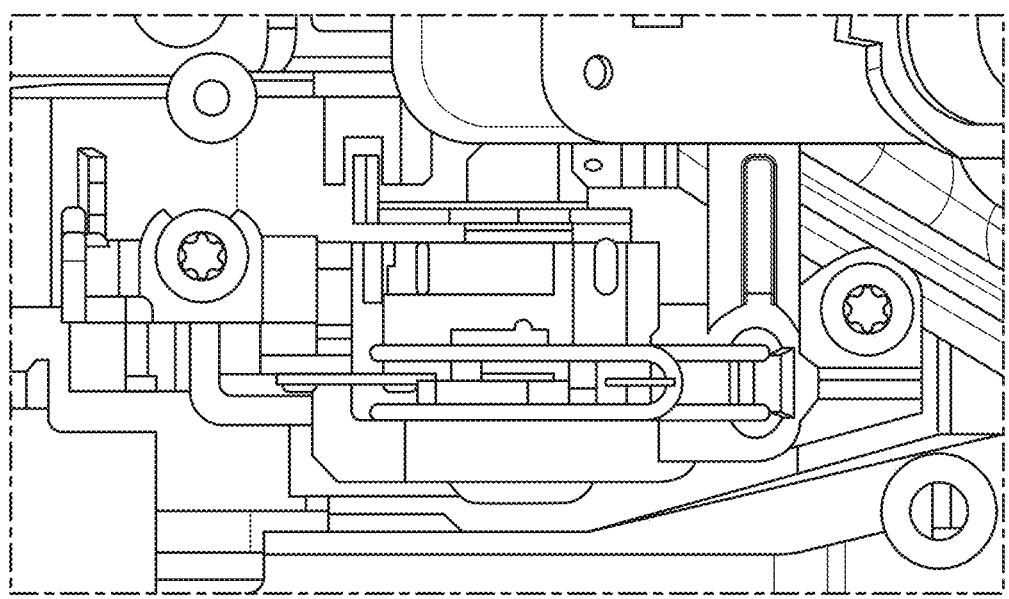
Figure 56:
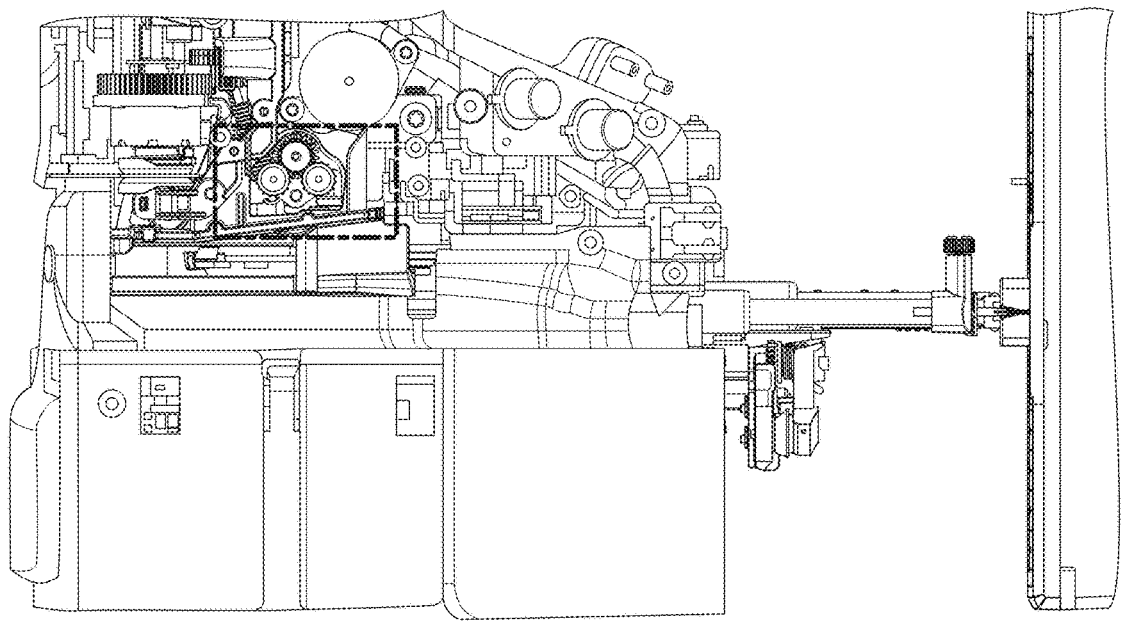
Figure 55:
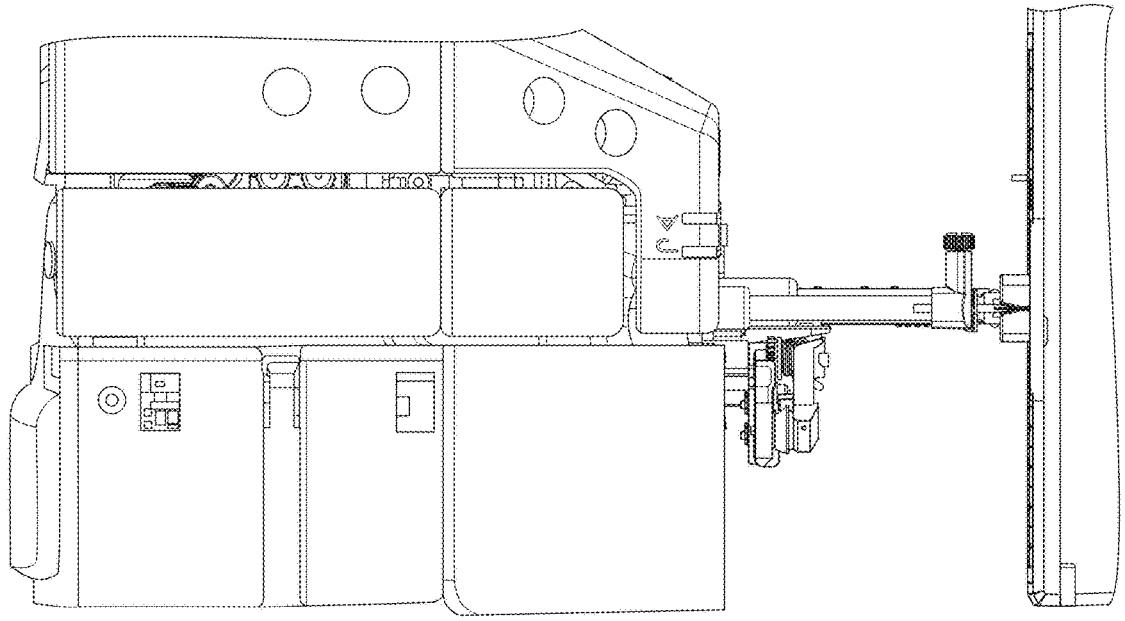
Figure 58:
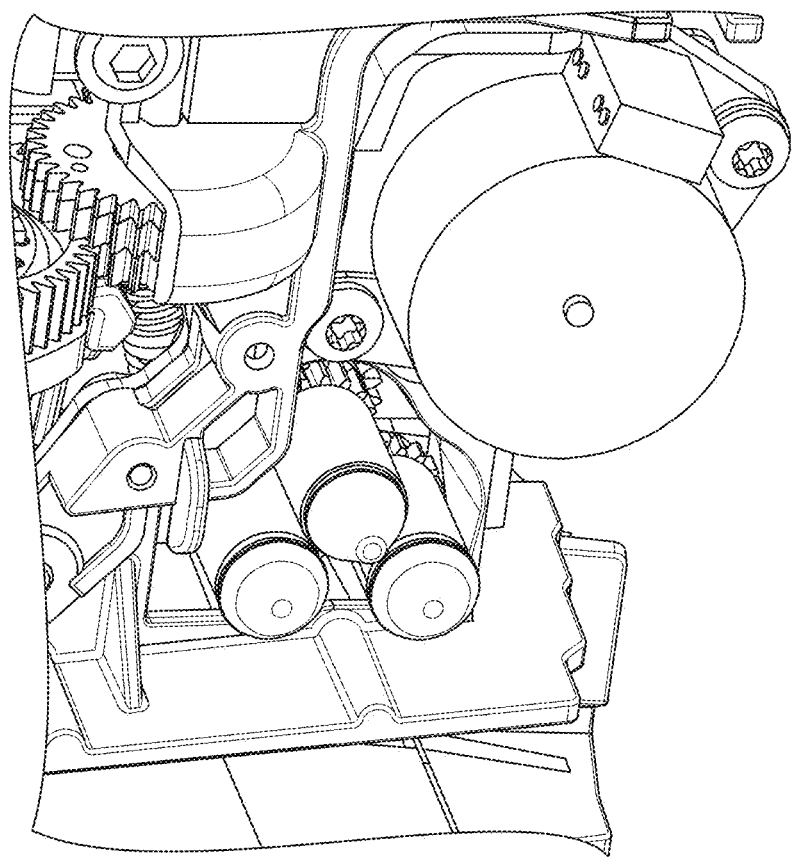
Figure 57:
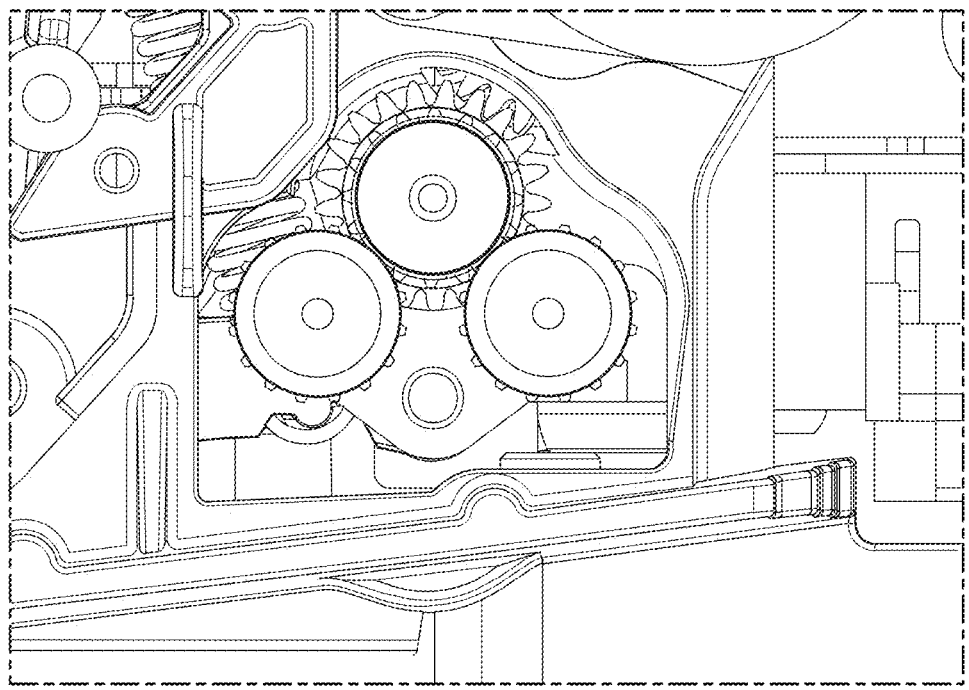
Figure 60:
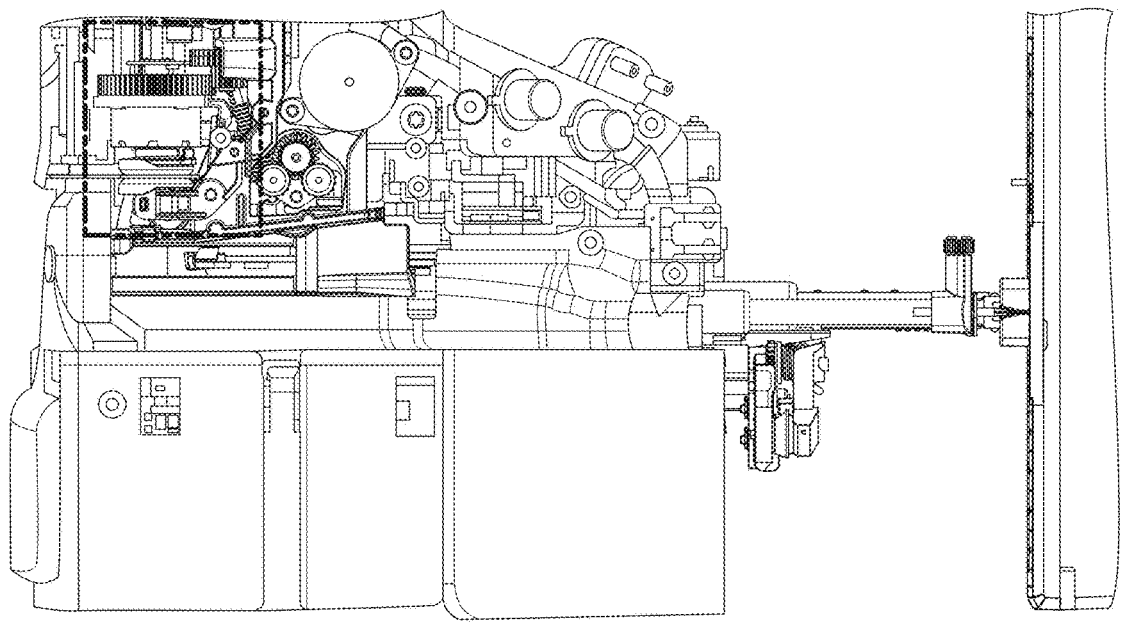
Figure 59:
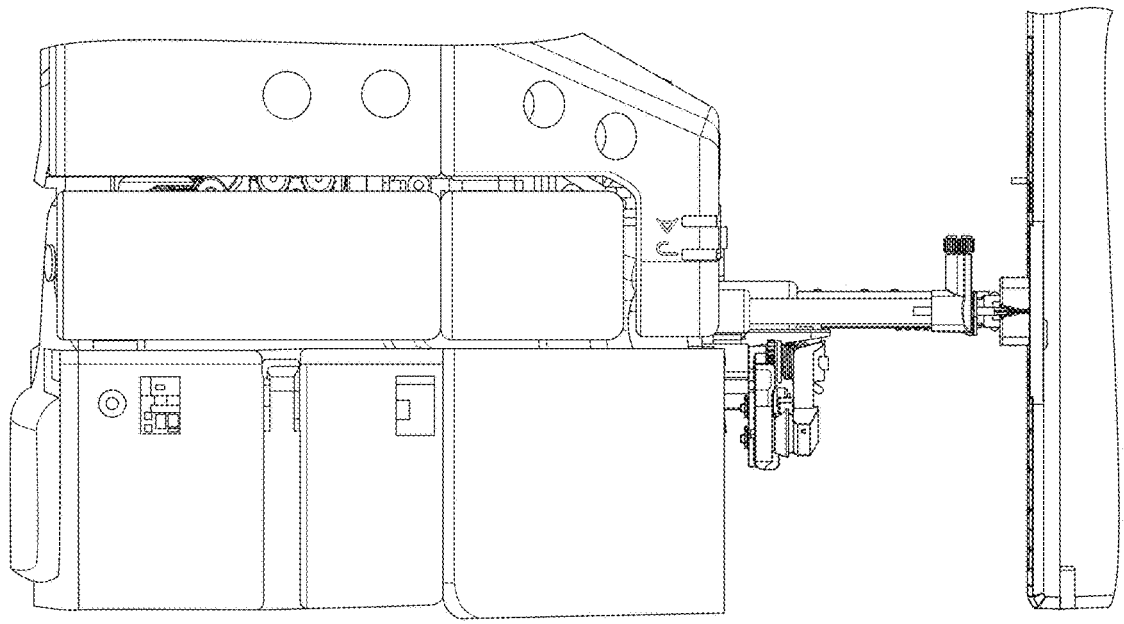
Figure 62:
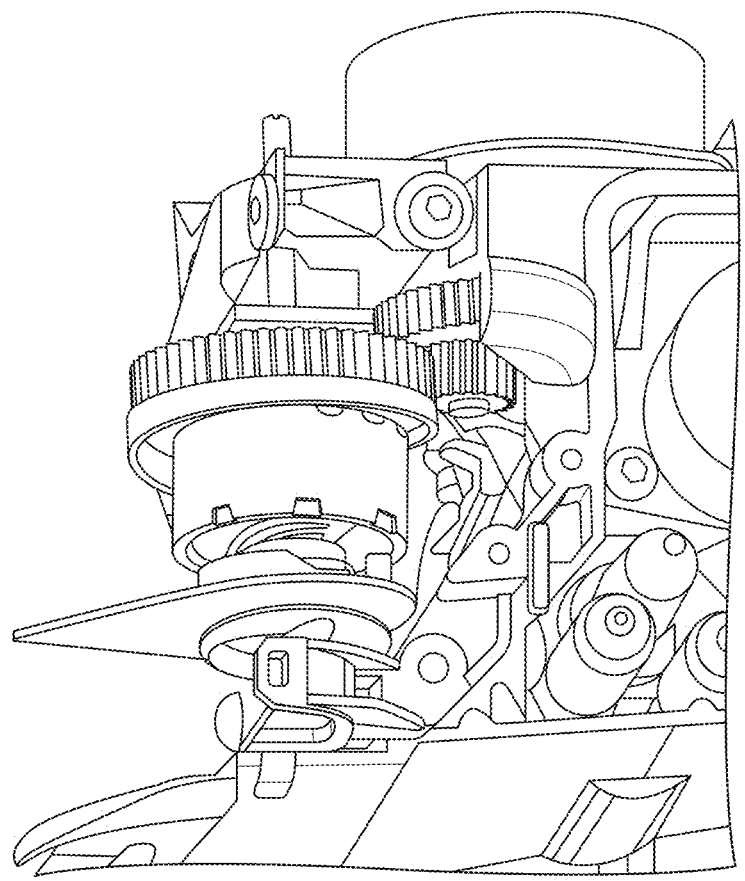
Figure 61:
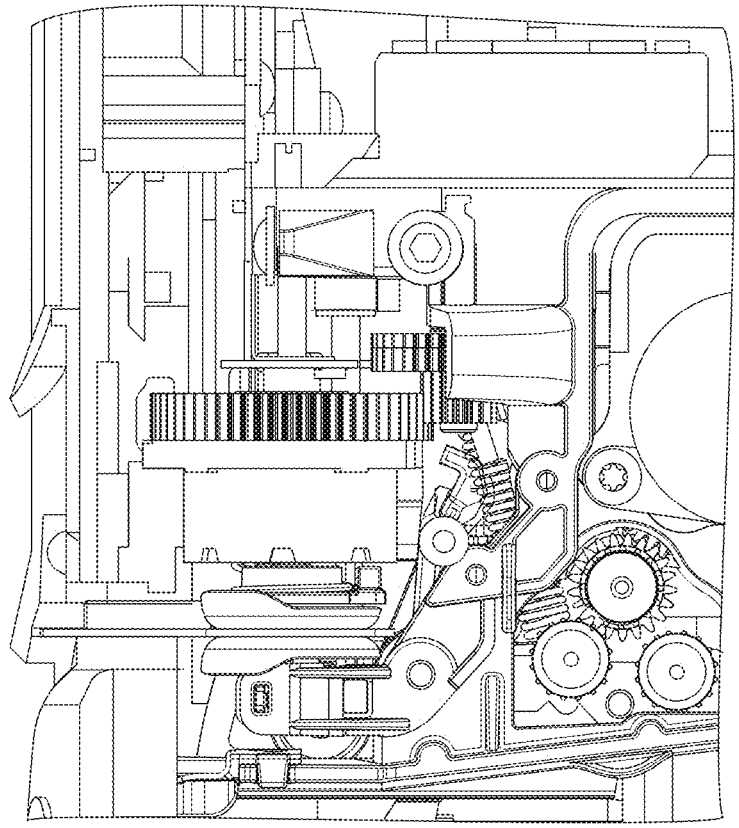
Figure 87:
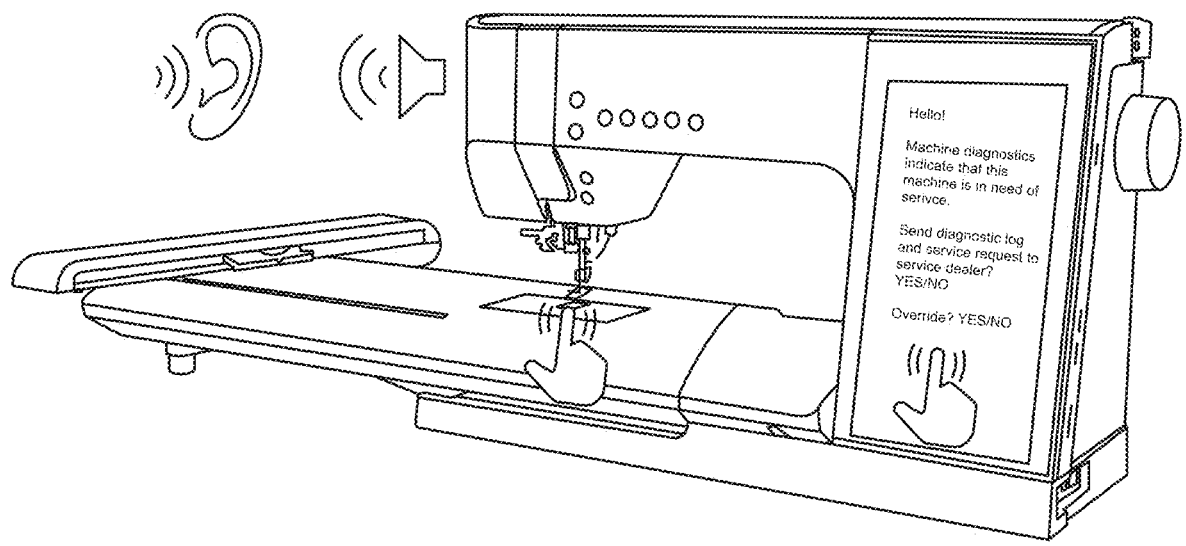

The sewing machine can include a variety of sensors along these thread paths to detect the type of thread that has been installed in the machine by the user. These sensors can include, but are not limited to, RGB sensors, light sensors, optical sensors, such as cameras, or the like. A source of illumination and a magnifying lens can also be provided with particular sensors. For example, an optical thread sensor can be included on top of the arm of the sewing machine and behind the location that the spool is mounted, as indicated in FIG. 50. An exemplary thread sensor 140 is shown in FIG. 87 that includes a tube-shaped housing 142 through which the thread 141 passes. The tube-shaped housing 142 blocks ambient light from impinging on the thread 141 so a light source 144 is provided to illuminate the thread 141 for detection with an optical sensor 146, such as a camera or RGB sensor, used to collect thread data. The sewing machine can also include sensors for detecting parameters of the thread and mechanisms for adjusting the same. The tube-shaped geometry of the sensor assembly provides a known background for the illumination of the thread, thereby increasing the accuracy and precision of the thread information gathered by the RGB or other sensor. The sensors provided in the tunnel shaped housing can detect light, sound, or other parameters of the thread to determine the color, the density or weight, the surface quality, the material or fiber type, and the overall quality of the thread. That is, the RGB or other sensors can be used to detect the intrinsic properties of the thread as the thread passes through the sensor housing.

The data gathered by the thread sensors is transmitted to the computer of the sewing machine and can be compared to a thread information database that contains information regarding a wide variety of thread types and colors. The sewing machine can therefore identify the thread and present information to the user that may be unknown to the user. If the specific thread can be identified from information on the spool (entered manually by the user or detected by the machine) the detected thread properties of the thread can be compared to the stored thread properties from the thread information database. Thus, the sewing machine can detect thread that differs significantly from the stored thread properties that may indicate a defective spool of thread so that the user can be presented with an alert indicating the same. Information on the spool of thread can be gathered by an optical or other sensor arranged near a spool pin on which the spool is mounted during sewing. The spool information can also be gathered from the spool when the user holds the spool in front of an optical or other sensor arranged in the sewing head or another location, such as, for example, a camera in the sewing head or one or more cameras facing the user. The time and date of the identification of the thread can be stored and associated with projects, stitch types, and the like to build a history of thread use in the sewing machine.

The sewing machine can also include sensors for detecting the current condition of the thread as the thread is being manipulated by the machine and can include mechanisms for adjusting the same. For example, the sewing machine can include thread tension sensors (FIGS. 51-54), a thread portioning unit (FIGS. 55-58), and a thread tension unit (FIGS. 59-62). The sensors for detecting the intrinsic properties of the thread and the current condition of the thread are arranged to gather data about the quality and condition of the thread as the thread passes from a spool or bobbin, through a thread tensioner, around a hook or other element of the sewing machine, and eventually through the needle. As is described in greater detail below, the optical sensors can also be used in conjunction with a neural network to detect the type of presser foot and/or needle that are assembled to the machine.

The sewing machine also includes optical sensors or other sensors that can be used in conjunction with a neural network to detect the material or fiber type, the color, the reflectivity, the pattern, the weave direction, the orientation (i.e., right-side and wrong-side), and the topology of the fabric used in the workpiece. An exemplary sensor for gathering data regarding the fabric of the workpiece includes a source of radiation (e.g., an optical light source or an infrared light source) that is provided on the sewing head and directed downward toward the workpiece. A radiation detector, such as an optical light sensor or infrared light sensor is provided on the sewing bed, i.e., underneath the workpiece. It should be noted that the placement of the emitter and receiver can be reversed, that is, by providing the emitter in the sewing bed and the receiver in the sewing head. Thus, the amount or fraction of the emitted radiation (e.g., optical light or infrared light) that passes through the workpiece—and, consequently, the amount of radiation that has been reflected by the top surface of the workpiece—can be detected and measured. An ultrasonic emitter and receiver can be arranged in a similar fashion—i.e., with the emitter on the sewing head and the receiver in the sewing bed to provide a means for determining the density of the fabric more accurately than other techniques. These emitters and detectors—i.e., for light (IR, camera), color (RGB), ultrasound, etc. —can be used individually or together to determine the material or fiber type, the density, and the reflectivity of the workpiece material. Additional depth perception techniques described herein can also be used to detect the topology of the workpiece.

The data gathered by the fabric sensors is transmitted to the computer of the sewing machine or any connected external processor and can be compared to a fabric information database that contains information regarding a wide variety of fabric types having various colors and patterns. The sewing machine can therefore identify the fabric of the workpiece and present information to the user that may be unknown to the user. If the specific fabric can be identified from information on the bolt of fabric (entered manually by the user or detected by the machine) the detected fabric properties of the fabric can be compared to the stored fabric properties from the fabric information database. Thus, the sewing machine can detect fabric that differs significantly from the stored fabric properties that may indicate a defective piece of fabric so that the user can be presented with an alert indicating the same. The workpiece identification data can be used in combination with stitch data to train a neural network to associate characteristics of the workpiece with different stitches. Consequently, the sewing machine can alert the user that stitches are being formed on the wrong side of a workpiece that is facing the wrong way.

Figure 63:
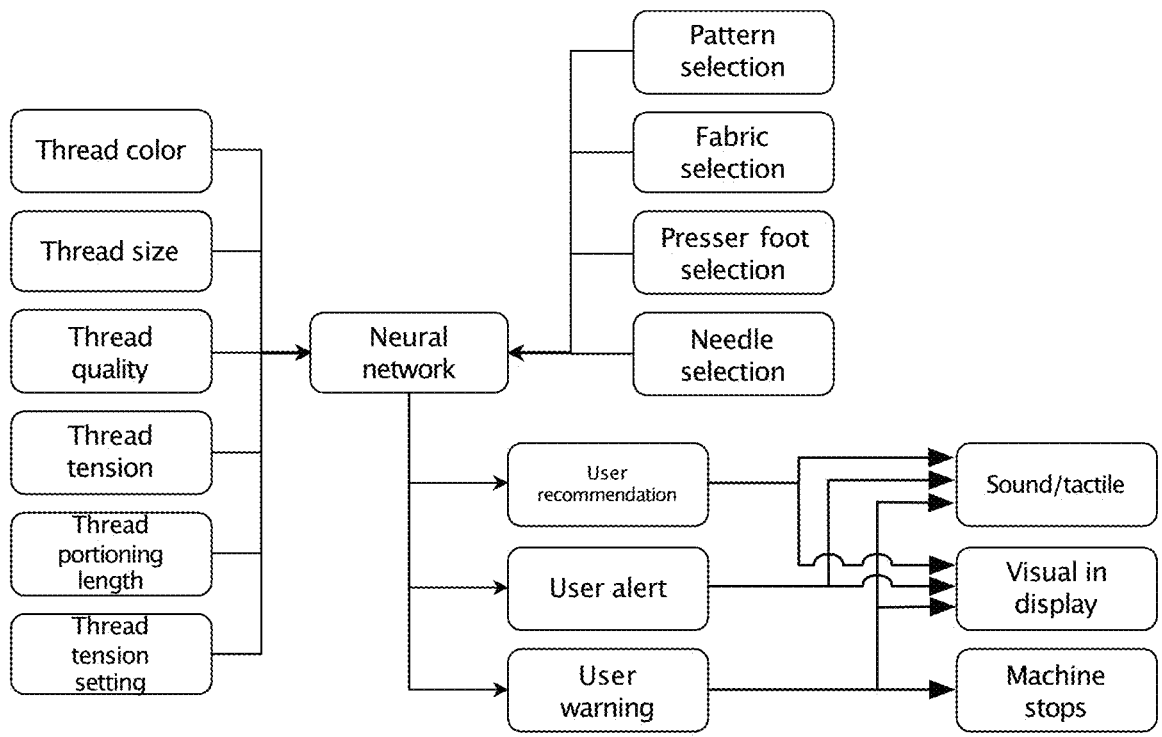
Figure 65:
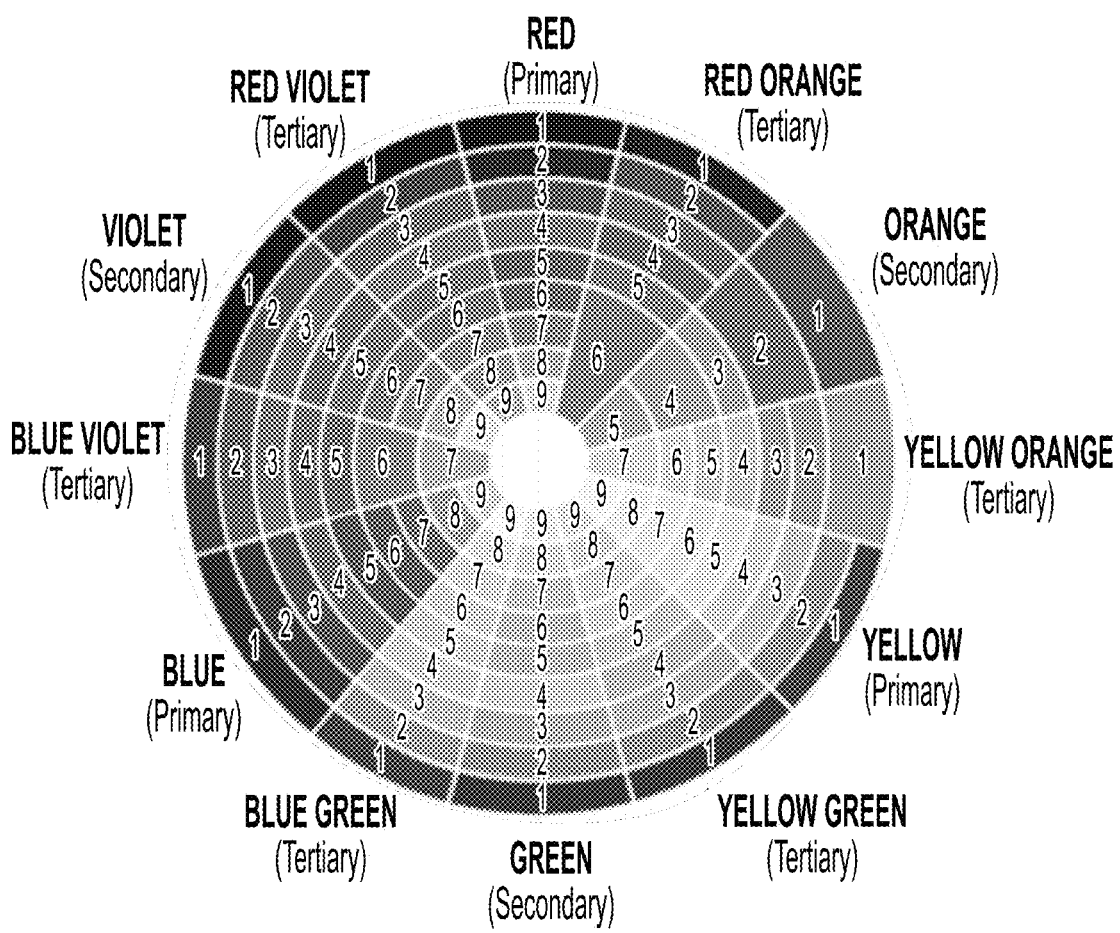

As can be seen in FIG. 63, data gathered by the various sensors and other devices described above is processed through a neural network by the computer of the sewing machine. The neural network is trained to provide recommendations, alerts, and warnings to the user based on the input data. That is, the neural network is trained to recognize combinations of types of thread, fabric, presser feet, and needles that are compatible and incompatible. For example, FIG. 64 shows a table of fabric and thread that indicates whether heavy or light fabric is compatible with heavy or light thread. If the sewing machine detects that there may be an issue with the combination of thread and fabric the user may be provided with a recommendation on the display that is accompanied by an audible or tactile notification. If the potential compatibility issue is more severe, the user can be alerted or even warned. In some scenarios, the sewing machine can stop altogether and provide a combination of audible, tactile, and visual warnings. In addition to notifying the user of a potential compatibility issue, the sewing machine can make adjustments—such as, for example, to the thread tension, presser foot pressure, the type and speed of the stitch, or the like—to improve the sewing performance when using heavy or light thread and/or fabric. Even when the right type of thread is selected for a given fabric, the color of the thread may not be aesthetically pleasing in view of the selected fabric color and/or pattern. Thus, the neural network can also be trained to advise the user as to the color and pattern compatibility of various threads and fabrics, as can be seen in FIG. 65.

Figure 102:
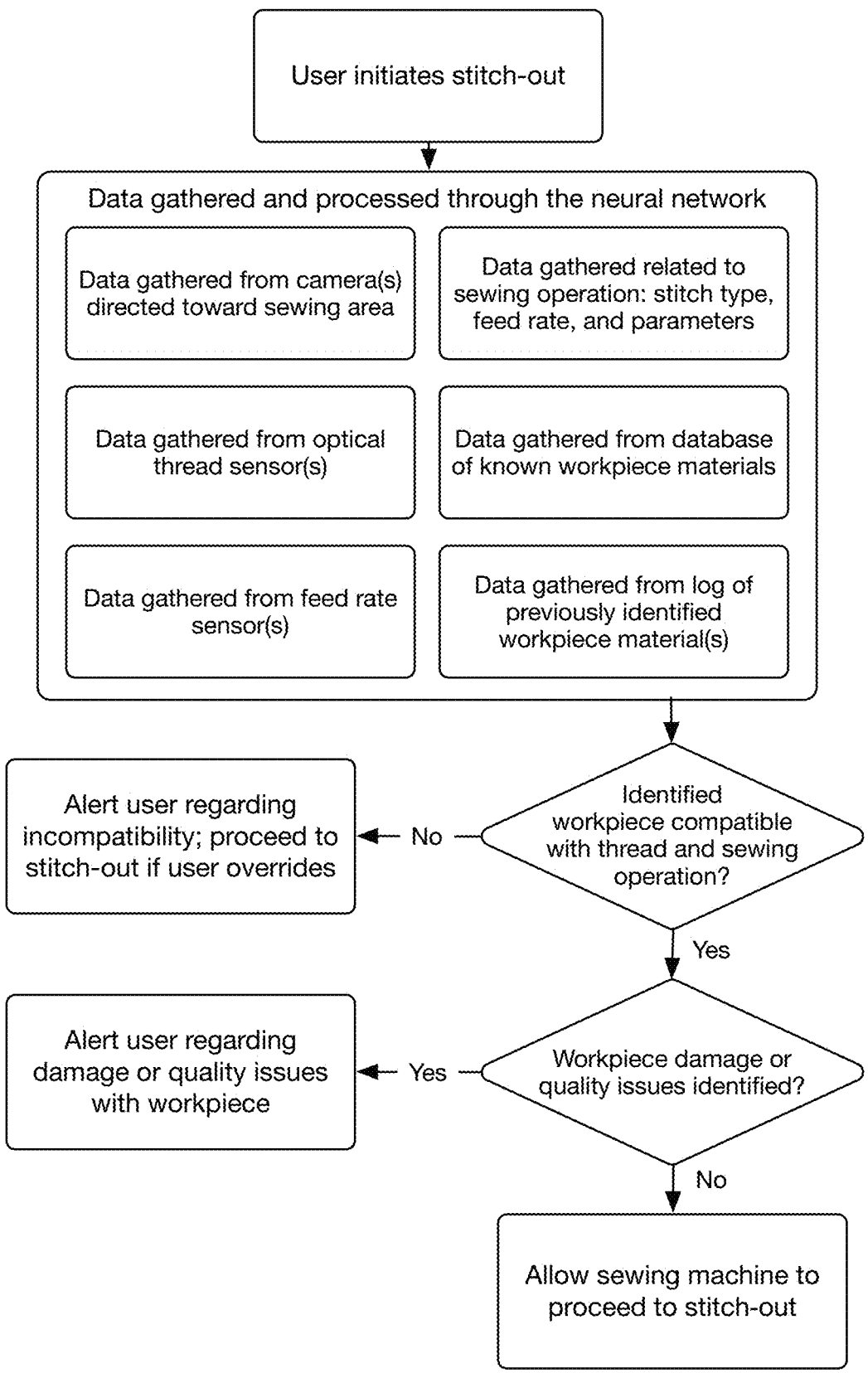

An exemplary flow diagram for using a neural network to identify the workpiece and potential issues with the workpiece is shown in FIG. 102. When the user initiates stitch-out on the sewing machine, data is gathered from: camera(s) directed toward the sewing area; the sewing operation; optical thread sensors; feed rate sensors; a database of known workpiece or fabric materials; and a log of previously identified workpiece materials. The gathered data is processed through a neural network that has been trained to detect workpiece compatibility issues, damage, and other thread quality issues. If the neural network identifies the workpiece and that the workpiece is incompatible with the current sewing operation and other sewing materials (e.g., a lightweight thread is likely to break when used with a thicker or heavier workpiece fabric) the sewing machine alerts the user and sewing can continue if the user chooses to override or disregard the notification. The user is also alerted if workpiece damage or other quality issues are identified. The sewing machine can optionally prohibit further sewing when the damage is sufficient and requires user intervention, for example, to replace or repair the workpiece.

Referring now to FIGS. 66-71 and 101, various views and diagrams are shown that are related to the use of artificial intelligence in the sewing machine to identify degraded thread quality to adjust sewing parameters and to provide information to the user regarding the quality of the thread being used. As is described above, the sewing machine can include a variety of sensors along the one or more paths that threads in the sewing machine take from a thread source to the sewing head, such as those shown in FIGS. 43-49. These sensors can include, but are not limited to, RGB sensors, light sensors, optical sensors, such as cameras, and the like. The sensors are arranged to gather data about the quality and condition of the thread as the thread passes from a spool or bobbin, through a thread tensioner, around a hook or other element of the sewing machine, and eventually through the needle. Additional sensors, such as a thermal sensor, can be included for monitoring the temperature of various components that engage and could cause damage to the thread.

Figure 66:
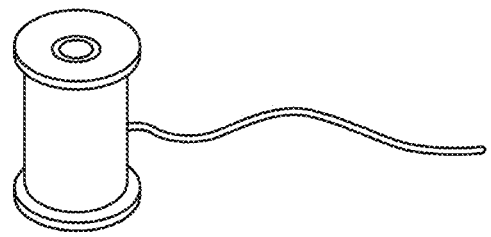
FIGS. 66-70 show various views relating to an exemplary thread quality monitoring feature of an exemplary sewing machine.
Figure 67:
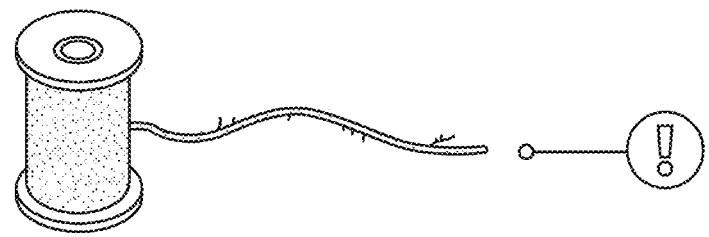
Figure 68:
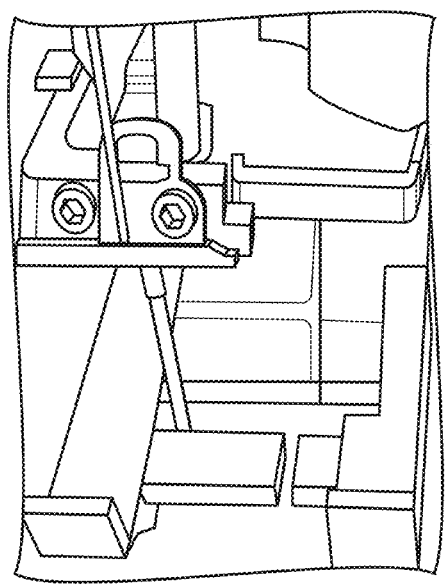

Referring now to FIGS. 66 and 67, examples of the appearance and characteristics of high- and low-quality thread are shown. Thread that is considered high quality or good condition thread has qualities including tight and secure fibers, consistent diameter, consistent color, consistent reflectiveness, and consistent frictional qualities. Thread that is considered low quality or poor condition thread has qualities including loose and fraying fibers, inconsistent diameter, inconsistent color, inconsistent reflectiveness, inconsistent frictional qualities, and is poorly spliced. Additional lights can be provided in or near the sensors—such as the tube-shaped sensor housing 142 described above—to provide a consistent light source when observing the thread so that thread is not misdiagnosed based on color changes in varying lighting conditions, such as, for example, daylight, cool white, horizon, and incandescent lighting. One or more optical sensors of the sewing machine can also detect build-up of debris in areas of the sewing machine where thread debris is known to build up when low quality thread is used, as can be seen in FIG. 68.

Figure 69:
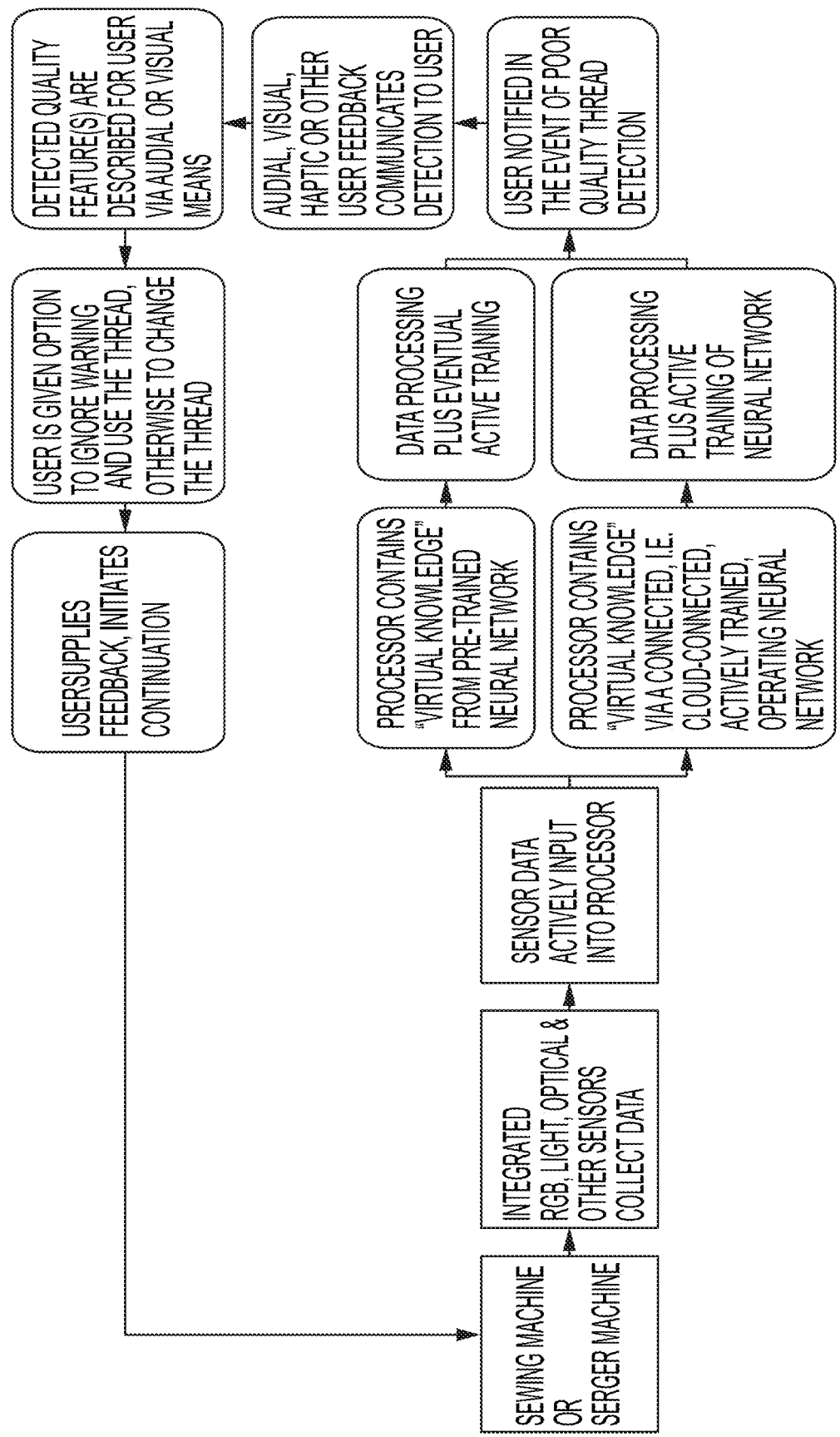
Figure 70:
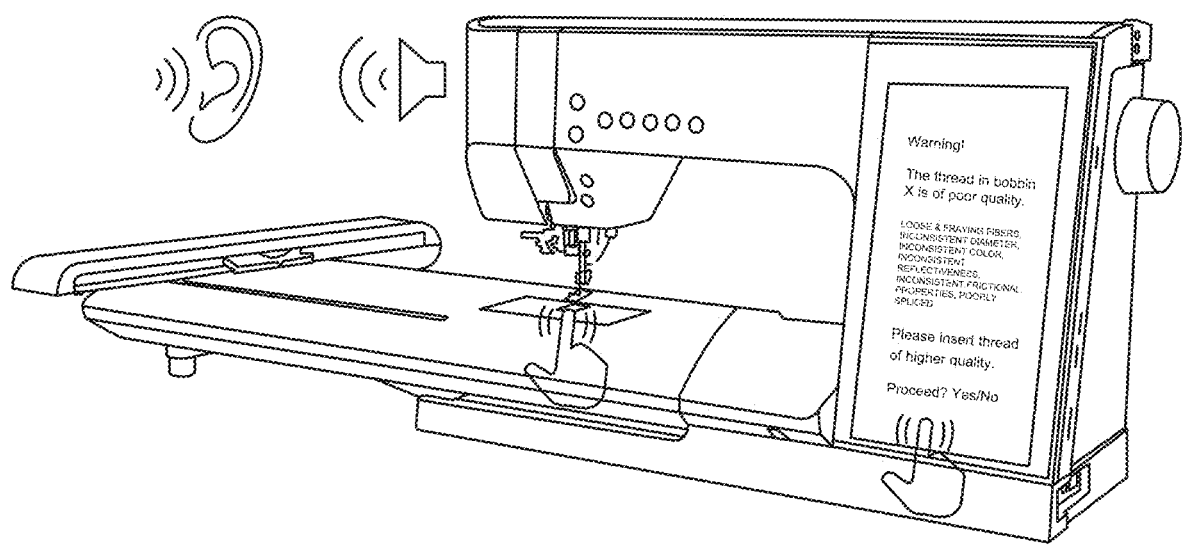
Figure 71:
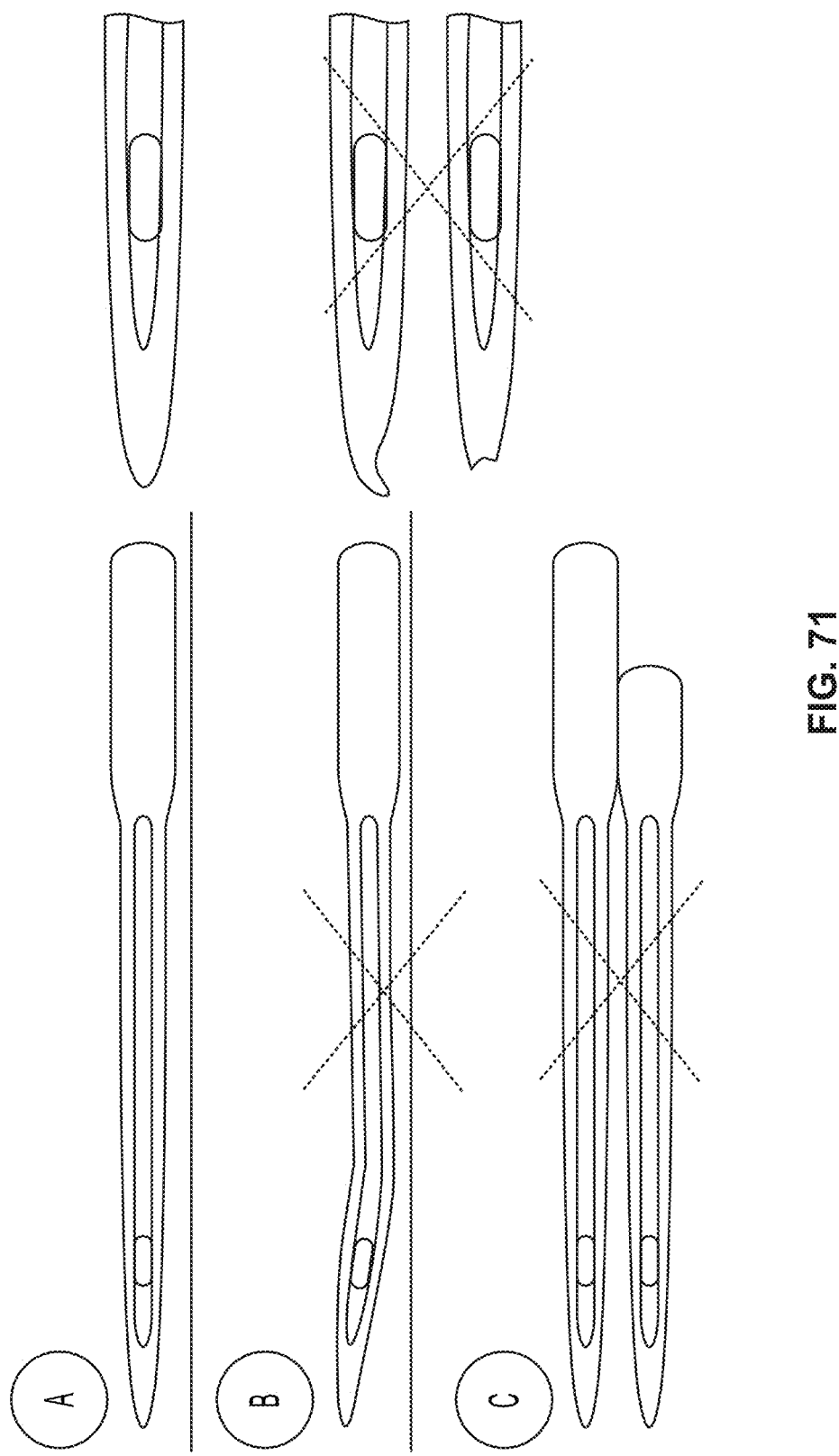
FIGS. 71-81 show various views relating to an exemplary object recognition feature of an exemplary sewing machine.
Figure 72:
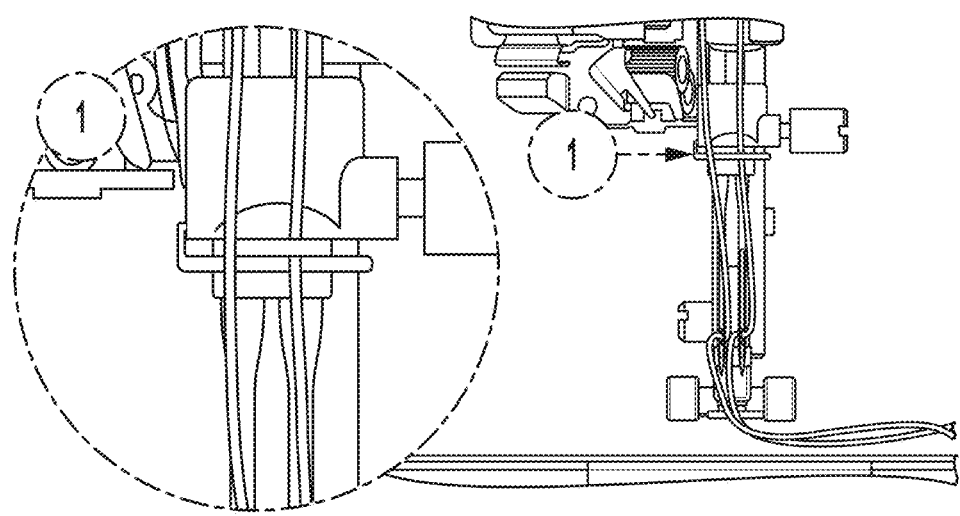
Figure 73:
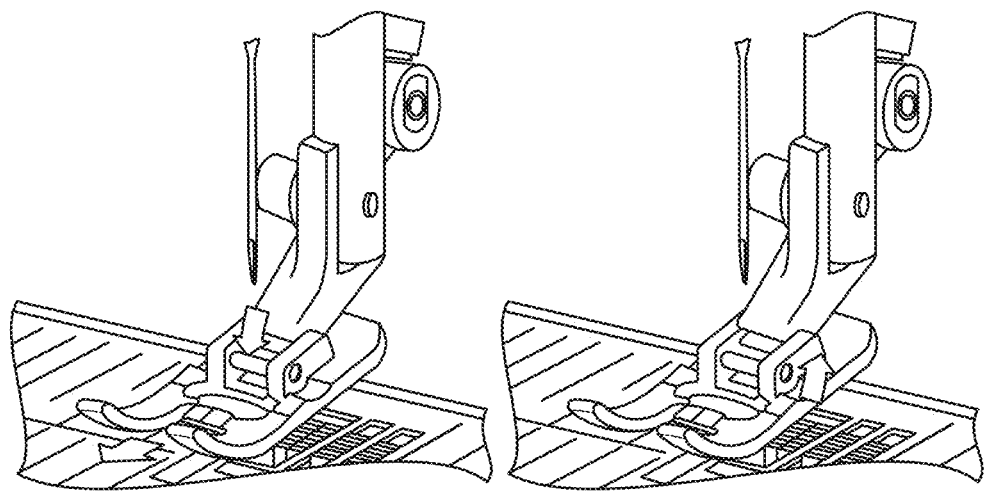
Figure 74:
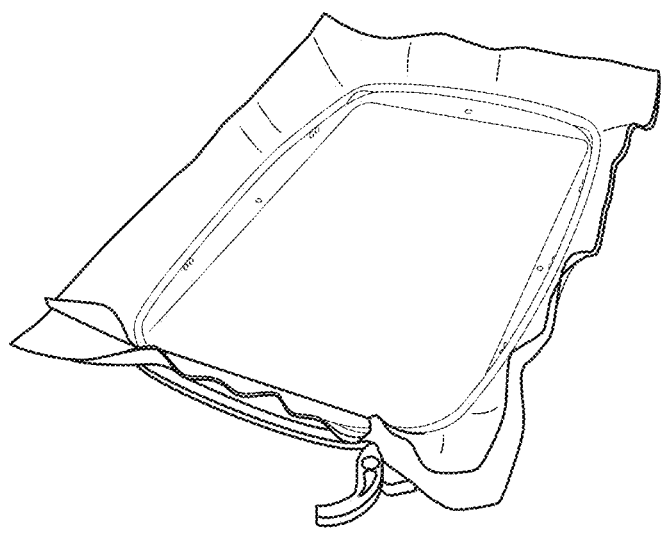

Referring now to FIG. 69, a flow diagram is shown for an exemplary situation in which the quality of thread used by the sewing machine is shown. In the illustrated scenario, sensors collect data related to the condition of the thread being used in the sewing machine. The data is processed via a previously trained or continuously training neural network to determine whether the thread exhibits any of the markers of a low-quality thread. When poor quality thread is detected, the user is notified (FIG. 70) via the notification means disclosed herein, such as, for example, through the user interface, a computer-generated voice, an indicator light, tactile feedback, or the like. The user can then look at the display of the sewing machine for or request an audible description of further details regarding the quality of the thread. The user can choose to override the warning or to take action, after which the user continues sewing. In sewing machines with multiple spools of thread, the sewing machine can also track the thread parameters of each spool of thread and can inform the user as to which spool, if any, contains low quality thread.

Figure 101:
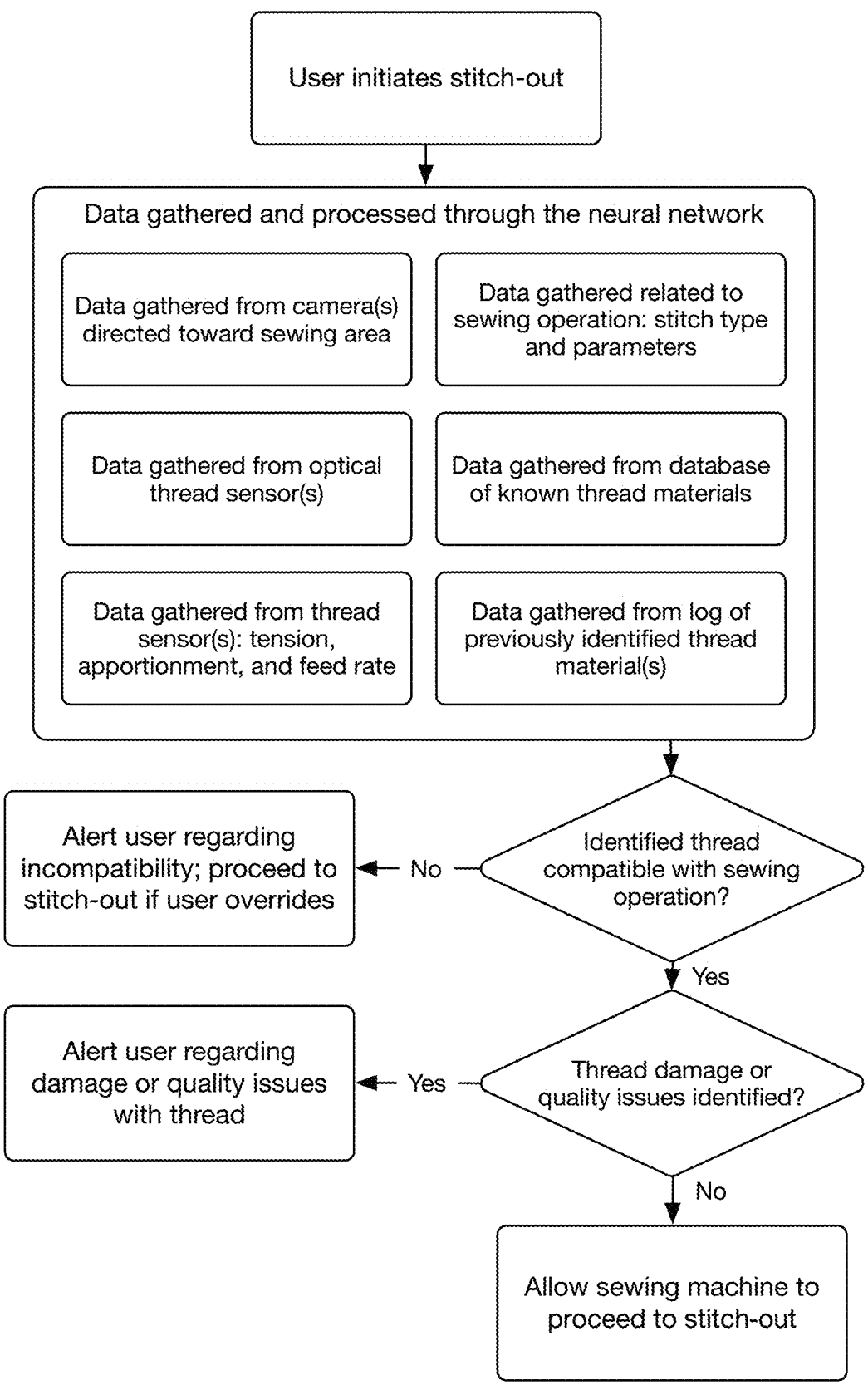

Another flow diagram for using a neural network to detect thread issues is shown in FIG. 101. When the user initiates stitch-out on the sewing machine, data is gathered from: camera(s) directed toward the sewing area; the sewing operation; optical thread sensors; other thread sensors for measuring thread tension, feed rate, and apportionment; a database of known thread materials; and a log of previously identified thread materials. The gathered data is processed through a neural network that has been trained to detect thread compatibility issues, damage, and other thread quality issues. If the neural network identifies the thread and that the thread is incompatible with the current sewing operation (e.g., the thread is likely to break when used in a particular stitch) the sewing machine alerts the user and sewing can continue if the user chooses to override or disregard the notification. The user is also alerted if thread damage or other quality issues are identified. The sewing machine can optionally prohibit further sewing when the damage is sufficient and requires user intervention, for example, to replace the thread.

The sewing machine can also include multiple thread quality sensor, such as one or more sensors 140 provided in a tube-shaped housing 142 as described above, along the thread path to determine whether the quality of the thread changes along the path. If a decrease in thread quality is found after a particular feature of the thread path, for example, the sewing machine might recommend changes to the sewing parameters to reduce the likelihood that the sewing machine is causing damage to the thread. Monitoring of the thread quality in multiple locations along the thread path also provides an opportunity for the sewing machine to recommend inspection of various components that may need to be repaired or replaced, such as a guide that may have a sharp edge that is causing fraying of the thread. Such monitoring can also allow the sewing machine to identify improper threading of the sewing machine based on where the thread seems to deviate from the intended thread path through the sewing machine.

Figure 75:
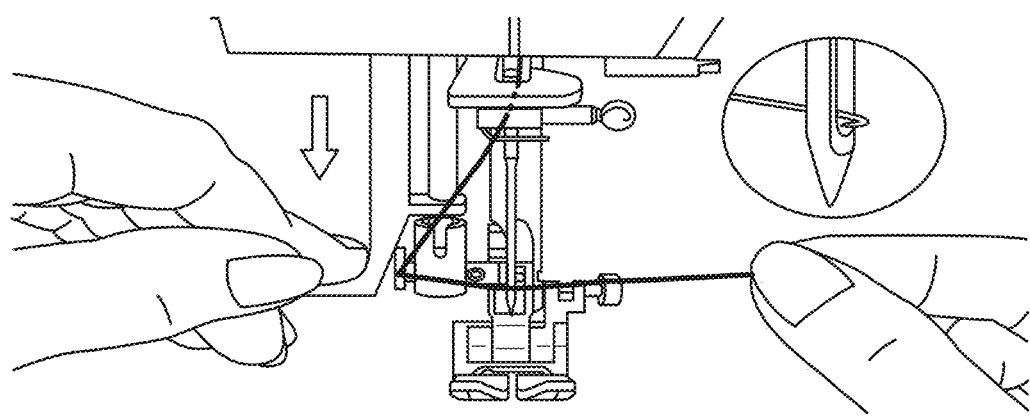

Referring now to FIGS. 71-81, various views and diagrams are shown that are related to the use of artificial intelligence in the sewing machine to recognize and identify objects placed in view of the optical sensors of the sewing machine and to provide information to the user as to the characteristics of the object and the relationship between the object and the sewing machine. The optical sensors, e.g., cameras, can be those directed toward the sewing area or can be front or user-facing sensors that allow the user to hold up an object in front of the user-facing sensor to detect the component. A library or database of identified objects is stored to enable the sewing machine to build an inventory of known objects, such as components of the sewing machine or accessories for use with the sewing machine. For example, the sewing machine is capable of recognizing the type of needle mounted on the sewing machine and whether the needle is properly mounted (FIGS. 71-72), the type of presser foot is mounted on the sewing machine and whether the presser foot is properly mounted (FIG. 73), the type and characteristics of an embroidery frame mounted on the sewing machine and whether the workpiece is properly mounted within the embroidery hoop (FIG. 74), and the fingers and hands of the user and whether there is a safety risk to the user during the current operation (FIG. 75). With respect to the embroidery hoop, the sewing machine can recognize, for example, whether a clamping mechanism for securing the embroidery hoop is secured, whether the workpiece lays flat in the hoop, and that all of the fabric edges are outside of the hoop. The quality of the components can also be identified, that is, the sewing machine can also detect whether a component is damaged, rusted, bent, worn, incorrectly threaded (in the case of needles and loopers), or otherwise altered from acceptable quality standards for the component. In each of these examples, a neural network is employed to process the visual data gathered by the one or more optical sensors of the sewing machine.

Figure 76:
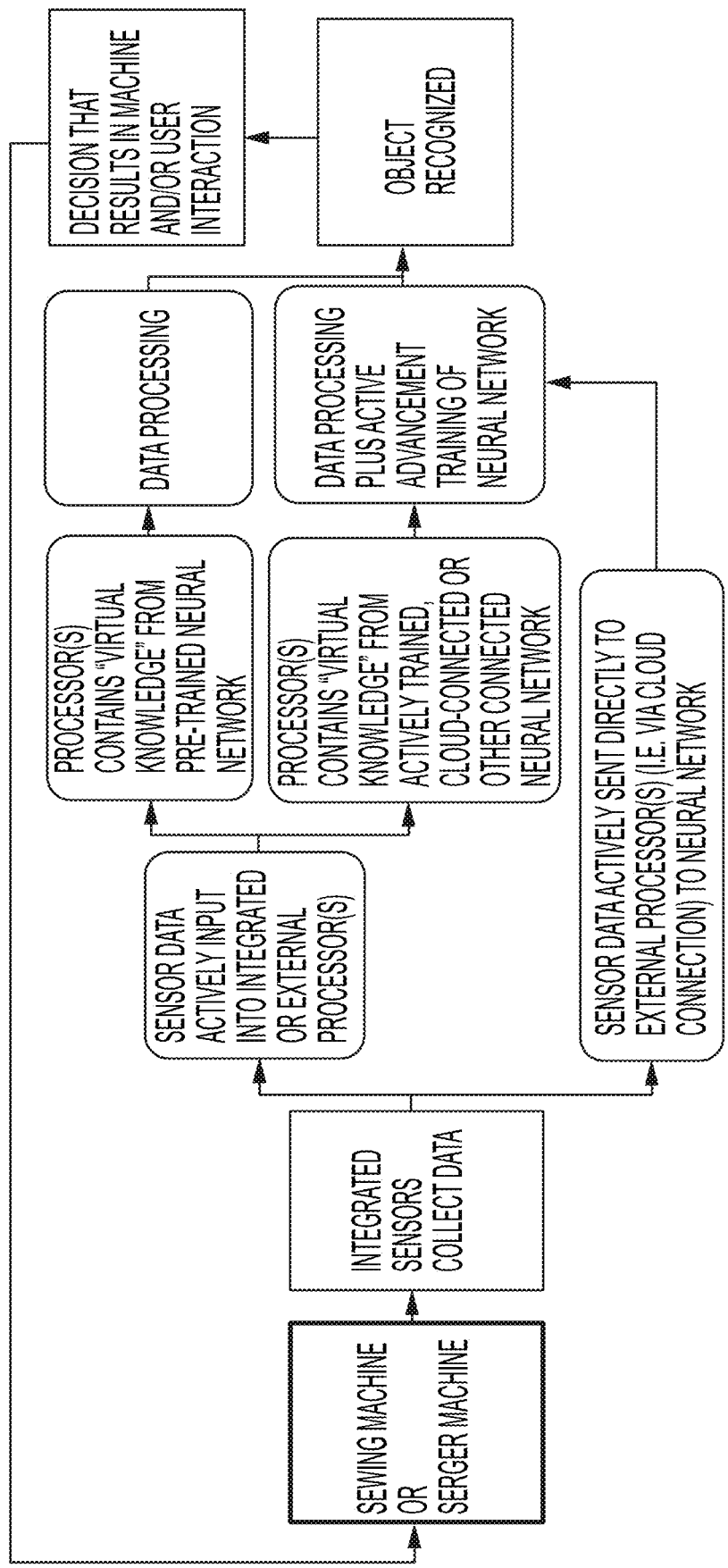
Figure 77:
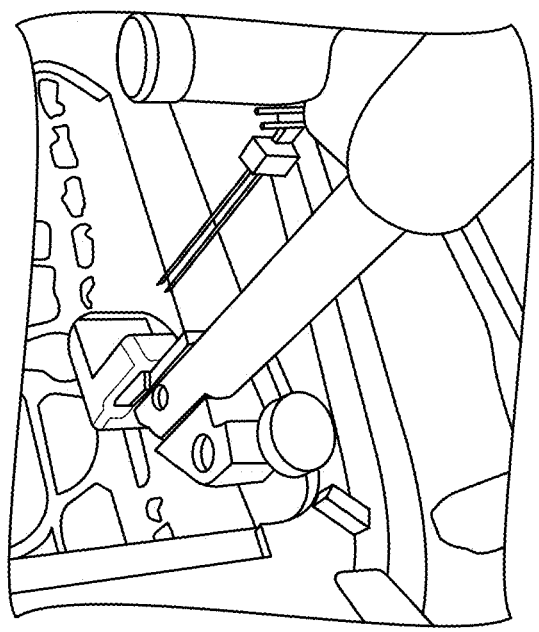
Figure 78:
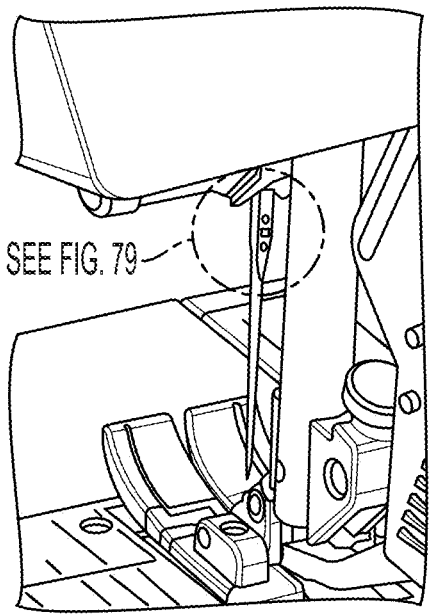
Figure 79:
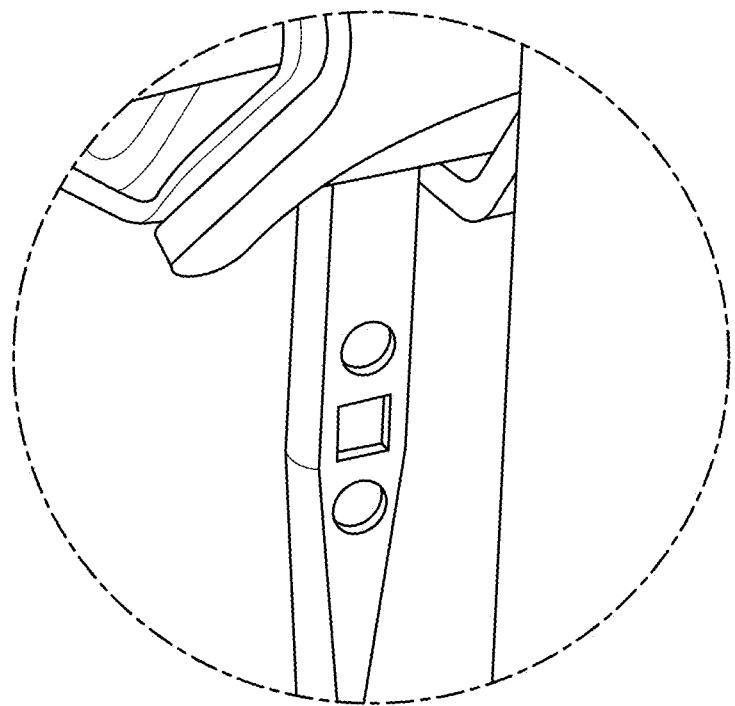
Figure 80:
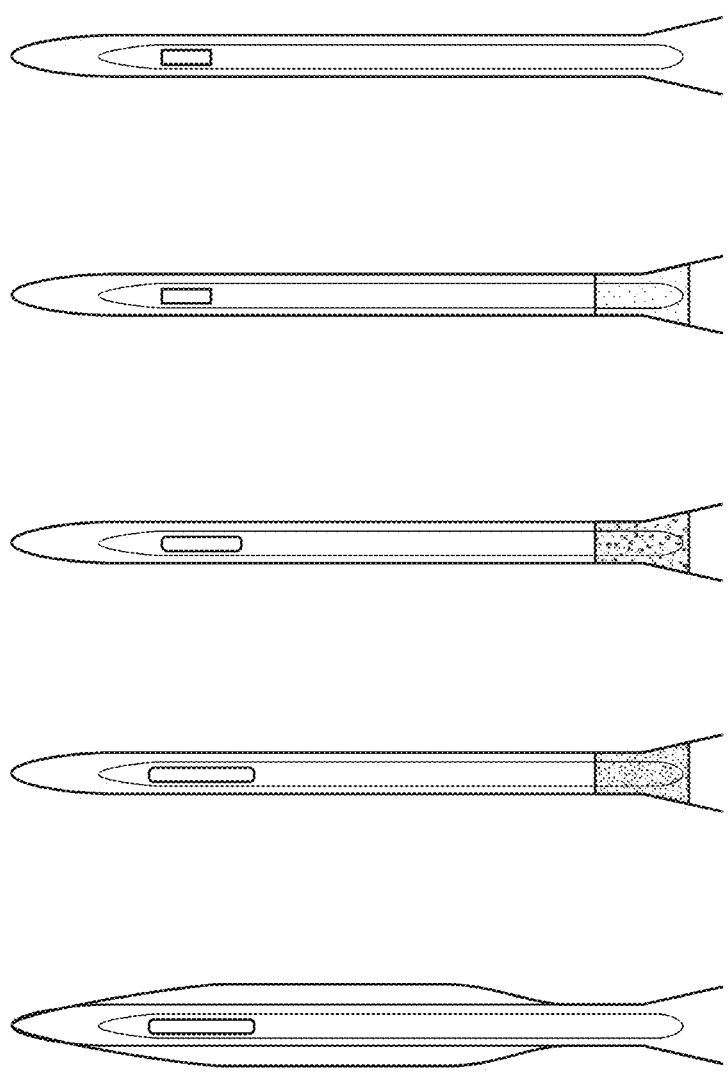
Figure 81:
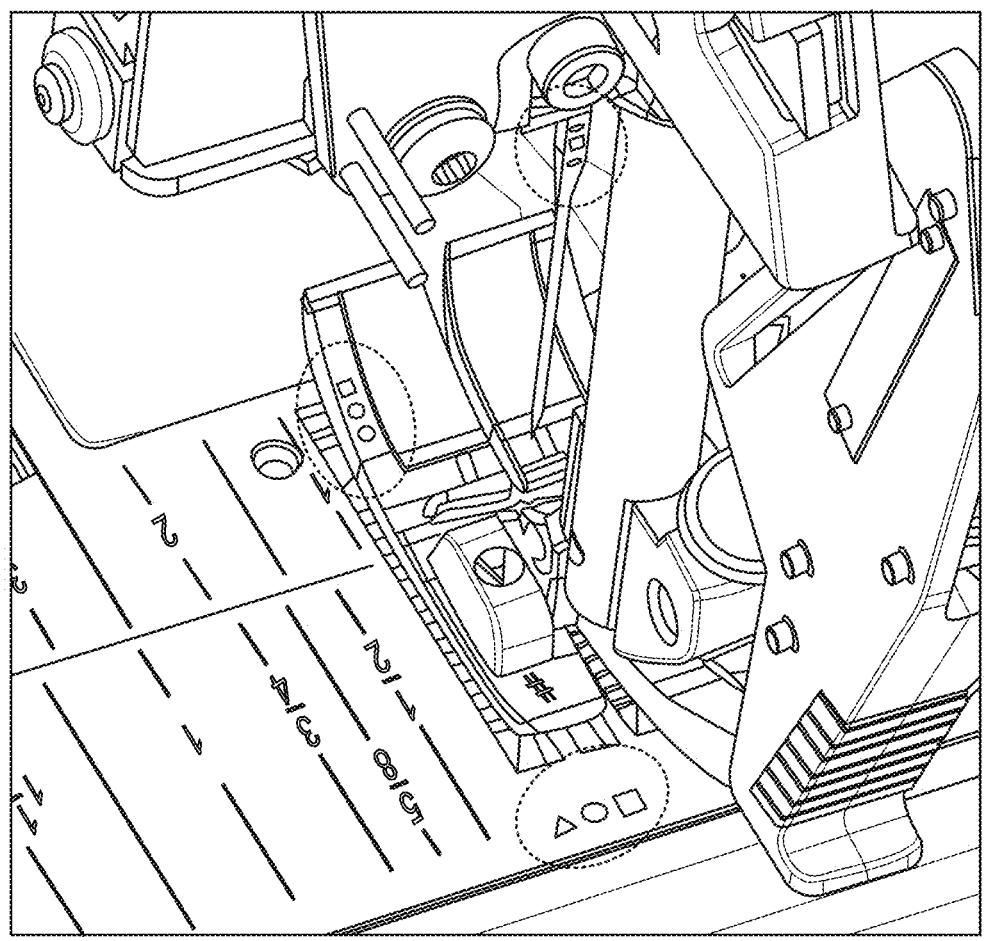

Referring now to FIG. 76, data gathered by the various sensors of the sewing machine is processed through a neural network by the computer of the sewing machine to determine whether a particular object is detected by the sewing machine and whether that object is supposed to be there. For example, as can be seen in FIG. 77, optical data can be captured that encompasses a range that includes a presser foot of the sewing machine. The visual data of the image is processed through a neural network to determine whether a presser foot is present, what kind of presser foot is present, and whether the presser foot is appropriately mounted. A similar determination can be made for the needle mounted on the sewing machine. Once the presser foot and needle are identified, the corresponding needle translation range for the presser foot is stored and the user can be informed if the combination of needle and presser foot is not recommended. The user can then choose to override the warning, such as, for example, by selecting an "expert mode" that includes an alert as to the possible safety risks involved in choosing "expert mode." The selected stitch is also compared to the installed presser foot and needle to determine whether the installed presser foot and needle are appropriate for and compatible with the selected stitch or series of stitches in a project. If no presser foot or needle is installed, a presser foot and needle can be recommended by the sewing machine. Upon installation of the presser foot and/or needle, the sewing machine can examine the presser foot and needle again to confirm that the appropriate presser foot and/or needle have been installed and that the needle and/or presser foot have been appropriately installed. The sewing machine can also identify conflicts between, for example, the needle and the sewing plate, the presser foot and the selected stitch pattern, and the needle or needles and the selected stitch pattern. The incompatibility between a stitch type and a presser foot, for example, can be provided in a table or database of incompatibilities or can be learned over time by monitoring sewing errors in relationship to the identification of various components and the sewing operation performed.

Figure 100:
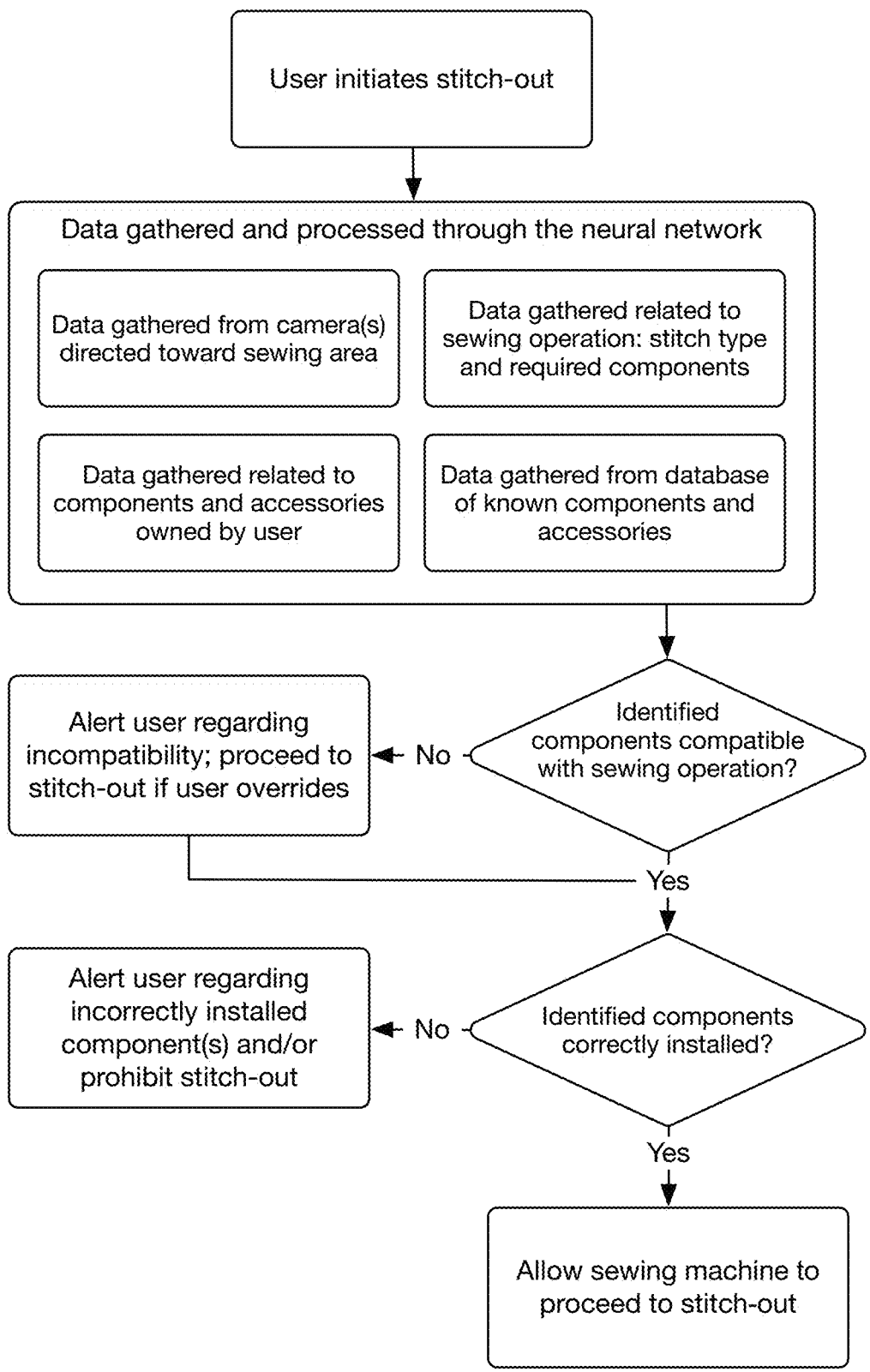

Another flow diagram for using a neural network to detect objects and identify compatibility and installation issues is shown in FIG. 100. When the user initiates stitch-out on the sewing machine, data is gathered from: camera(s) directed toward the sewing area; the sewing operation; a database of known components and accessories previously used with the sewing machine; and a database of known components and accessories that are compatible with the sewing machine. The gathered data is processed through a neural network that has been trained to detect components and accessories, classify those components and accessories, determine whether the components and accessories are correctly installed, and determine whether any the conflicts or other issues arise from the combination of components and accessories and the selected sewing operation. If the neural network identifies that the components are not compatible with the sewing operation or may be likely to cause issues the user is alerted and given the opportunity to override the alert (e.g., like the "expert mode" described above). The neural network identifies whether the components and accessories are correctly installed. If not, the user is alerted and the sewing machine can be prohibited from operating until the component is removed or correctly installed.

A similar determination can be made with regards to embroidery hoops that can be mounted above the sewing bed. Once the type and size of embroidery hoop are determined, the sewing machine can inform the user if the selected embroidery pattern will extend beyond the limits of the embroidery frame. The sewing machine can also inspect the edges of the fabric held in the embroidery frame to detect incorrect mounting of the fabric in the hoop. In the event that issues with the fabric mounting or the embroidery hoop size are detected, the user can be informed via any of the notification means described herein, such as a visual display of information on the display of the sewing machine, an audible notification, or tactile feedback.

While identifying and inspecting the embroidery hoop or when specified by the user, the camera or cameras directed toward the sewing bed can be used to capture images of a workpiece mounted in the embroidery hoop. The entire workpiece can be captured in a single image or the embroidery hoop can be moved to capture multiple images of the workpiece that are stitched together to form a single image of the entire workpiece. Data gathered during the scanning process can be used as input into a neural network trained to recognize and predict colors. This pre-learned color calibration facilitates more accurate color predictions over time as the neural network learns from correct recognition of colors. The scanning data can also be used as input for a neural network that is trained to detect translation skips or other movement anomalies so that the actuation system for the embroidery hoop can be controlled to correct for the anomalies.

Other accessories can also be identified when attached to the sewing machine and the sewing machine can provide feedback as to whether the accessory is properly mounted and whether the machine is configured to operate properly with that accessory. For example, when a user attaches an accessory used to attach ribbon to a workpiece to the machine, the sewing machine can display information relating to the accessory on the screen to assist the user in the proper use of the accessory. The functions of the sewing machine can also be limited to those that are compatible with the accessory unless such limits are overridden by the user. The sewing machine can also display information on the screen related to materials that can be used with the accessory and can recommend other accessories to the user.

Referring now to FIGS. 78-81, various views and diagrams of exemplary presser feet, sewing needles, and other components are shown that include features designed to make the presser feet and needles more easily recognized via object recognition techniques, such as through the use of a neural network or by way of sensors—including magnetic sensors—configured to detect features of the components. The presser foot, sewing needle, needle plate, or other sewing machine component can include various markers that improve the robustness of optical or other sensor-based object recognition systems. For example, the markers or markings can include a pattern of two or more geometric shapes (FIGS. 78-81), a stripe of color in a particular location (FIG. 80), the overall shape of the component including recognizable protrusions or recesses, painted color codes and other color treatments, reflective finishes, bar codes, QR codes, and other surface treatments enabling UV, IR, or other optical sensing techniques. The marker can include a unique pattern of etched rings or lines, a shape or a pattern that is etched, debossed, or embossed in the surface of the sewing machine component. The marker can also be made from different regions of the surface of the sewing machine component having a surface finish with varying reflectivity; i.e., the marker can include a first region having a first surface finish and a second region having a second surface finish. The marker can employ electronic identification techniques, such as a near-field communication (NFC) device and a radio frequency identification (RFID) device.

An additional alternative identification could be based on markers having magnetic field line profiles or polarity profiles for each component that can be detected by sensors when the component is mounted in the sewing machine. For example, a needle can include a magnet for forming a particular magnetic field that is only detected when the needle is inserted into the needle bar. Similar techniques are applied to embroidery hoops to improve the recognition of such hoops via a neural network or other object recognition technique.

Figure 82:
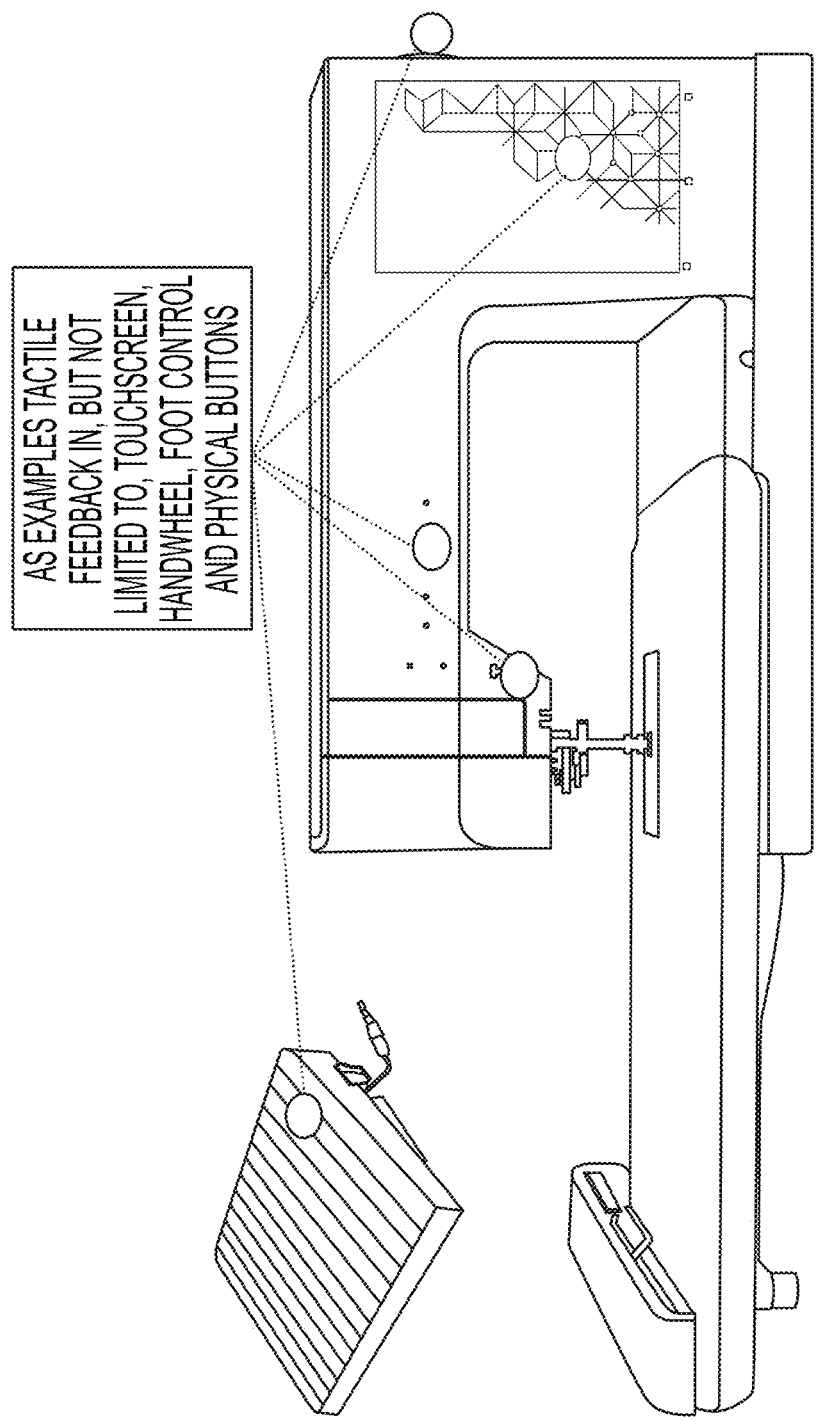
FIGS. 82-84 show various views relating to an exemplary tactile feedback feature of an exemplary sewing machine.
Figure 83:
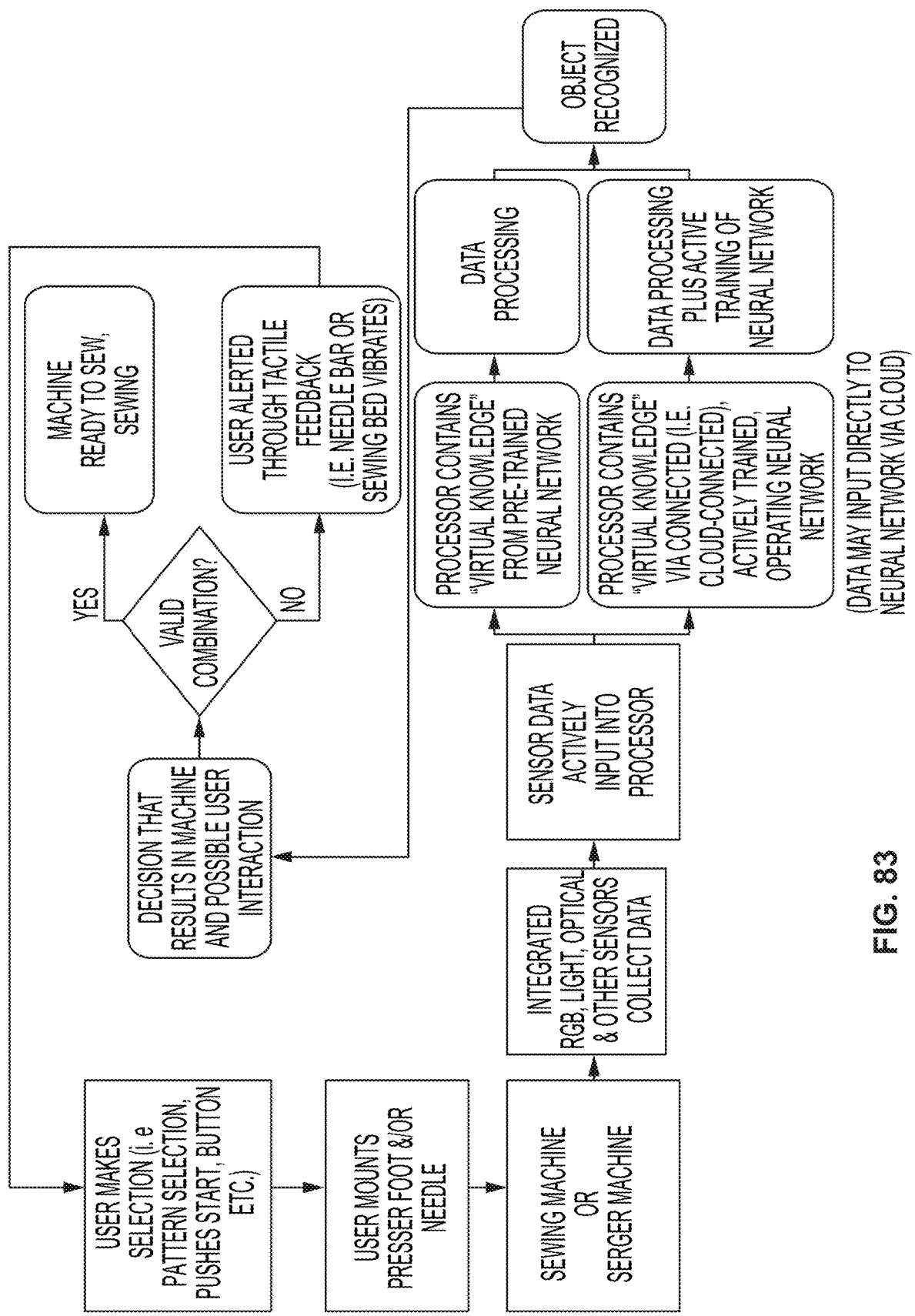
Figure 84:
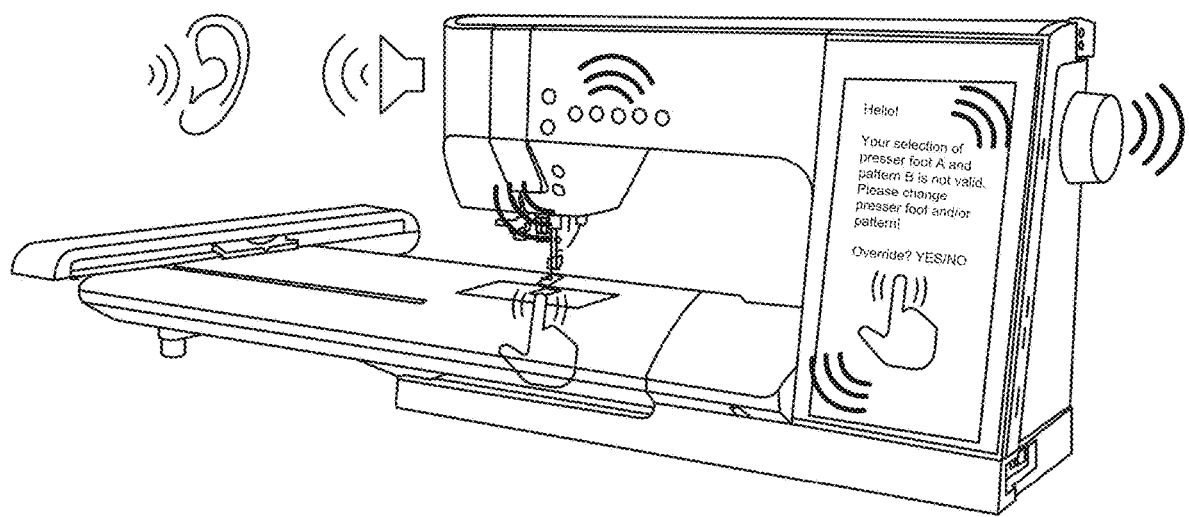

Referring now to FIGS. 82-84, various views and diagrams are shown that are related to providing tactile feedback to the user in relation to the use of the sewing machine. Tactile feedback is feedback provided to the user via means that can be felt. For example, a control component (e.g., a knob, a button, a pedal, a lever, slider, or the like, such as the components shown in FIG. 83) that the user is interacting with may vibrate slightly when a particular position is reached, or there may even be resistance to further movement of the control object. Small vibrations can also be provided through surfaces of the sewing machine on which the users hands and fingers may rest during use, such as the sewing bed. Tactile feedback can be used to alert the user of a particular condition of the sewing machine or workpiece or can be used as further reinforcement to the user that an action taken by the user has been received. For example, the sewing bed can vibrate underneath the workpiece and users hands when the user has deviated from a desired sewing path. Or, the knob or a button can vibrate to indicate that the button was pressed or the knob has reached a particular position. Tactile feedback can also replace mechanical features that would provide similar feedback, such as detents in a knob that indicate particular positions around the knob have been reached. Haptic feedback can be used on any sewing machine surface. Vibrotactile haptic feedback, via piezoelectric sensors, can be used on any surface of the sewing machine and can be used to replace mechanical user interfaces. Piezoelectric and capacitive sensors can be arranged in an array under an OLED or similar type screen that is formed such that it replaces traditional plastic sewing machine covers. The presence of the user's fingers on or near the OLED interface engages menus that are activated based on user requests or current sewing actions and relevant user interface needs, such as, for example, finger taps, sliding, and scrolling motions for threading, adjusting thread tension, and activating or deactivating sewing accessories. Other forms of haptic feedback can include force, electrotactile, ultrasound, air vortex rings, and thermal haptic feedback.

Referring now to FIG. 83, a flow diagram is shown for an exemplary situation in which tactile feedback can be employed. In the illustrated scenario, the user has attached a presser foot to the machine that is recognized via neural network processing of the visual data received from an optical sensor or other sensors of the machine. The user then selects a particular pattern or sewing stitch to perform. The sewing machine then determines whether the combination of the particular presser foot and the selected operation is a valid combination—i.e., whether the attached presser foot is capable of being used with the particular stitch selected—and provides tactile and other feedback to the user if the combination is not valid. This tactile feedback can be provided in a location of last action, such as via the touch screen when the user selected the stitch or other operation to perform. At the same time, visual and audible alerts can be provided to the user that the presser foot and selected operation are not compatible and also prompting the user to install the correct presser foot or to choose a compatible operation (FIG. 84). The interface can also provide the option for the user to override the warning.

Figure 85:
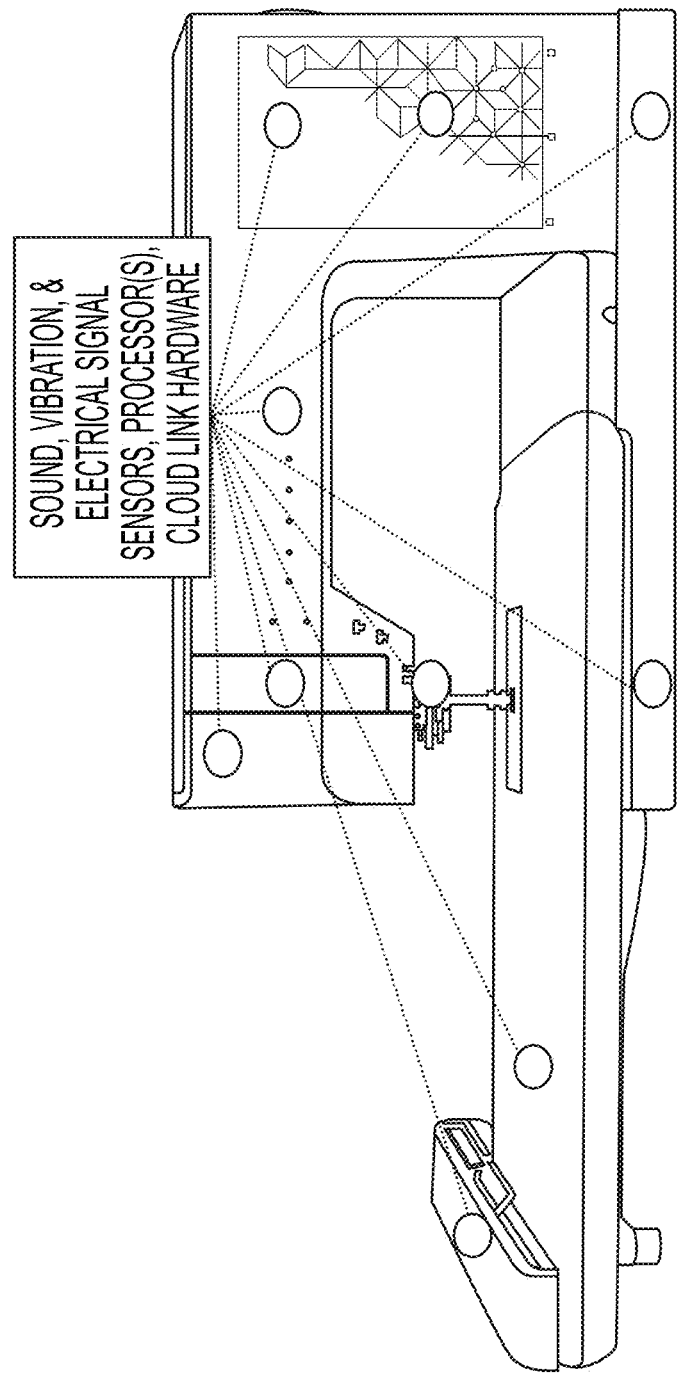
FIGS. 85-88 show various views relating to an exemplary machine diagnostics feature of an exemplary sewing machine.

Referring now to FIGS. 85-88, various views and diagrams are shown that are related to the use of artificial intelligence in the sewing machine to monitor the mechanical and electrical health of the sewing machine. Operating a sewing machine generates a wide variety of sounds and mechanical vibrations, as well as variations in the electrical signals that drive the motors and actuators of the sewing machine. An exemplary sewing machine includes sensors for monitoring sounds and noises, mechanical vibration, and electrical signals to identify patterns that relate to the performance of the associated component. Sensors can also be provided on or near various components to measure the component temperature, an increase of which may indicate excessive wear. The sensors are arranged in a wide variety of locations on the sewing machine, as can be seen in FIG. 85. The sensors can be active continuously or can be turned on to gather data during particular times, such as, for example, during a start-up procedure, an idle state, an active state, and a shut-down procedure.

The gathered data can be processed through a neural network that has been trained to detect performance issues in the components of the particular sewing machine at issue. Such as, for example, certain sounds may be associated with the rubbing together of two components that in turn indicates that a bushing or bearing needs to be replaced. Or the voltage required to run a motor at a particular speed may be higher when the motor performance has degraded as compared to a motor running at a nominal condition. The motor performance can be monitored to determine when an issue has arisen, such as when performing a certain task or when working with a certain fabric or thread material. These situations can also be recognized via an increase in the heat generated by the components of the machine and a corresponding increase in temperature of certain components. More importantly, the sensors used by the sewing machine can be significantly more sensitive to changes in the sounds or other parameters generated by the sewing machine components and can therefore make earlier predictions than might otherwise be possible, such as those made by an experienced service technician. Additionally, these performance issues can be correlated with other information from the sewing machine such as, for example, the sewing operation being performed at the time the performance issue was detected and identified. In this way, particular performance issues can be associated with particular uses of the sewing machine and the information regarding the relationship can be provide to engineers and service technicians to better identify the causes of repairs and to improve future designs. As with other data gathered by the sewing machine and generated by a neural network, data can be sent to the cloud for sharing with other sewing machines to improve the training of the neural networks of all of the sewing machines in the network.

Figure 86:
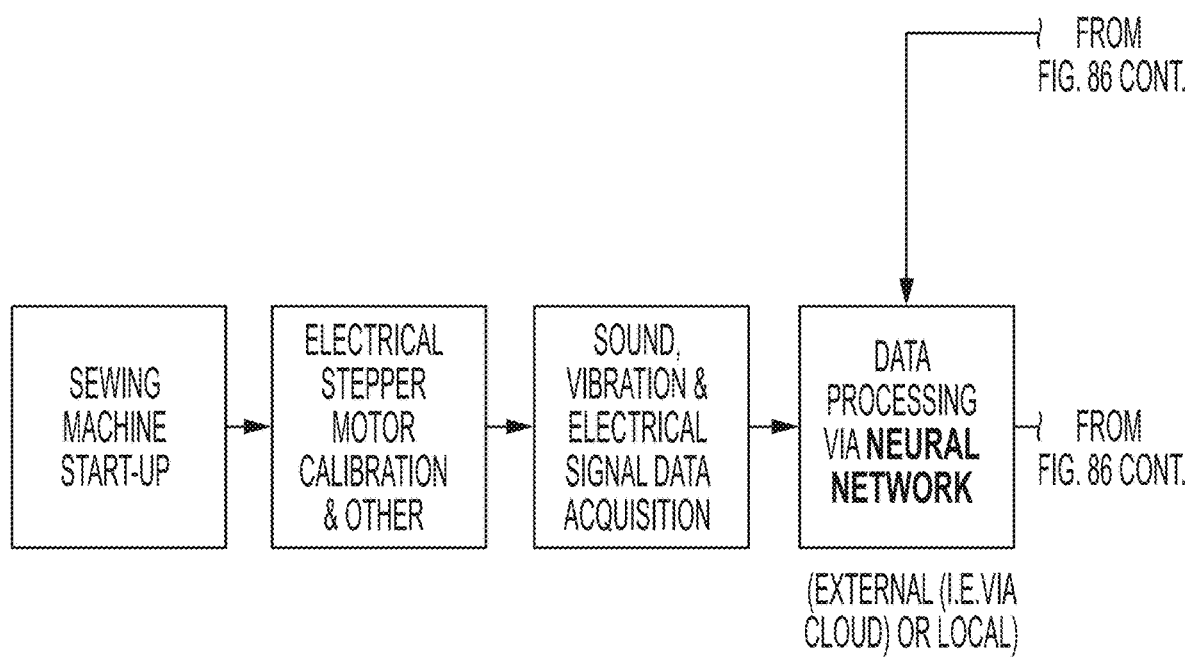
Figure 86:
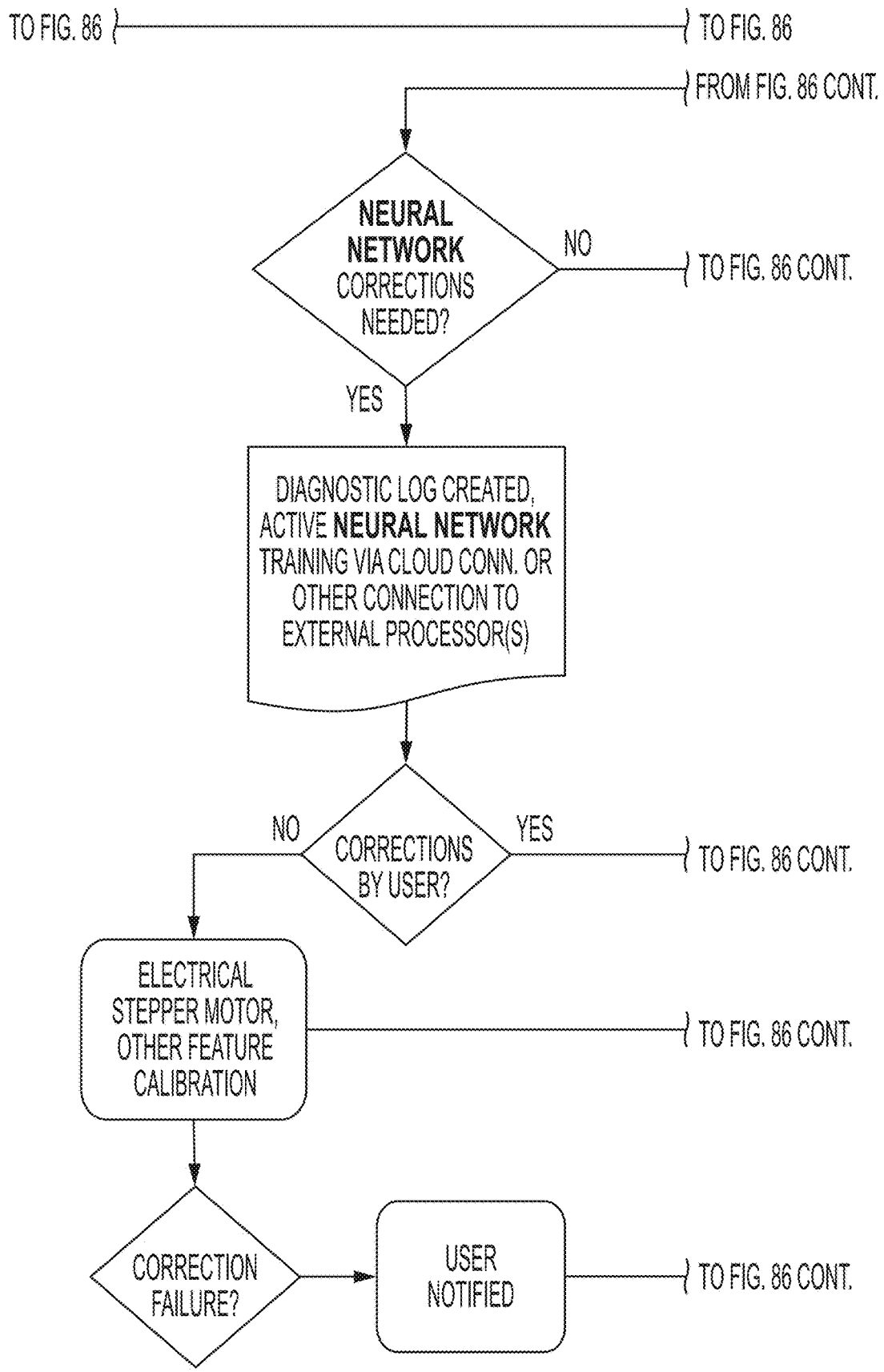
Figure 86:
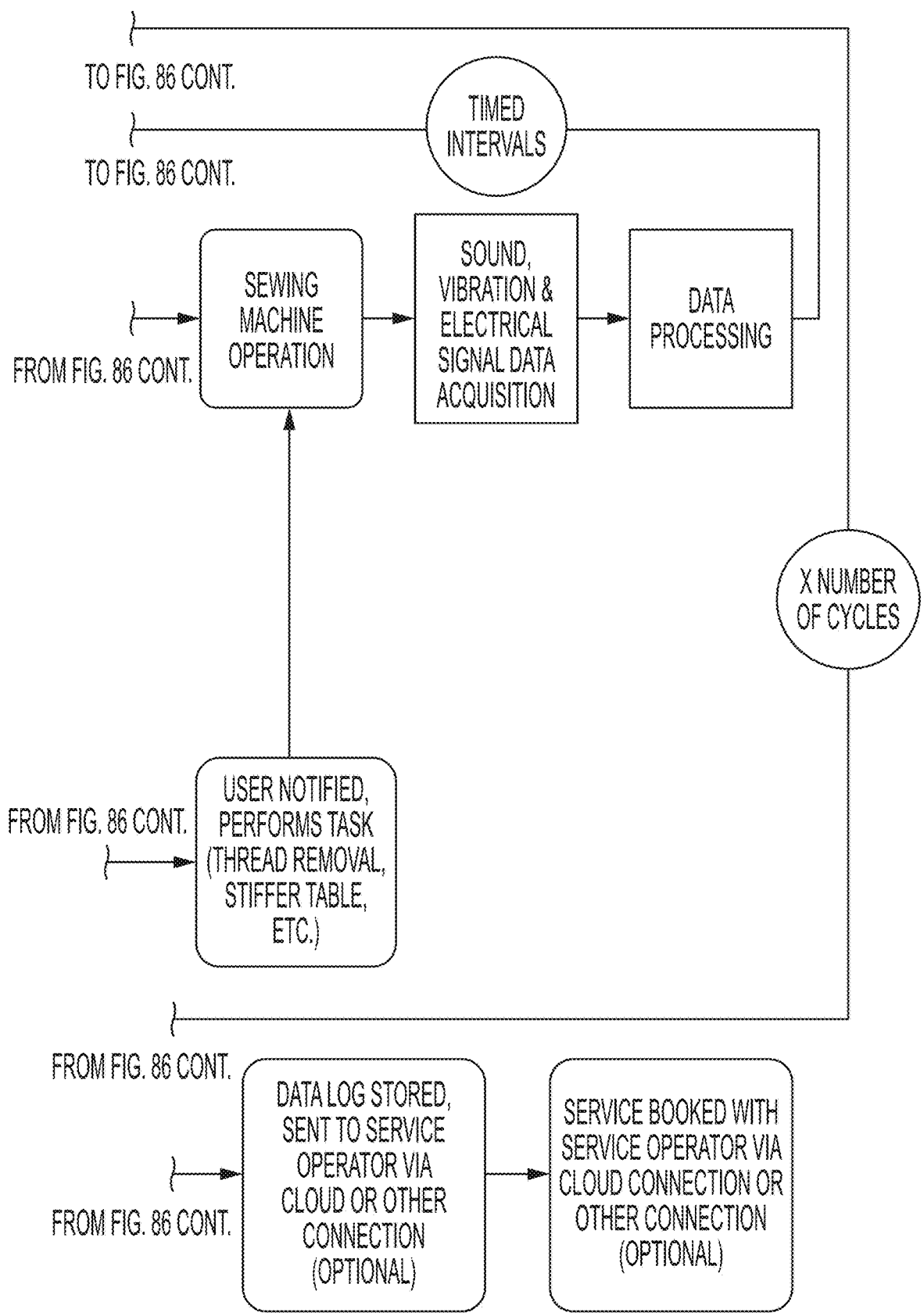

Referring now to FIG. 86, a flow chart is presented that shows various ways in which diagnostic information can be generated by the sewing machine and used by the user. When the neural network of the sewing machine computer identifies that a correction to the machine is needed, the incident is logged and the user is notified. The user can then be instructed to perform a particular task to correct the issue, such as removing thread or moving the sewing machine to a stiffer table. Having taken the action, the sewing machine can be used normally while diagnostics are performed on regular intervals to see if additional corrective measures are needed. If the user does not take corrective action, the motor or other actuator can be calibrated to attempt to correct the issue. If calibration does not correct the issue, the user can be notified, the incident logged, and a service request can be sent to a service provider. Calibration can also be set to be performed every certain number of cycles of the motor or other component as preventative maintenance. Calibration can also be performed when changing the thread used and the fabric being worked with, or for any job performed by the sewing machine.

Figure 88:
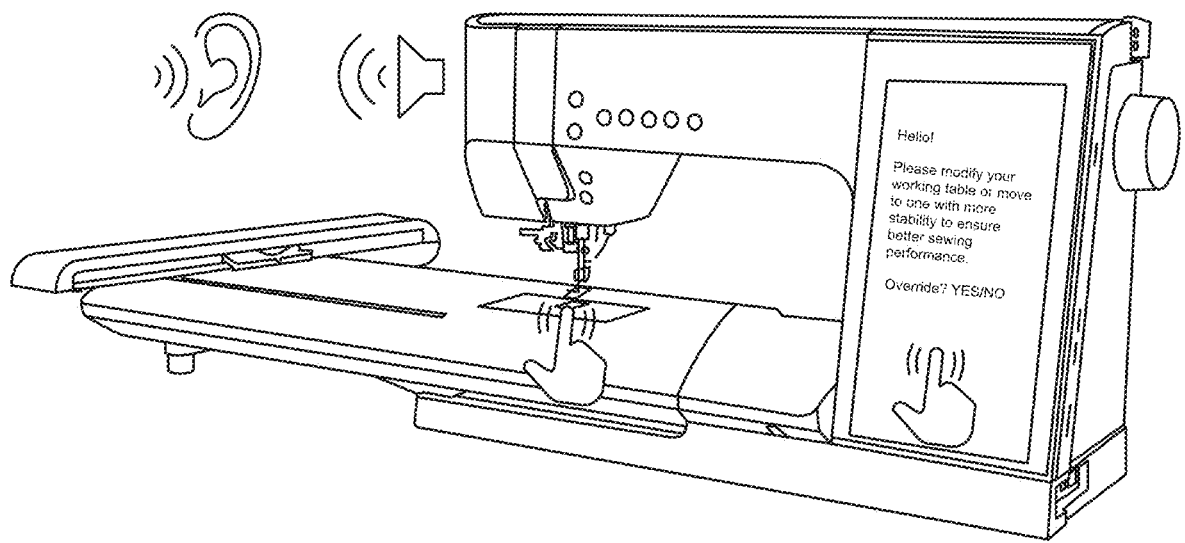
Figure 89:
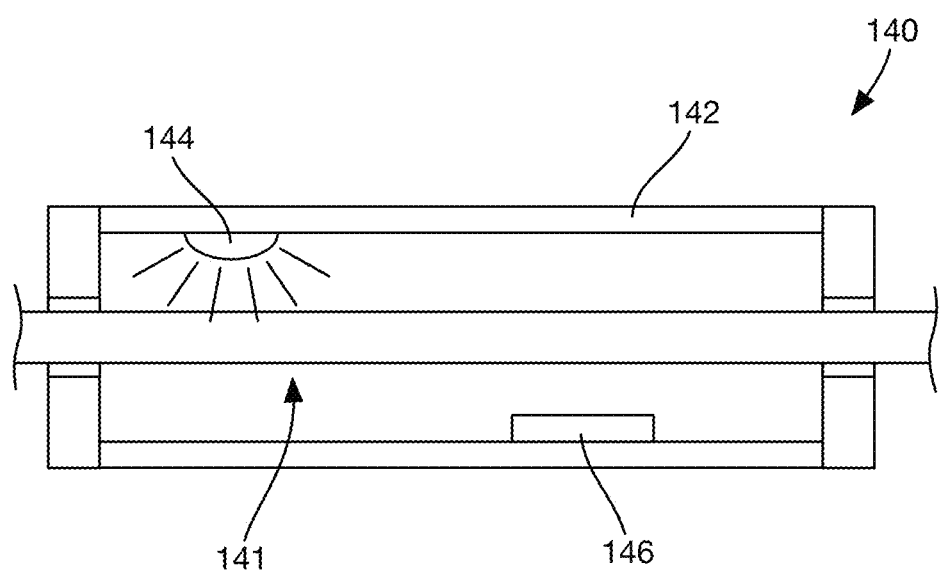
FIG. 89 shows a cross-sectional view of an exemplary thread sensor.
Figure 90:
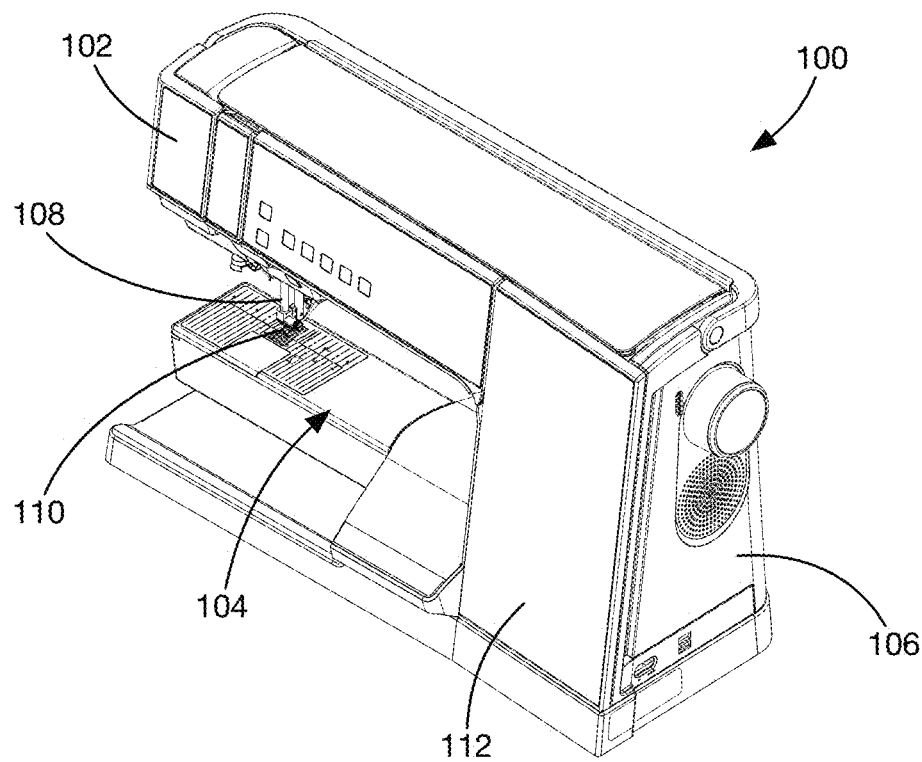
FIG. 90 shows a perspective view of an exemplary sewing machine.
Figure 91:
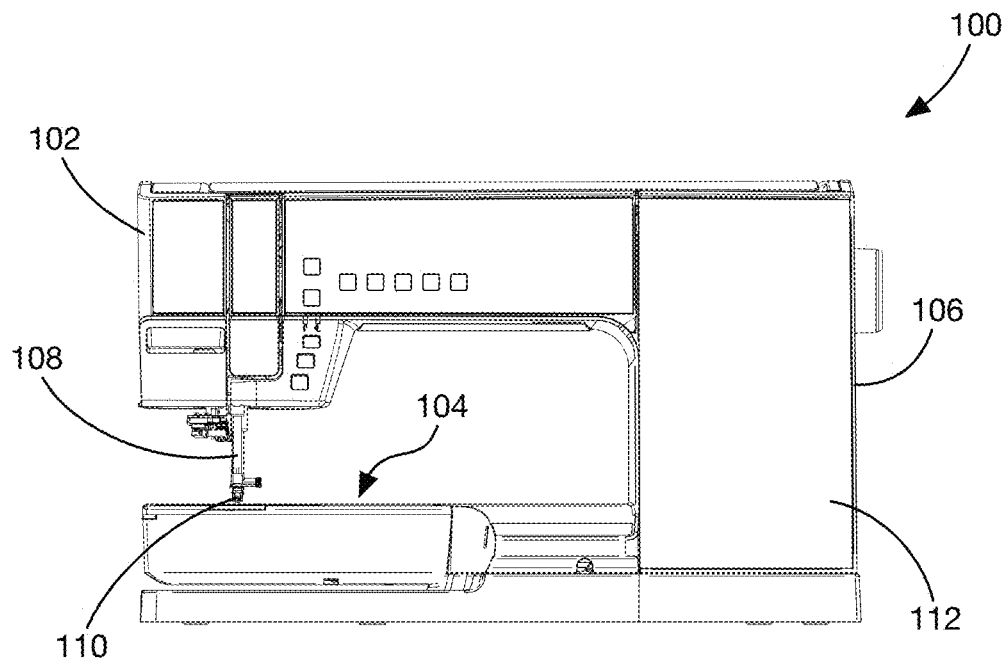
FIG. 91 shows a front view of the sewing machine of FIG. 90.
Figure 92:
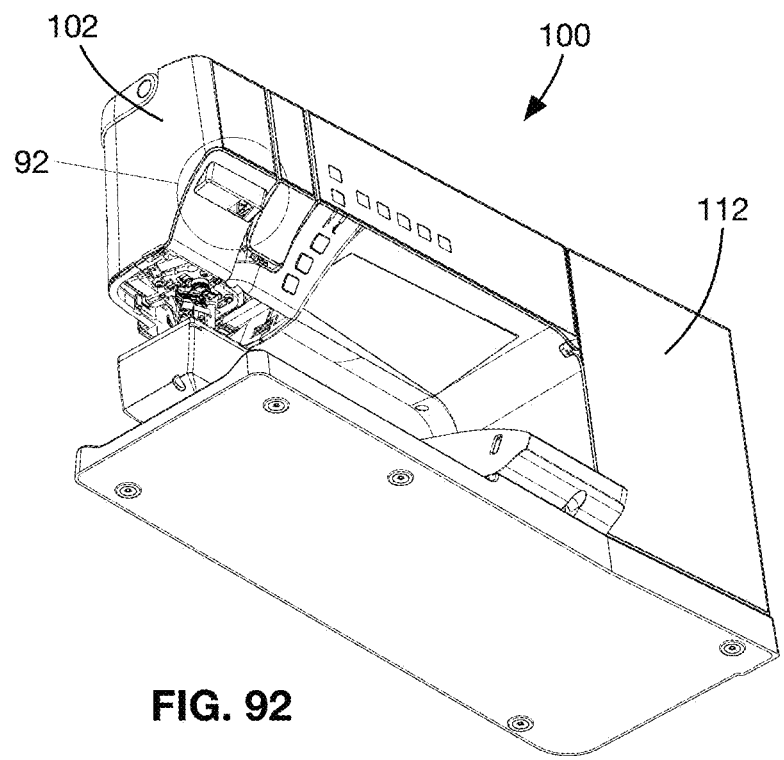
FIG. 92 shows a bottom-left-front perspective view of the sewing machine of FIG. 90.
Figure 93:
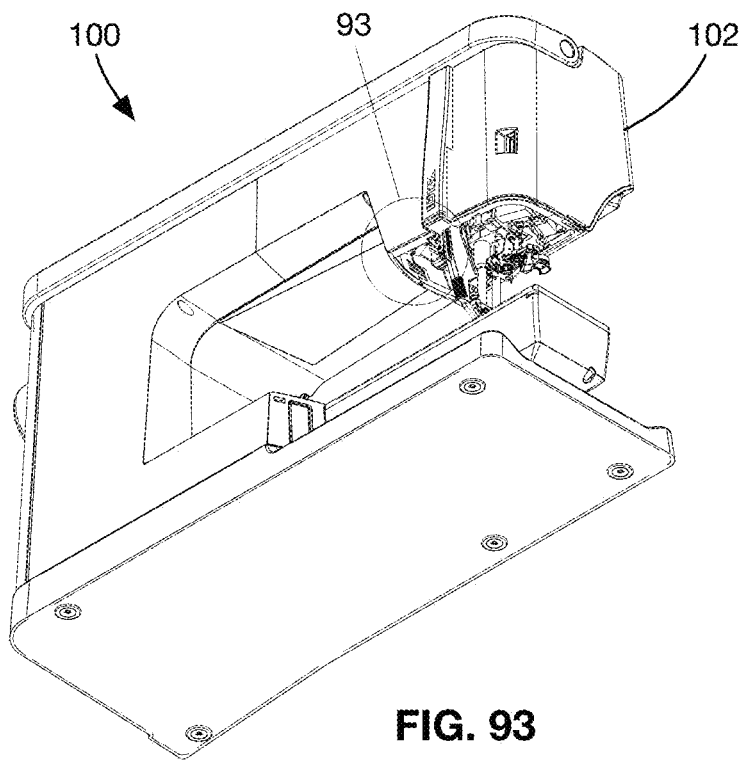
FIG. 93 shows a bottom-left-rear perspective view of the sewing machine of FIG. 90.
Figure 94:
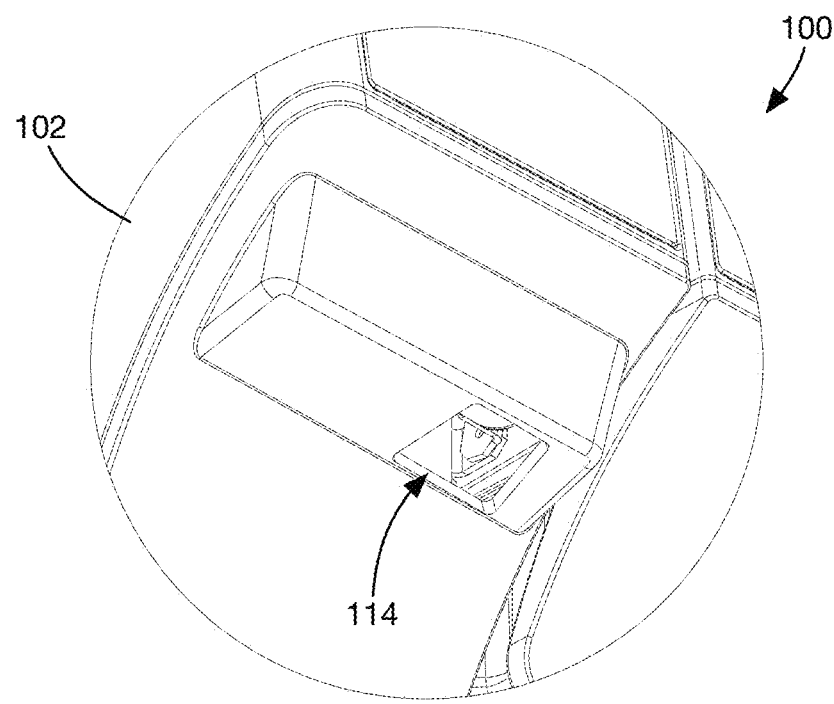
FIG. 94 shows a detail view of the area 92 of FIG. 92.
Figure 95:
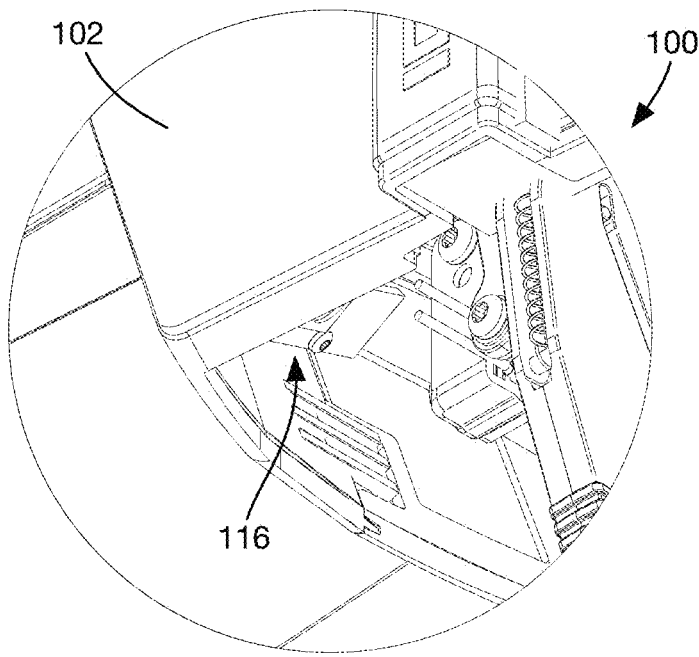
FIG. 95 shows a detail view of the area 93 of FIG. 93.

Once a potential issue has been diagnosed, the sewing machine can inform the user of the issue in a wide variety of means, such as those described in the present disclosure. In particular, the sewing machine can present an alert to the user via the user interface, audibly alert the user, speak to the user via a computerized voice, and/or send an email to the user via the network connection. For example, the sewing machine can present the user with an indication that maintenance is needed and prompt the user to schedule a service request with a service dealer, as shown in FIG. 87. Alternatively, as is shown in FIG. 88, the sewing machine can suggest changes to the operating environment to improve the performance of the sewing machine, as is described in greater detail below. When a change to the operating environment or repair actions are deemed necessary or recommendable, the user is alerted and instructional illustrations, animations, and videos on the touch screen or via localized guiding illumination or else 2D or 3D static or dynamic light projection, can be used to guide the user to alter the user's working environment by placing the sewing machine on a stiffer table to reduce vibration or to guide the user through a simple repair or a technician through a complex repair of the machine.

Figure 99:
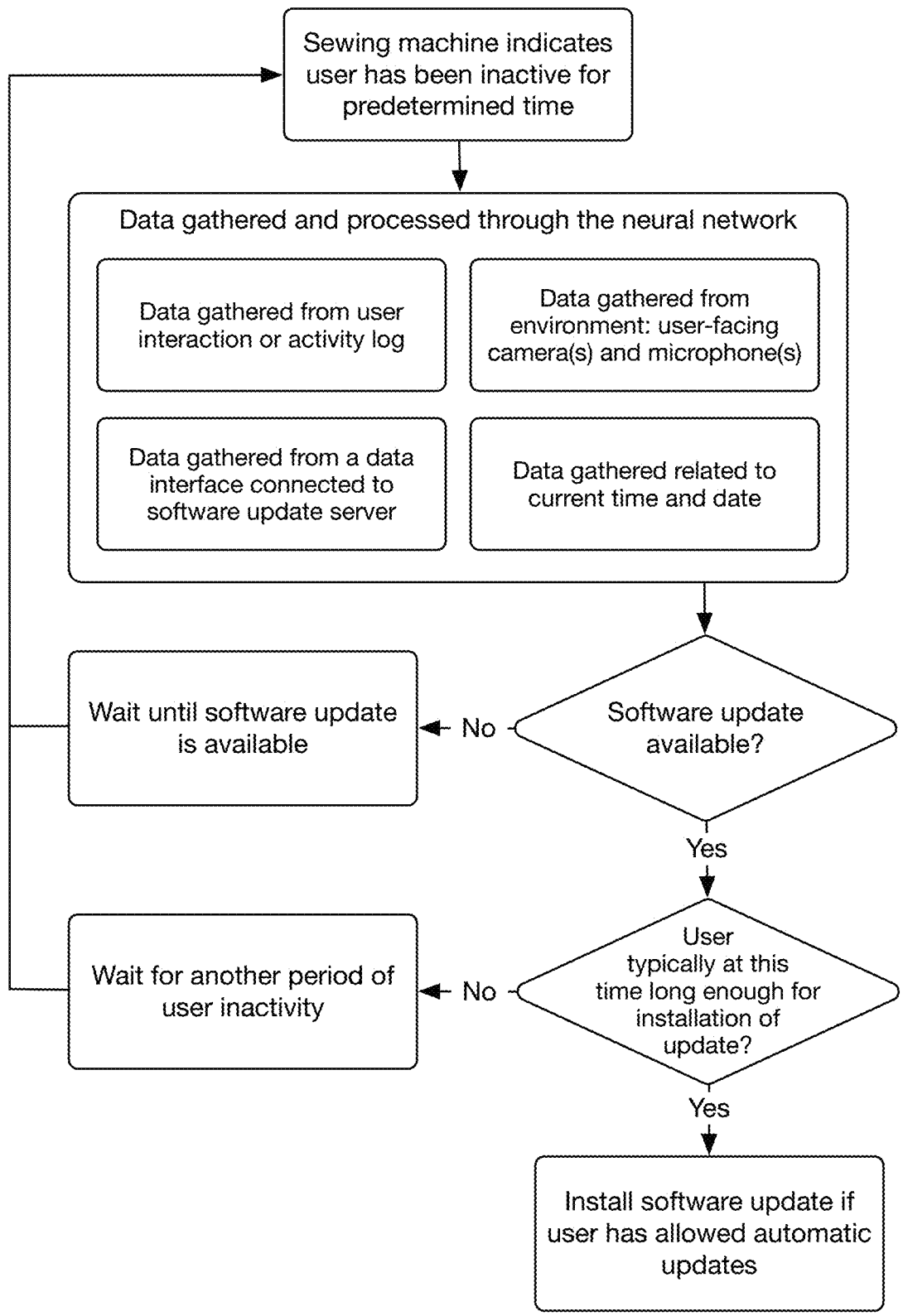

For software issues, updates can be installed automatically so that the user is unaware of the update. Alternatively, the user can be guided through a software update process and customer service representatives can be contacted through the user interface to offer support and correction to the software issues. Referring now to FIG. 99, an example flow diagram is shown for using a neural network with automatic software updates, as described above. When the sewing machine has not been used for a predetermine period of time—i.e., the user has been inactive—data can be gathered from a user interaction or activity log, user facing cameras and microphones, a network interface connected to a software update server, and a clock providing the current date and time. If a software update is available, the neural network provides an indication as to whether the user is typically away from the sewing machine at the time of day that would be long enough for the software update to be installed prior to the user returning to the machine. If enough time is available, the software update is allowed to install if the user has enabled automatic updates. A similar process can be followed for calibration of the various sensors, motors, actuators, and the like.

The sewing machine can also include light sources, such as LED lights, arranged near various components that are known to wear out during use so a particular component can be illuminated with a light—for example, with a yellow, orange, or red color—to indicate that the component has degraded performance and may need to be serviced or replaced. These lights can be activated when the machine is placed in a maintenance or service mode and can quickly provide a picture of the overall health of the machine.

The information pertaining to the health of the sewing machine can be stored in a health log and can be transmitted to a remote customer service representative or service technician to assist the remote worker in determining what maintenance, if any, may need to be performed on the machine and whether the sewing machine needs to be sent to a service center for repairs. The health data for the sewing machine, with permission from the user, might also be automatically sent to a dealership, service center, and/or the manufacturer so that the recipient of the data can take proactive steps to order replacement components and to notify customers that particular component(s) of the sewing machine may soon need to be replaced. In a commercial setting, the owner of the sewing machine may choose to subscribe to a maintenance plan where such replacement parts are delivered or service calls are scheduled automatically so that the sewing machine maintains a particular uptime.

The historical data recorded in health logs can be particularly helpful when diagnosing the cause of a sewing machine failure. For example, historical temperature data can include both ambient temperature readings and temperature readings at various points throughout the machine. Ambient temperature history can reveal that the sewing machine has been exposed to excessive heat that damaged the sewing machine. Point temperature readings—i.e., temperature readings at specific locations within the sewing machine—can aid the technician in determining the root cause of damage to the sewing machine, such as wear between components that are damaged. Historical vibration or acceleration data can be used similarly. Acceleration data can also indicate whether the machine has experienced a drop or fall that is the cause of the damage.

As has been described above, the optical sensors can be used in conjunction with the neural network to detect when the user's fingers or some other foreign object would be in the way of the sewing head and could cause injury to the user or damage to the machine. Similarly, a neural network can be trained to recognize whether the user's fingers or other foreign objects are in the way of the presser foot, a cutting accessory, or any other moving component of the sewing machine that could cause harm to the user during use of the machine. When fingers or other foreign objects are detected, the sewing machine can control the needle and other components to avoid the object or can prohibit further sewing if avoidance is impossible or the potential for harm is sufficiently great to warrant prohibition of further operating of the sewing machine. For example, the sewing machine can prohibit lowering of the presser foot when fingers are detected beneath the presser foot. Or the sewing machine can prohibit further sewing when fingers or the user's hand are detected in the sewing path. If a foreign object detected is a pin inserted into a seam, the sewing machine can adjust the feed rate or other sewing parameters to avoid the needle striking the pin.

The neural network can also take into consideration the orientation of the sewing machine (via accelerometers and/or pressure sensors on the base) so that the sewing machine can be turned off or be prevented from starting if the sewing machine is tipped over is leaning far enough to top over and possibly injure the user. The accelerometer can also be active when the sewing machine is in sleep mode or standby mode to detect movement of the machine and prohibit powering the machine if the sewing machine is moved or picked up or knocked over. Heat data from temperature sensors can be fed into the neural network so that the machine can be automatically turned-off to prevent overheating of components or because the heat build-up may be a symptom of an electrical anomaly.

Figure 98:
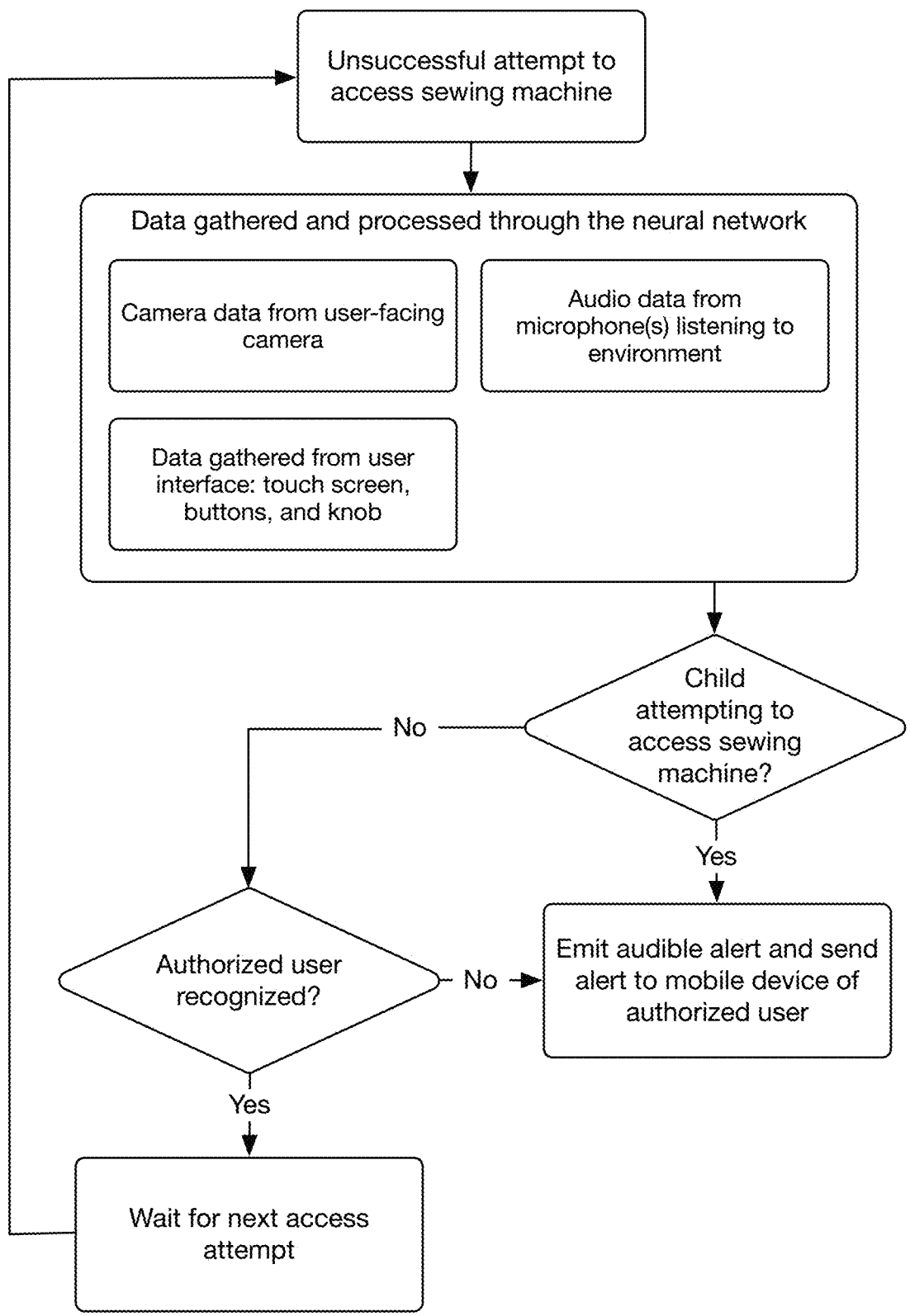

User-facing proximity sensors (e.g., infrared sensors) and/or cameras can be used to monitor the presence of the user of the sewing machine so that the sewing machine can be automatically turned off after the user has been absent for a predetermined time to save energy. These user-facing sensors can also prevent activation of the sewing machine after determining, via a neural network or other means, that an unauthorized person is attempting to access the machine. For example, the neural network can be trained to recognize a child attempting to access the sewing machine. In response, the computer can prevent activation of the sewing machine and notify authorized users of the attempted access by generating an audible sound or by sending a notification to the user via an internet connection, a text message, or a smart phone app. An exemplary flow diagram for a child safety feature is shown in FIG. 98. The child safety analysis can be trigger for a wide variety of reasons, such as after an unsuccessful attempt to access the sewing machine is made or during a long embroidery stitch-out when the user may want to leave the machine. Data is then gathered from a user-facing camera, microphones, and various user interface elements such as the touch screen, buttons, and knobs. If the neural network determines that a child is attempting to access the sewing machine or is approaching operating components of the sewing machine, the sewing machine can emit an audible alert and send an alert to a mobile device assigned to an authorized user. If the child does not respond to the alert, the sewing machine can repeat the alert and stop the sewing operation to prevent harm. If the neural network determines that the unsuccessful attempt is not made by a child, the sewing machine can still emit an audible alert and send a message to the authorized user. As another example, the sewing machine can periodically monitor the environment surrounding the sewing machine to identify the presence of a person, such as the user or a child. This periodic monitoring can be, for example, performed when a longer embroidery stitch-out is in progress and there is a possibility of disruption to the embroidery workpiece or harm to a person if a child were to get too close to the sewing operation that is in progress. If a child is detected, the stitch-out operation can be stopped and an alert can be sent to the user to notify the user that the sewing operation has stopped and the reason for doing so.

Figure 97:
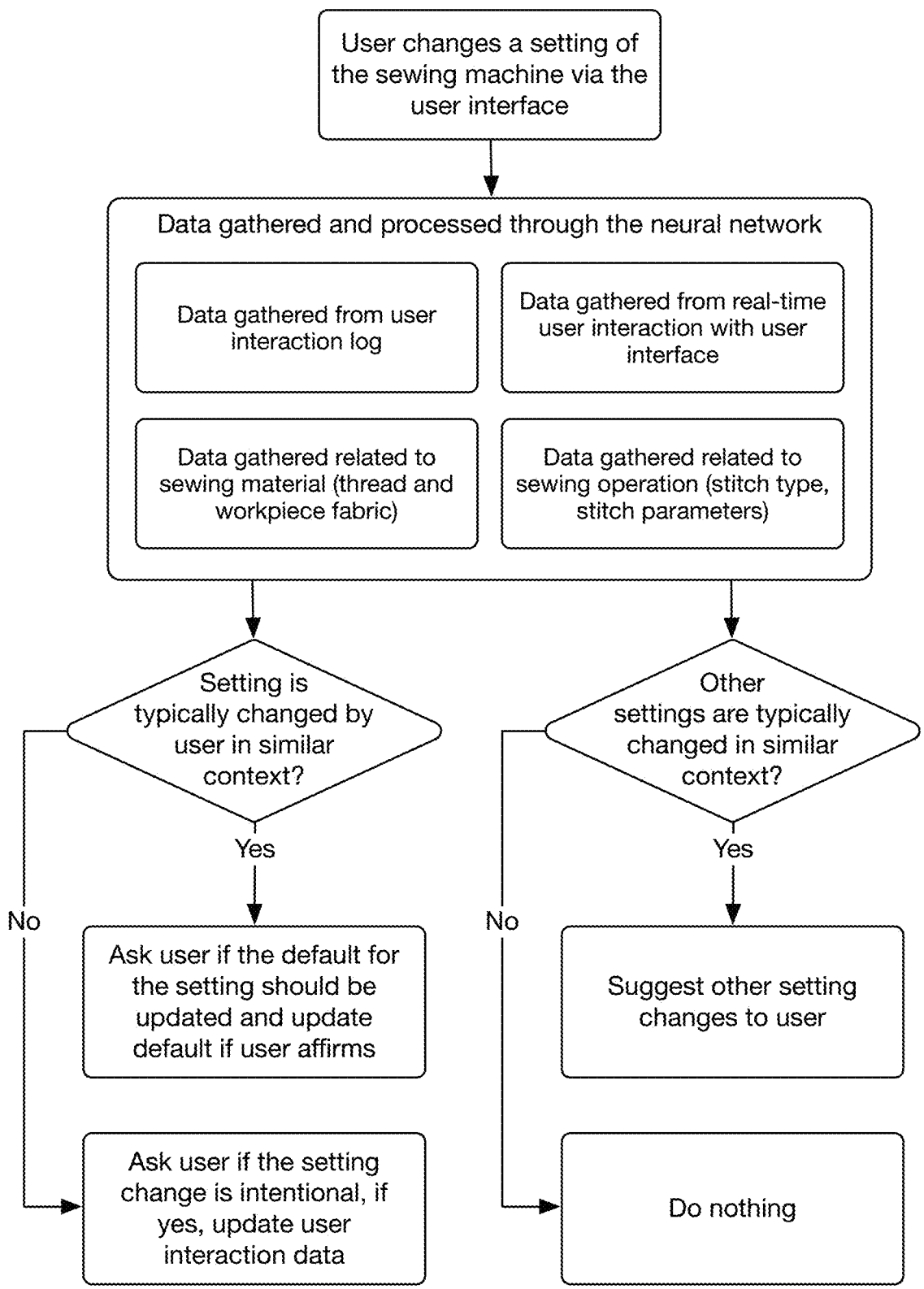
FIGS. 97-109 show flow charts detailing the operation of an exemplary sewing machine.

As the sewing machine is used, the profile settings set by the user, user preferences, graphical user interface settings, feedback settings, object recognition preferences, tutorial preferences, and the like are monitored and stored. Going beyond the machine settings, every interaction between the user and the sewing machine can be recorded and stored. This collection of data pertaining to the interaction between the user and the sewing machine is processed through a neural network so that the sewing machine can learn how the user prefers to interact with the sewing machine and can anticipate what the user might prefer in a new situation. That is, the setting changes can be related to the project, stitch type, thread type, material type, or the like, as detected by the sewing machine or provided by the user. This collection of data enables the sewing machine to assist the user, for example, by suggesting a feed rate setting for a stitch that the user has never sewn based on the characteristics of the new stitch and the feed rates that the user has set for other stitch patterns. As another example, the sewing machine can remind the user of settings that are usually set given the current context, that is, by suggesting a certain feed rate or sewing pitch for a thinner material and a different feed rate or sewing pitch for a thicker material. An exemplary workflow for recommending setting changes using a neural network is shown in FIG. 97. When settings are changed, the data is gathered from user interaction logs, current real-time interaction with the user, from other sensors and neural networks regarding the sewing material, and from data pertaining to the current sewing operation. If the neural network identifies that the user typically makes the same change in similar contexts, the sewing machine prompts the user to decide if the default setting should be changed. If the change to the setting is not typically made in similar contexts, the sewing machine can prompt the user to confirm that the change was intended. Also, the neural network can identify other settings that might typically be changed in a similar context and suggest those other changes to the user.

The sewing machine can also suggest that the user take a break from using the machine from time to time or perform exercises to improve the ergonomic health of the user. The timing of the suggestions and the type of exercises and break durations suggested are based on an analysis of the use of the machine by a neural network trained to monitor the health of the user. The posture of the user can also be detected via neural network analysis of data from one or more user-facing cameras so that the exercise suggestions can be further customized to benefit the user.

Figure 103:
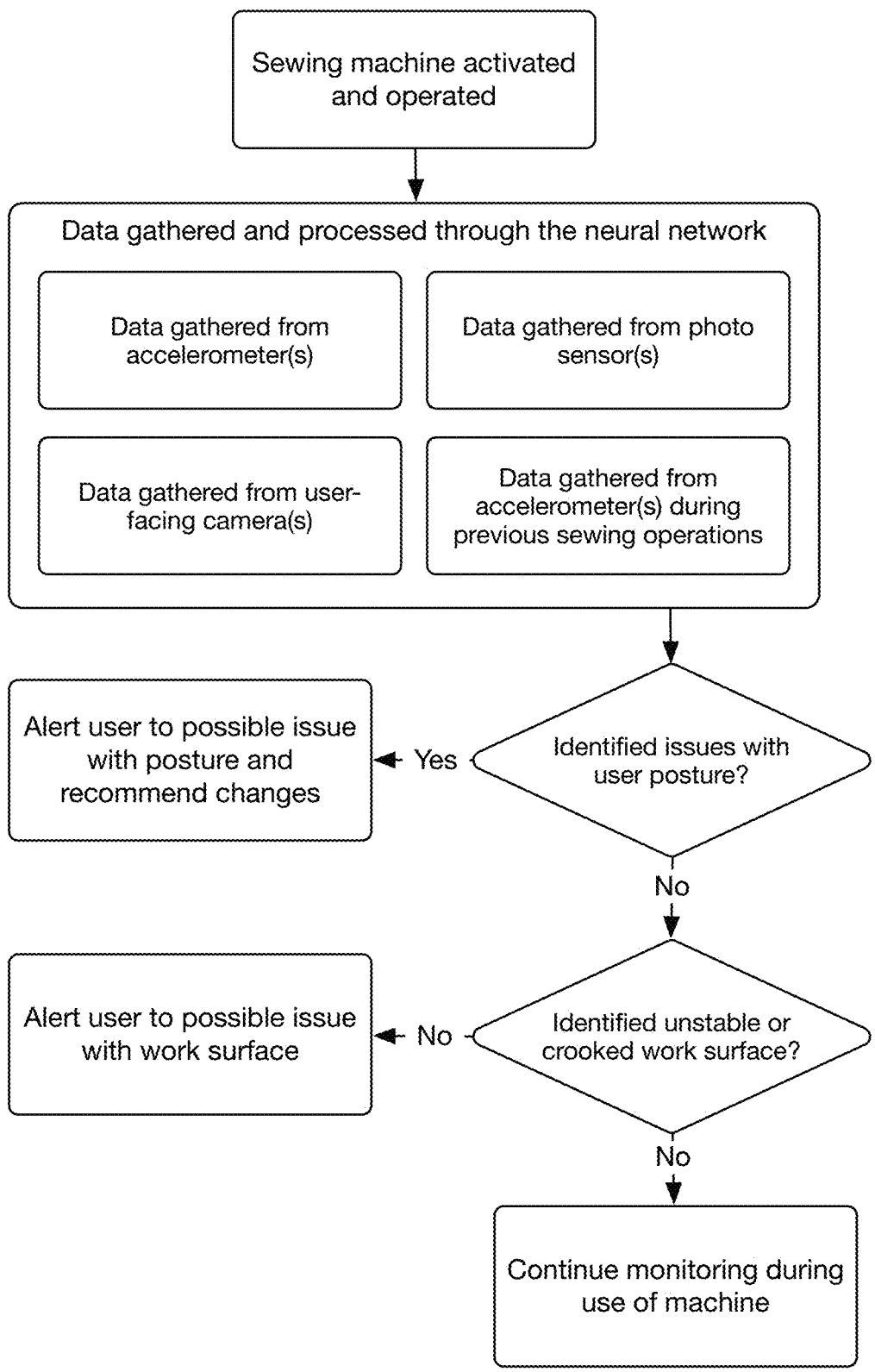

Conditions of the user's workspace can also be detected by the sewing machine and analyzed by a neural network. Ambient light sensors can allow the neural network to consider the lighting conditions of the sewer's room and workspace lighting to reduce or soften the contrast between the working area and the room. For example, the sewing machine can suggest that the room lights be brightened to reduce eye strain caused by the contrast between a bright work surface at the sewing machine and a dark room. The sewing machine can also connect to the lighting system of the workspace and room, for example, through a wi-fi network, to manage adjustments to the brightness automatically. User-facing cameras can be used to determine the height of the work surface, the position of the user's chair, and other environmental conditions. Where active control surfaces can be accessed by the sewing machine— such as, for example, a worktable with a controllable height—the sewing machine can suggest and make adjustments to improve the ergonomics of the work environment. FIG. 103 shows an exemplary flow diagram that demonstrates how the sewing machine can reduce strain on the user by monitoring the environment around the sewing machine. During use of the sewing machine, data gathered from accelerometers, photo sensors, user-facing cameras, and historical logs from previous sessions can be processed through the neural network to identify user-health issues. For example, the neural network can identify if the user is tending to sit with a poor posture and can recommend changes, such as, for example, adjustments to the user's chair. The neural network can also identify if the work surface is unstable by monitoring vibration and acceleration data and recommend adjustments to the work surface so that it is level and less prone to movement during use of the sewing machine.

As has been noted above, the data gathered by the various sensors on the sewing machine and data generated by monitoring how the sewing machine is used can be stored in a database on the machine and can be transmitted to a remote server. Data transmitted to various remote servers can be gathered into a central database and used to analyze sewing machine performance and user sewing behavior across a much larger data set. So-called "big data" analysis can reveal patterns that are not otherwise detectable in smaller data sets. The results of this analysis can be fed back into the neural networks of the sewing machines or remote neural networks that operate to support the operation of the sewing machines, thereby improving the quality of the results determined by the neural networks. Big data analysis can also help research and development teams improve quality control processes at the factory and the testing of various components performed in a lab environment. For example, failure modes can be identified via big data analysis that may not have been predicted during initial development of a machine and future generations of parts and processes can be changed in response.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, alternatives as to form, fit, and function, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein.

Additionally, even though some features, concepts, or aspects of the disclosures may be described herein as being a preferred arrangement or method, such description is not intended to suggest that such feature is required or necessary unless expressly so stated. Still further, exemplary or representative values and ranges may be included to assist in understanding the present application, however, such values and ranges are not to be construed in a limiting sense and are intended to be critical values or ranges only if so expressly stated.

Moreover, while various aspects, features and concepts may be expressly identified herein as being inventive or forming part of a disclosure, such identification is not intended to be exclusive, but rather there may be inventive aspects, concepts, and features that are fully described herein without being expressly identified as such or as part of a specific disclosure, the disclosures instead being set forth in the appended claims. Descriptions of exemplary methods or processes are not limited to inclusion of all steps as being required in all cases, nor is the order that the steps are presented to be construed as required or necessary unless expressly so stated. The words used in the claims have their full ordinary meanings and are not limited in any way by the description of the embodiments in the specification.

The invention claimed is:

1. A method for calibrating one or more optical sensors on a sewing machine, the method comprising:
   collecting data of one or more features of one or more predefined regions of at least one of the sewing machine, the environment surrounding the sewing machine, and the sewing material, wherein the data is collected by at least one of the one or more optical sensors;
   processing the data through one or more neural networks, wherein the one or more neural networks detect and recognize the one or more features of the one or more predetermined regions from the data;
   calculating one or more accuracy indicators of the one or more features from the data as compared to one or more trained features from the one or more neural networks;
   comparing a value of the one or more accuracy indicators to one or more indicator thresholds; and
   adjusting a parameter of at least one of the one or more optical sensors based on the comparison between the one or more accuracy indicators and the one or more indicator thresholds.

2. The method of claim 1, wherein if the value of the one or more accuracy indicators is less than the one or more indicator thresholds, the method further comprises collecting additional data of the feature, processing the additional data through the one or more neural networks, calculating an additional accuracy indicator and comparing the value of the additional accuracy indicator to the one or more indicator thresholds.

3. The method of claim 1, wherein if the value of the one or more accuracy indicators is greater than the one or more indicator thresholds, the method further comprises setting the one or more parameters of the one or more optical sensors to an adjusted state based on the comparison between the one or more accuracy indicators and the one or more indicator thresholds as calibrated parameters for the one or more optical sensors.

4. The method of claim 1, wherein the method is run automatically at one or more of at start-up, during use of the sewing machine, and during any user-determined point in time when the sewing machine is powered on.

5. The method of claim 1, wherein one or more of the predefined regions are located on a component or accessory, attached or loose, of the sewing machine.

6. The method of claim 1, wherein the one or more predefined regions are located on one or more of a needle bar, a presser foot, a presser foot ankle, a stitch plate, a needle, a paper or plastic sheet, a fabric.

7. The method of claim 1, wherein the data is visual or image data related to at least one of a geometry, a color, a contrast or a reflection of the one or more predefined regions.

8. The method of claim 7, wherein the data is collected from multiple images.

9. The method of claim 1, wherein the one or more accuracy indicators includes a probability of confidence as to the accuracy of the one or more features from the data.

10. The method of claim 1, further comprising sending an alert signal or a message requesting that the user ensure that the one or more predetermined regions are in full view of the one or more optical sensors.

11. A sewing machine, comprising:
a sewing head attached to an arm suspended above a sewing bed by a pillar;
a needle bar extending from the sewing head and toward the sewing bed, wherein the needle bar holds a needle;
a presser bar with a presser foot extending away from the sewing head and toward the sewing bed;
one or more optical sensors arranged to collect data from one or more features of one or more predefined regions of the sewing machine; and
one or more processors for processing the data collected by the one or more optical sensors through one or more neural networks, wherein the one or more processors are configured to:
receive the data from the one or more optical sensors;
process the data through the one or more neural networks, wherein the one or more neural networks detects and recognizes the one or more features of the one or more predetermined regions from the data;
calculate one or more accuracy indicators of the one or more features from the data as compared to a trained feature from the one or more neural networks;
compare the value of the one or more accuracy indicators to one or more indicator thresholds; and
adjust a parameter of at least one of the one or more optical sensors based on the comparison between the one or more accuracy indicators and the one or more indicator thresholds.

12. The sewing machine of claim 11, wherein if the value of the one or more accuracy indicators is less than the one or more indicator thresholds, the one or more processors are further configured to collect additional data of the one or more features, process the additional data through the one or more neural networks, calculate an additional accuracy indicator, and compare the value of the additional accuracy indicator to the one or more indicator thresholds.

13. The sewing machine of claim 11, wherein if the value of the one or more accuracy indicators is greater than the one or more indicator thresholds, the one or more processors is further configured to set the one or more parameters of the one or more optical sensors to an adjusted state based on the comparison between the one or more accuracy indicators and the one or more indicator thresholds as calibrated parameters for the one or more optical sensors.

14. The sewing machine of claim 11, wherein the one or more predefined regions are located on a component or accessory, attached or loose, of the sewing machine.

15. The sewing machine of claim 11, wherein the one or more predefined regions are located on at least one of the needle bar, the presser foot, a presser foot ankle, a stitch plate, the needle, a paper or plastic sheet, or a fabric.

16. The sewing machine of claim 11, wherein the data is visual or image data related to at least one of a geometry, a color, a contrast, or a reflection of the one or more predefined regions.

17. The sewing machine of claim 16, wherein the data is collected from multiple images.

18. The sewing machine of claim 11, wherein the one or more accuracy indicators includes one or more probabilities of confidence as to the accuracy of the one or more features from the data.

19. The sewing machine of claim 11, wherein if the value of the one or more accuracy indicators is less than the one or more indicator thresholds, the one or more processors is further configured to send an alert signal or a message requesting the user to ensure that the one or more predetermined regions is in full view of the one or more optical sensor.

20. The sewing machine of claim 11, wherein the one or more neural network are associated with the sewing machine and are configured to share the data with one or more additional neural networks associated with one or more different sewing machines or one or more parent neural networks to train the additional neural networks associated with the one or more different sewing machines or the one or more parent neural networks.

21. A sewing machine, comprising:
a sewing head attached to an arm suspended above a sewing bed by a pillar;
a needle bar extending from the sewing head and toward the sewing bed, wherein the needle bar holds a needle;
a presser bar with a presser foot extending away from the sewing head and toward the sewing bed;
one or more data gathering devices associated with the sewing machine and arranged to collect data from one or more features of one or more predefined regions of the sewing machine; and
one or more processors for processing the data collected by the one or more data gathering devices through one or more neural networks, wherein the one or more processors are configured to:
receive the data from the one or more data gathering devices;
process the data through the one or more neural networks, wherein the one or more neural networks detects and recognizes the one or more features of the one or more predetermined regions from the data;
calculate one or more accuracy indicators of the one or more features from the data as compared to a trained feature from the one or more neural networks;
compare the value of the one or more accuracy indicators to one or more indicator thresholds; and
adjust a parameter of at least one of the one or more data gathering devices based on the comparison between the one or more accuracy indicators and the one or more indicator thresholds.

* * * * *